(12) United States Patent
Kelly et al.

(10) Patent No.: US 8,595,134 B2
(45) Date of Patent: Nov. 26, 2013

(54) APPARATUS AND METHOD FOR BILL PRESENTMENT AND PAYMENT

(75) Inventors: Mary L. Kelly, St. Louis, MO (US); Susan E. Riskovsky, O'Fallon, MO (US); Theresa Altman, St. Peters, MO (US); Michael Tolle, Larchmont, NY (US); Darlene Lohman, Bartelso, IL (US); Brian W. Mueller, Foristell, MO (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 13/025,304

(22) Filed: Feb. 11, 2011

(65) Prior Publication Data
US 2011/0251952 A1 Oct. 13, 2011

Related U.S. Application Data

(60) Provisional application No. 61/303,725, filed on Feb. 12, 2010.

(51) Int. Cl.
*G06Q 40/00* (2012.01)

(52) U.S. Cl.
USPC .............................................. 705/40; 705/39

(58) Field of Classification Search
USPC ..................................................... 705/10–44
See application file for complete search history.

(56) References Cited

U.S. PATENT DOCUMENTS

| | | | |
|---|---|---|---|
| 5,326,959 A | 7/1994 | Perazza | |
| 5,383,113 A | 1/1995 | Kight et al. | |
| 5,465,206 A | 11/1995 | Hilt et al. | |
| 5,483,445 A | 1/1996 | Pickering | |
| 5,659,165 A | 8/1997 | Jennings et al. | |
| 5,684,965 A | 11/1997 | Pickering | |
| 5,699,528 A | 12/1997 | Hogan | |
| 5,774,553 A | 6/1998 | Rosen | |
| 5,787,402 A | 7/1998 | Potter | |
| 5,832,460 A | 11/1998 | Bednar | |

(Continued)

*Primary Examiner* — Frantzy Poinvil
(74) *Attorney, Agent, or Firm* — Otterstedt, Ellenbogen & Kammer, LLP

(57) ABSTRACT

A bill presentment service, wherein bills received from a plurality of billing entities are made available to a plurality of consuming entities via a plurality of consuming entity service providers, is provided under control of an operator of a payment processing network. Registration and preference data pertaining to each of the plurality of consuming entities are stored in a database, accessible to the operator of the payment processing network. A given one of the consuming entities which has switched from a first one of the consuming entity service providers to a second one of the consuming entity service providers is allowed to access the bill presentment service via the first one of the consuming entity service providers, prior to the switching, and via the second one of the consuming entity service providers, subsequent to the switching, using the stored registration and preference data. A subset of the registration and preference data pertains to the given one of the consuming entities. The given one of the consuming entities is allowed to access the bill presentment service via the second one of the consuming entity service providers without having to take any updating action as to at least a portion of the subset of the registration and preference data. Methods for a "one click" payment aspect, an aspect wherein a bill having a single biller account number associated therewith is routed from a billing entity to multiple consuming entity service providers for presentation to a consuming entity, and a transaction tracking aspect are also provided, as are corresponding apparatuses and computer program products.

26 Claims, 32 Drawing Sheets

(56) References Cited

U.S. PATENT DOCUMENTS

| | | | |
|---|---|---|---|
| 5,850,446 A | 12/1998 | Berger et al. | |
| 5,873,072 A | 2/1999 | Kight et al. | |
| 5,897,621 A | 4/1999 | Boesch et al. | |
| 5,920,847 A | 7/1999 | Kolling et al. | |
| 5,943,656 A | 8/1999 | Crooks et al. | |
| 5,963,647 A | 10/1999 | Downing | |
| 5,978,485 A | 11/1999 | Rosen | |
| 5,978,780 A | 11/1999 | Watson | |
| 6,019,282 A | 2/2000 | Thompson et al. | |
| 6,032,133 A | 2/2000 | Hilt et al. | |
| 6,035,285 A | 3/2000 | Schlect | |
| 6,052,671 A | 4/2000 | Crooks et al. | |
| 6,070,150 A | 5/2000 | Remington et al. | |
| 6,072,870 A | 6/2000 | Nguyen et al. | |
| 6,119,106 A | 9/2000 | Mersky et al. | |
| 6,138,107 A | 10/2000 | Elgamal | |
| 6,173,272 B1 | 1/2001 | Thomas et al. | |
| 6,205,433 B1 | 3/2001 | Boesch et al. | |
| 6,223,168 B1 | 4/2001 | McGurl et al. | |
| 6,269,345 B1 | 7/2001 | Riboud | |
| 6,289,322 B1 | 9/2001 | Kitchen et al. | |
| 6,292,789 B1 | 9/2001 | Schutzer | |
| 6,304,915 B1 | 10/2001 | Nguyen et al. | |
| 6,311,170 B1 | 10/2001 | Embrey | |
| 6,317,745 B1 | 11/2001 | Thomas et al. | |
| 6,363,362 B1 | 3/2002 | Burfield et al. | |
| 6,366,893 B2 | 4/2002 | Hannula et al. | |
| 6,385,595 B1 | 5/2002 | Kolling et al. | |
| 6,408,284 B1 | 6/2002 | Hilt | |
| 6,438,528 B1 | 8/2002 | Jensen | |
| 6,510,451 B2 | 1/2003 | Wu et al. | |
| 6,578,015 B1 | 6/2003 | Haseltine et al. | |
| 6,606,606 B2 | 8/2003 | Starr | |
| 6,807,410 B1 | 10/2004 | Pailles et al. | |
| 6,856,974 B1 | 2/2005 | Ganesan et al. | |
| 6,892,184 B1 | 5/2005 | Komem | |
| 6,944,595 B1 | 9/2005 | Graser et al. | |
| 6,983,261 B1 | 1/2006 | Francisco | |
| 7,076,465 B1 | 7/2006 | Blagg et al. | |
| 7,107,244 B2 | 9/2006 | Kight et al. | |
| 7,200,551 B1 | 4/2007 | Senez | |
| 7,240,031 B1 | 7/2007 | Kight et al. | |
| 7,366,696 B1 | 4/2008 | Ganesan et al. | |
| 7,366,697 B2 | 4/2008 | Kitchen | |
| 7,370,014 B1 | 5/2008 | Vasavada et al. | |
| 7,383,226 B2 | 6/2008 | Kight et al. | |
| 7,395,243 B1 | 7/2008 | Zielke et al. | |
| 7,398,253 B1 | 7/2008 | Pinnell | |
| 7,475,039 B2 | 1/2009 | Remington | |
| 7,478,066 B2 | 1/2009 | Remington | |
| 7,510,113 B2 | 3/2009 | Igarashi et al. | |
| 7,523,068 B2 | 4/2009 | Britney et al. | |
| 7,526,448 B2 | 4/2009 | Zielke et al. | |
| 7,536,354 B1 | 5/2009 | deGroeve et al. | |
| 7,536,360 B2* | 5/2009 | Stolfo et al. | 705/68 |
| 7,542,943 B2 | 6/2009 | Caplan et al. | |
| 7,587,364 B2 | 9/2009 | Crumbach et al. | |
| 7,606,766 B2 | 10/2009 | Anderson et al. | |
| 7,606,770 B2 | 10/2009 | Pinnell | |
| 7,657,484 B2 | 2/2010 | Ganesan | |
| 7,716,132 B1 | 5/2010 | Spies | |
| 7,752,095 B1* | 7/2010 | Laracey et al. | 705/34 |
| 7,756,786 B2 | 7/2010 | Trende et al. | |
| 7,805,377 B2* | 9/2010 | Felsher | 705/64 |
| 7,917,435 B2 | 3/2011 | Hall | |
| 7,930,248 B1* | 4/2011 | Lawson et al. | 705/40 |
| 7,958,049 B2* | 6/2011 | Jamison et al. | 705/40 |
| 7,996,310 B1* | 8/2011 | Edwards et al. | 705/40 |
| 8,165,958 B1* | 4/2012 | McLaughlin et al. | 705/40 |
| 8,290,865 B2 | 10/2012 | Lawrence | |
| 2001/0025265 A1 | 9/2001 | Takayasu | |
| 2001/0056390 A1 | 12/2001 | Varadarajan et al. | |
| 2002/0002536 A1 | 1/2002 | Braco | |
| 2002/0002537 A1 | 1/2002 | Bastiansen | |
| 2002/0010677 A1 | 1/2002 | Kitchen et al. | |
| 2002/0023053 A1 | 2/2002 | Szoc et al. | |
| 2002/0032651 A1 | 3/2002 | Embrey | |
| 2002/0046165 A1 | 4/2002 | Kitchen et al. | |
| 2002/0046168 A1 | 4/2002 | Kitchen et al. | |
| 2002/0049671 A1 | 4/2002 | Trende | |
| 2002/0055907 A1 | 5/2002 | Pater et al. | |
| 2002/0059114 A1 | 5/2002 | Cockrill | |
| 2002/0077977 A1 | 6/2002 | Neely | |
| 2002/0099656 A1 | 7/2002 | Poh Wong | |
| 2002/0103752 A1 | 8/2002 | Berger et al. | |
| 2002/0184144 A1 | 12/2002 | Byrd et al. | |
| 2002/0198835 A1 | 12/2002 | Watson | |
| 2003/0105710 A1 | 6/2003 | Barbara | |
| 2003/0187789 A1 | 10/2003 | Karas | |
| 2003/0187792 A1 | 10/2003 | Hansen | |
| 2003/0191711 A1 | 10/2003 | Jamison | |
| 2003/0204457 A1 | 10/2003 | Arias | |
| 2003/0208440 A1 | 11/2003 | Harada | |
| 2003/0208442 A1 | 11/2003 | Cockrill et al. | |
| 2003/0216990 A1 | 11/2003 | Star | |
| 2004/0039699 A1 | 2/2004 | Egendorf | |
| 2004/0064407 A1 | 4/2004 | Kight | |
| 2004/0064408 A1 | 4/2004 | Kight et al. | |
| 2004/0083167 A1 | 4/2004 | Kight et al. | |
| 2004/0083171 A1 | 4/2004 | Kight et al. | |
| 2004/0093269 A1 | 5/2004 | Rubin et al. | |
| 2004/0128240 A1 | 7/2004 | Yusin | |
| 2004/0128255 A1 | 7/2004 | Jung | |
| 2004/0139010 A1 | 7/2004 | McMichael | |
| 2004/0143552 A1 | 7/2004 | Weichert | |
| 2004/0158522 A1 | 8/2004 | Brown et al. | |
| 2004/0167853 A1 | 8/2004 | Sharma | |
| 2004/0210520 A1 | 10/2004 | Fitzgerald et al. | |
| 2004/0215560 A1 | 10/2004 | Amalraj et al. | |
| 2004/0225609 A1 | 11/2004 | Greene | |
| 2004/0230526 A1 | 11/2004 | Praisner | |
| 2004/0236646 A1 | 11/2004 | Wu et al. | |
| 2005/0010523 A1 | 1/2005 | Myklebust et al. | |
| 2005/0015338 A1 | 1/2005 | Lee | |
| 2005/0021454 A1 | 1/2005 | Karpovich | |
| 2005/0021455 A1 | 1/2005 | Webster | |
| 2005/0049963 A1 | 3/2005 | Barry | |
| 2005/0065882 A1 | 3/2005 | Remington et al. | |
| 2005/0075960 A1 | 4/2005 | Leavitt et al. | |
| 2005/0097040 A1 | 5/2005 | Chen et al. | |
| 2005/0137952 A1 | 6/2005 | Yamamoto | |
| 2005/0137978 A1 | 6/2005 | Ganesan et al. | |
| 2005/0154674 A1 | 7/2005 | Nicholls | |
| 2005/0167481 A1 | 8/2005 | Hansen | |
| 2005/0197957 A1 | 9/2005 | Keith et al. | |
| 2005/0209965 A1 | 9/2005 | Ganesan | |
| 2005/0234820 A1 | 10/2005 | MacKouse | |
| 2006/0015452 A1 | 1/2006 | Kulasooriya et al. | |
| 2006/0015453 A1 | 1/2006 | Kulasooriya et al. | |
| 2006/0036543 A1 | 2/2006 | Blagg | |
| 2006/0064377 A1 | 3/2006 | Ganesan et al. | |
| 2006/0173779 A1 | 8/2006 | Bennett et al. | |
| 2006/0184451 A1 | 8/2006 | Ganesan et al. | |
| 2006/0190374 A1 | 8/2006 | Sher | |
| 2006/0195395 A1 | 8/2006 | Ganesan et al. | |
| 2006/0195397 A1 | 8/2006 | Ganesan et al. | |
| 2007/0100749 A1 | 5/2007 | Bachu | |
| 2008/0046363 A1 | 2/2008 | Ali et al. | |
| 2008/0046364 A1 | 2/2008 | Hall | |
| 2008/0288376 A1 | 11/2008 | Panthaki et al. | |
| 2008/0288400 A1 | 11/2008 | Panthaki et al. | |
| 2009/0076934 A1 | 3/2009 | Shahbazi | |
| 2009/0089193 A1 | 4/2009 | Paintin | |
| 2009/0132414 A1 | 5/2009 | Philliou | |
| 2009/0171839 A1 | 7/2009 | Rosano | |
| 2009/0244600 A1 | 10/2009 | Haycock et al. | |
| 2009/0292619 A1 | 11/2009 | Kagan | |
| 2010/0005025 A1 | 1/2010 | Kumar | |
| 2010/0100480 A1 | 4/2010 | Altman | |
| 2010/0174644 A1 | 7/2010 | Rosano | |
| 2010/0306015 A1 | 12/2010 | Kingston | |
| 2012/0197788 A1 | 8/2012 | Sanghvi | |

* cited by examiner

BILL PAY WORKFLOW DEVELOPER STACK

| INBOUND FILE ⌐16 | | | | INBOUND BATCH ⌐18 | | | | | INBOUND DETAIL ⌐20 | | | | |
|---|---|---|---|---|---|---|---|---|---|---|---|---|---|
| INB FILE ID | STAT | ERR CDS | PARTICIPANT | INB BATCH ID | INB FILE ID | STAT | ERR CDS | BILLER ID | INB BATCH ID | STAT | ERR CDS | AMT | CRD DBT SW |
| 1234 | A | | P1 | 1235 | 1234 | A | | B1 | 1235 | A | | 100.00 | C |
| | | | | | | | | | 1235 | R | 123 | 200.00 | C |
| | | | | | | | | | 1235 | R | 456, 789 | 350.00 | C |
| | | | | | | | | | 1235 | A | | 525.00 | C |
| | | | | 1236 | 1234 | R | B05 | B2 | 1236 | R | 032 | 775.00 | C |
| | | | | | | | | | 1236 | R | 032, 123 | 175.00 | C |
| | | | | 1237 | 1234 | A | | B3 | 1237 | A | | 1000.00 | C |
| | | | | | | | | | 1237 | R | 525 | 550.00 | C |
| | | | | | | | | | | | | | |
| 1238 | A | | P1 | 1239 | 1238 | A | | B4 | 1239 | A | | 125.00 | C |
| | | | | | | | | | 1239 | A | | 275.00 | C |
| | | | | 1240 | 1238 | A | | B3 | 1240 | A | | 300.00 | C |
| | | | | | | | | | 1240 | A | | 400.00 | C |

FIG. 20B

| | TASK LIST: DAILY SCHEDULE | | | | | TASK STATUS | |
|---|---|---|---|---|---|---|---|
| TASK ID | PARTICIPANT | OUTBOUND TYPE | EVENT | EVENT DATA | EVENT DTM | STATUS | STATUS DTM |
| T1 | P1 | CONFIRMATION | TIME | | 12:00 PM | PENDING | <TODAY> 4:35 AM |
| T2 | P1 | REMITTANCE | TIME | | 12:00 PM | PENDING | <TODAY> 4:35 AM |
| T3 | P2 | REMITTANCE | WINDOW | W1 | 12:00 PM | PENDING | <TODAY> 4:35 AM |
| T4 | P2 | REMITTANCE | WINDOW | W3 | 5:00 PM | PENDING | <TODAY> 4:35 AM |
| T5 | P2 | REMITTANCE | WINDOW | W5 | 2:00 AM | PENDING | <TODAY> 4:35 AM |
| T6 | P2 | SAME DAY | TIME | | 8:00 AM | PENDING | <TODAY> 4:35 AM |
| T7 | P2 | SAME DAY | TIME | | 10:00 AM | PENDING | <TODAY> 4:35 AM |
| T8 | P2 | SAME DAY | TIME | | 12:00 PM | PENDING | <TODAY> 4:35 AM |
| T9 | P2 | SAME DAY | TIME | | 2:00 PM | PENDING | <TODAY> 4:35 AM |
| T10 | P2 | SAME DAY | TIME | | 4:00 PM | PENDING | <TODAY> 4:35 AM |
| T11 | P2 | SAME DAY | TIME | | 6:00 PM | PENDING | <TODAY> 4:35 AM |
| T12 | P3 | REMITTANCE | WINDOW | W1 | 12:00 PM | PENDING | <TODAY> 4:35 AM |
| T13 | P3 | RETURN | WINDOW | W1 | 12:00 PM | PENDING | <TODAY> 4:35 AM |
| T14 | P4 | REMITTANCE | TIME | | 12:00 PM | PENDING | <TODAY> 4:35 AM |
| T15 | P4 | REMITTANCE | TIME | | 8:00 PM | PENDING | <TODAY> 4:35 AM |
| T16 | P5 | REMITTANCE | WINDOW | W2 | 2:30 PM | PENDING | <TODAY> 4:35 AM |
| T17 | P5 | REMITTANCE | WINDOW | W5 | 2:00 AM | PENDING | <TODAY> 4:35 AM |
| T18 | P6 | REMITTANCE | WINDOW | W1 | 12:00 PM | PENDING | <TODAY> 4:35 AM |
| T19 | P6 | REMITTANCE | WINDOW | W3 | 5:00 PM | PENDING | <TODAY> 4:35 AM |
| T20 | P6 | REMITTANCE | WINDOW | W5 | 2:00 AM | PENDING | <TODAY> 4:35 AM |

FIG. 26

SAMPLE SIF/SINF STATUS RECORDS

SIF/SINF STATUS

| SIF FILE SERIAL | INPUT SOURCE ID | FILE DATE TIME | RECON DATE | RECON CYCLE | TOTAL AMT | STATUS | ERRORS | STATUS TIME |
|---|---|---|---|---|---|---|---|---|
| 00001 | 00000002 | 20008010101000 | 200080101 | 01 | 5555 | OPEN | - | 12:00 |
| 00001 | 00000002 | 20008010101000 | 200080101 | 01 | 5555 | ACCEPTED | 0 | 12:05 |
| 00002 | 00000002 | 20008010201000 | 200080102 | 02 | 2222 | OPEN | - | 02:00 |
| 00002 | 00000002 | 20008010301000 | 200080103 | 02 | 2222 | REJECTED | 5 | 02:05 |

SAMPLE SIF DETAIL RECORDS

SIF DETAILS

| SIF FILE SERIAL | SETTLEMENT SERVICE | ICA | REFERENCE CODE | PAYMT PRTY CODE | PAYMT AMT | PAYMT CURR CODE | INPUT SOURCE REFERENCE ID | TX COUNT | DB/CR |
|---|---|---|---|---|---|---|---|---|---|
| 00001 | US0000002 | 1111 | 234561 | 04 | 5489 | 840 | RPPS1YYD01 | 35 | D |
| 00001 | US0000002 | 1111 | 234561 | 04 | 4535 | 840 | RPPS2YYD01 | 45 | C |
| 00001 | US0000002 | 2222 | 435999 | 05 | 5555 | 840 | RPPS3YYD01 | 77 | C |
| 00002 | US0000002 | 3333 | 245355 | 04 | 2222 | 840 | RPPS4YYD01 | 65 | D |
| 00002 | US0000002 | 4444 | 289435 | 05 | 2222 | 840 | RPPS5YYD01 | 45 | C |

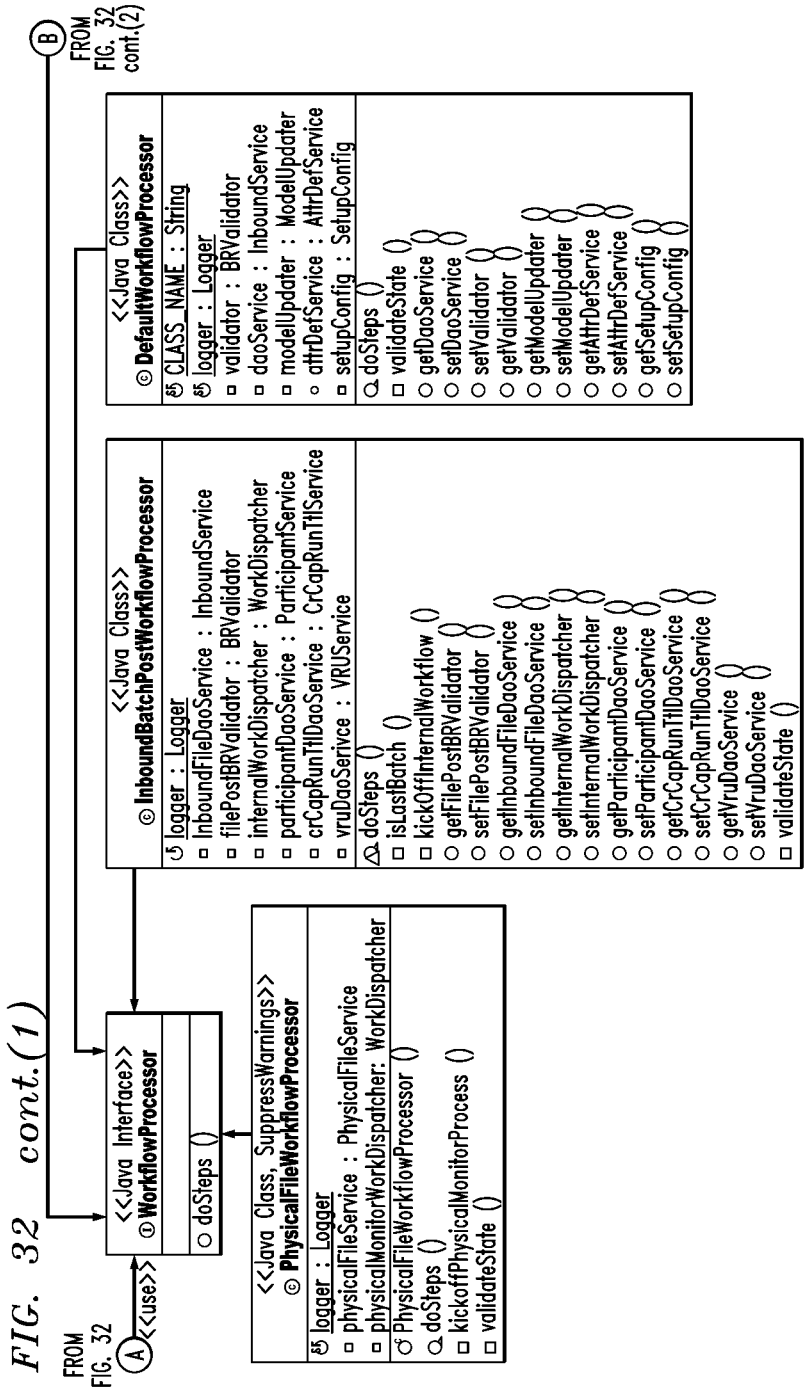

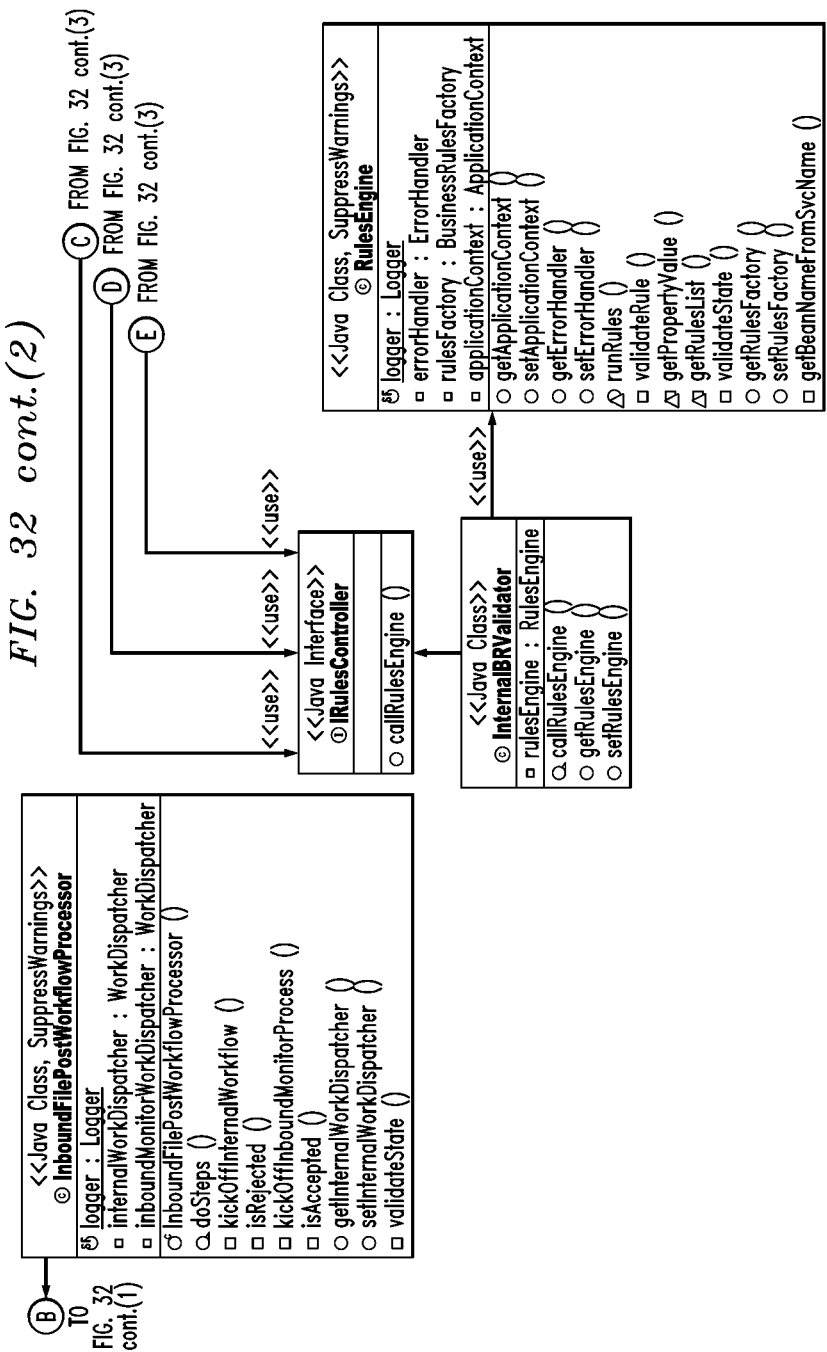
FIG. 32 cont.(2)

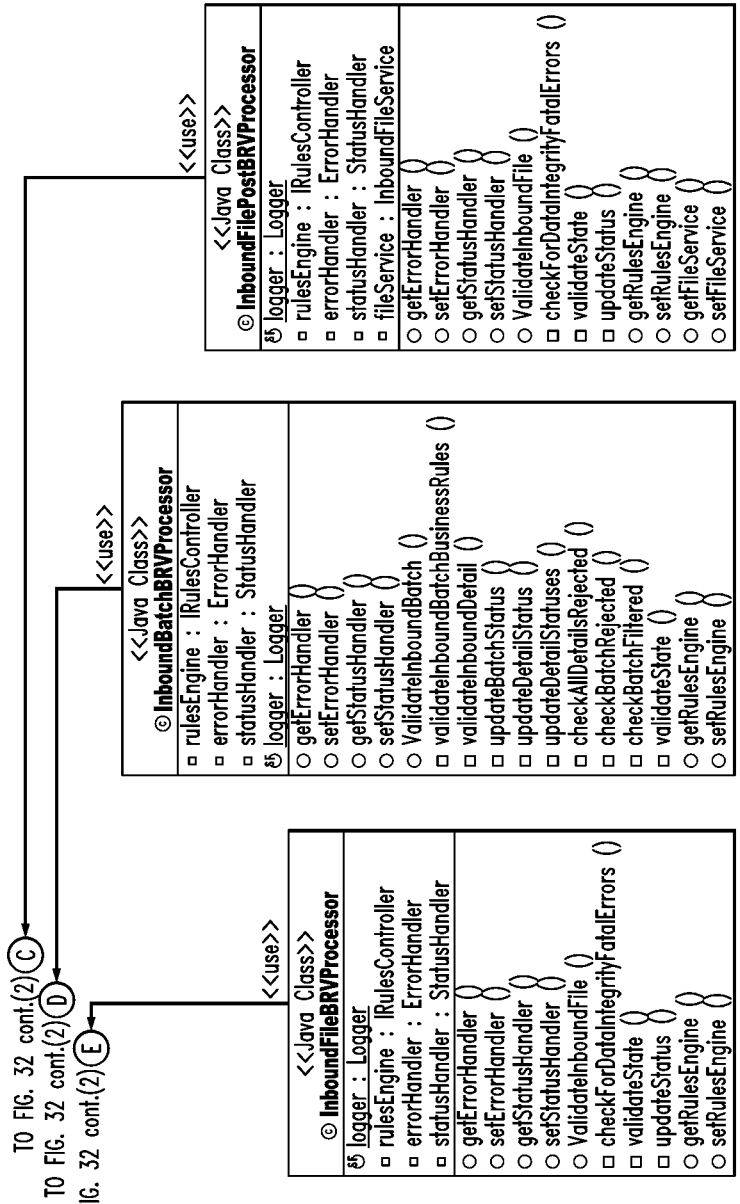
FIG. 32 cont.(3)

APPARATUS AND METHOD FOR BILL PRESENTMENT AND PAYMENT

CROSS-REFERENCE TO RELATED APPLICATIONS

This patent application claims the benefit of U.S. Provisional Patent Application Ser. No. 61/303,725 filed on Feb. 12, 2010, and entitled "Apparatus and Method for Bill Presentment and Payment." The disclosure of the aforementioned Provisional Patent Application Ser. No. 61/303,725, including all four appendices thereof, is expressly incorporated herein by reference in its entirety for all purposes. The disclosure of U.S. Provisional Patent Application Ser. No. 61/438,106 filed on Jan. 31, 2011, and entitled "Transaction Processing Engine for Consumer Bill Payment Transactions and the Like" is also expressly incorporated herein by reference in its entirety for all purposes, and pertinent portions thereof are reproduced herein.

FIELD OF THE INVENTION

The present invention relates generally to the electronic and computer arts, and, more particularly, to apparatus and methods for electronic bill presentment and payment.

BACKGROUND OF THE INVENTION

U.S. Pat. No. 5,699,528 to Hogan discloses a system and method for bill delivery and payment over a communications network. In a bill delivery and payment system, users are able to access a server computer on a communications network to obtain bill information and pay bills. For example, such a communications network may be the Internet or the World Wide Web thereof. Using a personal computer, a user can access a Web site provided by the server computer to view the bill information and instruct the server computer as to the details of the bill payment. In a second embodiment, without visiting the web site, users are provided with electronic bills containing bill information in the form of electronic mail (e-mail) at their e-mail addresses. After opening an electronic bill, a user can make the bill payment by replying to the electronic bill.

SUMMARY OF THE INVENTION

Principles of the present invention provide techniques for facilitating electronic bill presentment and payment. At least some aspects of the techniques may be facilitated by the operator of a payment network or other service provider.

In one aspect, an exemplary method includes the steps of providing, under control of an operator of a payment processing network, a bill presentment service wherein bills received from a plurality of billing entities are made available to a plurality of consuming entities via a plurality of consuming entity service providers; storing in a database, accessible to the operator of the payment processing network, registration and preference data pertaining to each of the plurality of consuming entities; and allowing a given one of the consuming entities which has switched from a first one of the consuming entity service providers to a second one of the consuming entity service providers to access the bill presentment service via the first one of the consuming entity service providers, prior to the switching, and via the second one of the consuming entity service providers, subsequent to the switching, using the stored registration and preference data. A subset of the registration and preference data pertains to the given one of the consuming entities. The given one of the consuming entities is allowed to access the bill presentment service via the second one of the consuming entity service providers without having to take any updating action as to at least a portion of the subset of the registration and preference data.

In another aspect, another exemplary method includes the steps of providing, under control of an operator of a payment processing network, a bill presentment service wherein bills received from a plurality of billing entities are made available to a plurality of consuming entities; providing, by the operator of the payment processing network, at least a portion of a bill payment service wherein the consuming entities are afforded an option of paying the bills from the plurality of billing entities; storing in a database, by the operator of the payment processing network, registration and preference data pertaining to each of the plurality of consuming entities, at least portion of the registration and preference data comprising payment preference data specifying how a given one of the consuming entities wishes to pay at least two of the billing entities; and affording the given one of the consuming entities an option to pay the at least two of the billing entities with a single command, in accordance with the payment preference data.

In still another aspect, another exemplary method includes the steps of providing, under control of an operator of a payment processing network, a bill presentment service wherein bills received from a plurality of billing entities are made available to a plurality of consuming entities via a plurality of consuming entity service providers; obtaining, by the operator of the payment processing network, a given one of the bills from a given one of the billing entities, the given one of the bills having a single biller account number associated therewith; and routing the given one of the bills having the single biller account number associated therewith from the given one of the billing entities to multiple ones of the consuming entity service providers for presentation to a corresponding one of the consuming entities via the multiple ones of the consuming entity service providers.

In a further aspect, another exemplary method includes the steps of providing, under control of an operator of a payment processing network, a bill presentment service wherein bills received from a plurality of billing entities are made available to a plurality of consuming entities via a plurality of consuming entity service providers; providing, by the operator of the payment processing network, at least a portion of a bill payment service wherein the consuming entities are afforded an option of paying the bills from the plurality of billing entities, wherein the step of providing the bill presentment service is carried out without enrollment of the plurality of consuming entities, further comprising: receiving from the plurality of billing entities an indication of ability to send the bills in electronic form; storing data indicative of the ability to send the bills in electronic form; receiving from the plurality of consuming entity service providers an indication of ability to receive the bills in electronic form; storing data indicative of the ability to receive the bills in electronic form; and tracking a plurality of transactions to identify those of the plurality of consuming entities for whom the bills in electronic form are intended. The tracking in turn includes storing, in a relationship table, based on historical data, billing entity identifiers, billing entity account numbers, and consuming entity service provider identifiers; and, upon the operator of the payment processing network obtaining a bill from a given one of the billing entities in electronic form, consulting the relationship table to obtain at least one of the consuming entity service provider identifiers corresponding to a given one of the billing entity identifiers and a given one of the billing entity account numbers. A further step includes making the bill from the given one of the billing entities available to at least one of the consuming entities corresponding to the at least one of the consuming entity service provider identifiers.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a tangible computer readable recordable storage medium with computer usable program code for performing the method steps indicated. Furthermore, one or more embodiments of the invention or elements thereof can be implemented in the form of a system (or apparatus) including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

Apparatuses are also contemplated including a bill presentment platform, optionally a bill payment platform, optionally a database, optionally one or more formatting components, and optionally a user interface module, for example.

One or more embodiments of the invention can provide substantial beneficial technical effects, including:
- persistent storage of registration and preference data allows consuming entities to switch consuming entity service providers without having to re-enroll
- "one click" functionality saves time and computer resources
- automatic enrollment via transaction tracking saves time and computer resources
- bill for a single biller account number (or similar identifier) can be routed to multiple originators These and other features and advantages of the present invention will become apparent from the following detailed description of illustrative embodiments thereof, which is to be read in connection with the accompanying drawings.

BRIEF DESCRIPTION OF THE DRAWINGS

FIG. 20B depicts exemplary daily schedule data, from U.S. Provisional Patent Application Ser. No. 61/438,106;

FIG. 26 depicts sample SIF/SINF status records and sample SIF detail records, from U.S. Provisional Patent Application Ser. No. 61/438,106;

DETAILED DESCRIPTION OF PREFERRED EMBODIMENTS

Inventive techniques can be employed in a number of different environments. In one or more embodiments, inventive techniques can be employed in connection with the MASTERCARD RPPS® electronic payment system of MasterCard International Incorporated of Purchase, N.Y., USA. This example is non-limiting; for example, other types of electronic bill payment systems could be employed in other instances, such as that described in U.S. Provisional Patent Application Ser. No. 61/438,106.

Figure 1:
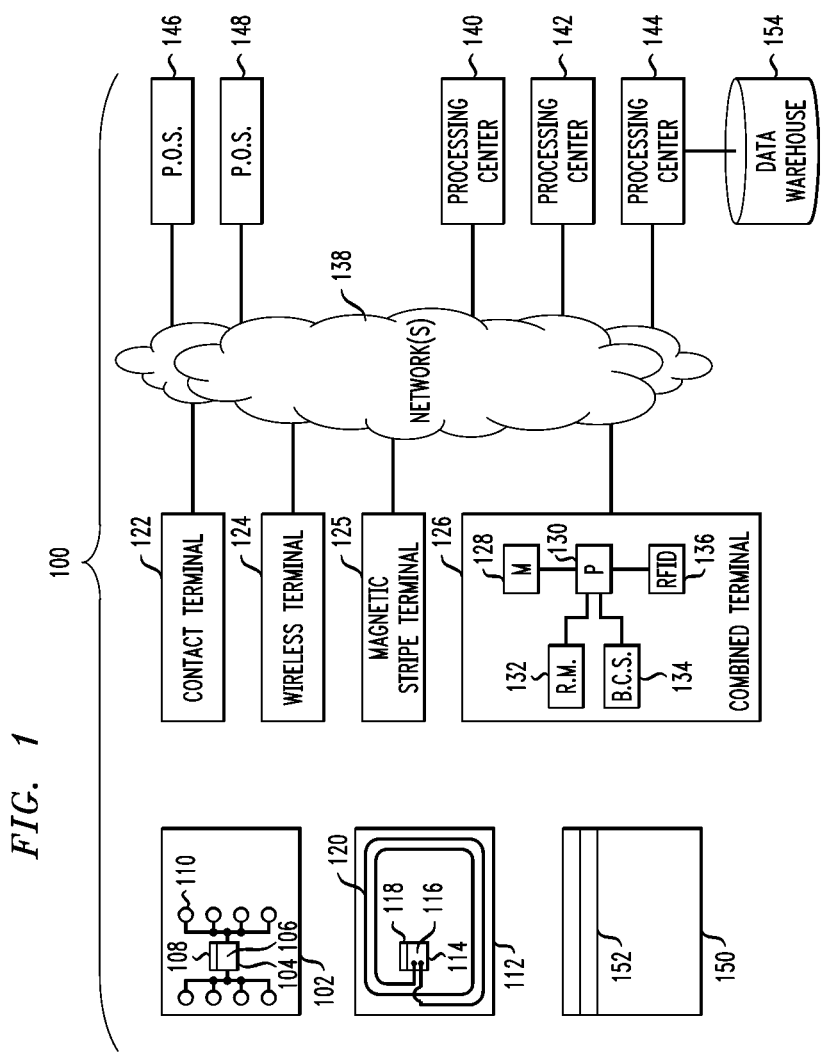
FIG. 1 shows an example of a payment system.

FIG. 1 is provided for exemplary purposes and depicts physical interface of cards with terminals, but it should be understood that in one or more instances of the invention, a consumer or customer may simply provide card account information to an entity via telephone, web site, and the like, without physically scanning the card at a terminal.

Attention should now be given to FIG. 1, which depicts an exemplary embodiment of a system 100, including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. Other types of devices could include a conventional card 150 having a magnetic stripe 152, an appropriately configured cellular telephone handset, and the like. Indeed, techniques can be adapted to a variety of different types of cards, terminals, and other devices, configured, for example, according to a payment system standard (and/or specification).

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions or units 108, 118 can store the operating system of the cards 102, 112. The operating system loads and executes applications and provides file management or other basic card services to the applications. One operating system that can be used is the MULTOS® operating system licensed by licensed by MAOSCO Limited. (MAOSCO Limited, St. Andrews House, The Links, Kelvin Close, Birchwood, Warrington, WA3 7PB, United Kingdom). Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other nonvolatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

In some cases, aspects conform to pertinent ISO standards, such as ISO 8583. Individual entities or groups may develop specifications within this standard.

As noted, cards 102, 112 are examples of a variety of payment devices that can be employed. The primary function of the payment devices may not be payment, for example, they may be cellular phone handsets that implement techniques of the invention. Such devices could include cards having a conventional form factor, smaller or larger cards, cards of different shape, key fobs, personal digital assistants (PDAs), appropriately configured cell phone handsets, or indeed any device with the capabilities to implement techniques of the invention. The cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to facilitate execution of one or more method steps. The applications can be, for example, application identifiers (AIDs) linked to software code in the form of firmware plus data in a card memory such as an electrically erasable programmable read-only memory (EEPROM). Again, note that "smart" cards are not necessarily required and a magnetic stripe card can be employed; furthermore, in some cases no physical presentment of a card to a terminal is required, and in one or more instances, a payment card account with an account number but no physical card could even be employed.

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any type of device 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (for example, a virtual private network, such as the BANKNET® virtual private network (VPN) of MasterCard International Incorporated off Purchase, N.Y., USA (see, e.g., FIG. 2 below). More than one network could be employed to connect different elements of the system. For example, a local area network (LAN) could connect a terminal to a local server or other computer at a retail establishment. A payment network could connect acquirers and issuers. Processing centers 140, 142, 144 can include, for example, a host computer of an issuer of a payment device (or processing functionality of other entities discussed in other figures herein).

Many different retail or other establishments, as well as other entities, generally represented by points-of-sale 146, 148, can be connected to network 138. Each such establishment can have one or more terminals. Further, different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" cards 102, 112, or the handset chassis and body in the case of a cellular telephone.

Again, conventional magnetic stripe cards 150 can be used instead of or together with "smart" or "chip" cards, and as noted in some cases, a card account with no physical card can be employed.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. In some instances, the aforementioned bar code scanner 134 and/or RFID tag reader 136 can be provided, and can be coupled to the processor, to gather data, such as a product identification, from a UPC code or RFID tag on a product to be purchased.

The above-described devices 102, 112 can be ISO 7816-compliant contact cards or devices or ISO 14443-compliant proximity cards or devices. In operation, card 112 can be touched or tapped on the terminal 124 or 126, which then contactlessly transmits the electronic data to the proximity IC chip in the card 112 or other wireless device. Magnetic stripe cards can be swiped in a well-known manner. Again, in one or more instances, the card number is simply provided via telephone, web site, or the like.

One or more of the processing centers 140, 142, 144 can include a database such as a data warehouse 154 for storing information of interest. In the context of one or more embodiments of the invention, a consumer could host a device such as 102, 122, 150 and the entities in FIGS. 2-7 could operate processing centers such as 140, 142, 144 (with data storage 154 as needed). Network(s) 138 could, as noted, include a virtual private network (VPN) and/or the Internet; the VPN could be, for example, the aforementioned BANKNET® network.

Figure 2:
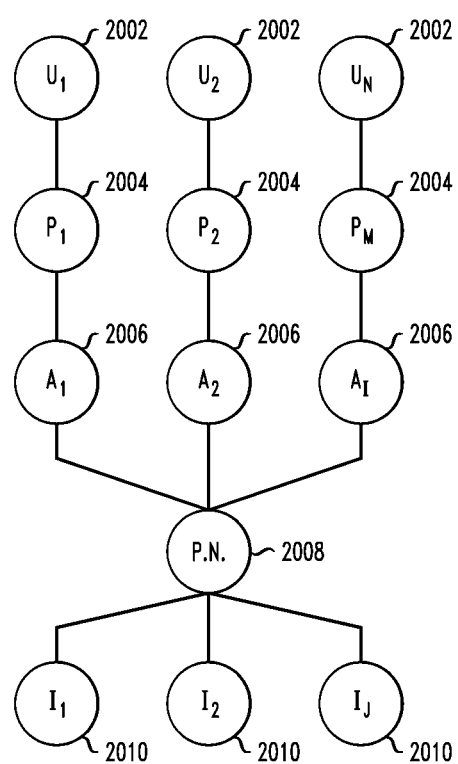
FIG. 2 depicts an exemplary inter-relationship between and among: (i) a payment network configured to facilitate transactions between multiple issuers and multiple acquirers, (ii) a plurality of users (e.g., consumers or payers), (iii) a plurality of merchants, (iv) a plurality of acquirers, and (v) a plurality of issuers.

With reference to FIG. 2, an exemplary relationship among multiple entities is depicted in the context of a card payment process. In one or more embodiments, as depicted in FIGS. 5-7, 9, and 10 below, the operator of a payment network may operate a network which is capable of facilitating the kinds of transactions discussed with respect to FIG. 2. A number of different users 2002, $U_1, U_2 \ldots U_N$, interact with a number of different merchants 2004, $P_1, P_2 \ldots P_M$. Users 2002 could be, for example, consumers, payers, or other holders of payment cards. Merchants 2004 interact with a number of different acquirers 2006, $A_1, A_2 \ldots A_I$. Acquirers 2006 interact with a number of different issuers 2010, $I_1, I_2 \ldots I_J$, through, for example, a single operator 2008 of a payment network configured to facilitate transactions between multiple issuers and multiple acquirers; for example, MasterCard International Incorporated, operator of the BANKNET® network, or Visa International Service Association, operator of the VISANET® network. In general, N, M, I, and J are integers that can be equal or not equal.

During a conventional credit authorization process, the cardholder 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. In other instances, a payment network configured to facilitate transactions between multiple issuers and a single acquirer could be used. Some embodiments of the invention may be employed with other kinds of payment networks, for example, proprietary or closed payments networks with only a single issuer and acquirer.

Figure 3:
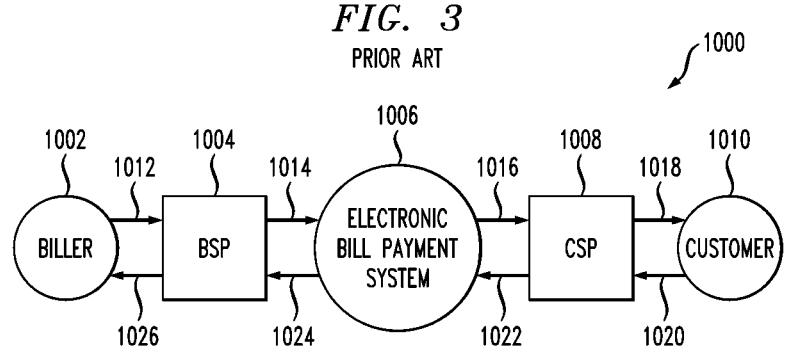
FIG. 3 shows exemplary operation of a current bill pay system.

FIG. 3 shows operation of a current electronic bill payment system, such as the MASTERCARD RPPS® electronic payment system, which is but one non-limiting example of such a system. Given the teachings herein, the skilled artisan will be able to implement one or more embodiments of the invention using a variety of techniques; by way of example and not limitation, the modification or supplementing of an existing system such as that shown in FIG. 3 using techniques described herein. As shown in FIG. 3, in a current approach 1000, during a presentment phase, a biller 1002 electronically sends billing information 1012 to its biller service provider (BSP) 1004, that is, an institution that acts as an intermediary between the biller and the consumer for the exchange of electronic bill payment information. BSP 1004 in turn sends the information to the electronic bill payment system 1006, as seen at 1014. As seen at 1016, the system 1006 in turn delivers the billing information to the customer service provider (CSP) 1008, that is, an agent of the customer that provides an interface directly to customers, businesses, or others for bill payment and presentment. The CSP enrolls customers, enables payment and presentment, and provides customer care. CSP 1008 presents the bill to the consumer (customer) 1010 at 1018.

In a payment phase, consumer 1010 sends bill payment instructions to CSP 1008, as seen at 1020. CSP 1008 in turn sends the bill payment information to the system 1006, as at 1022. The system sends funds and data electronically to BSP 1004, as at 1024. The BSP 1004 posts payment information to the biller 1002, as at 1026.

Figure 4:
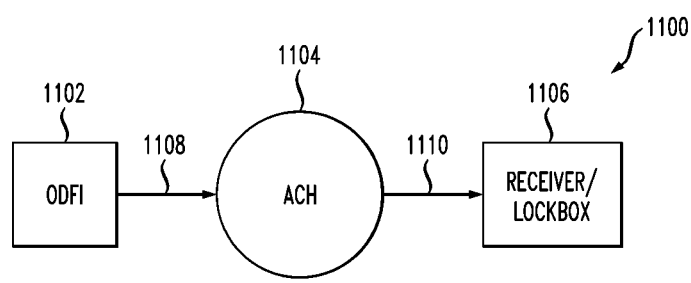
FIG. 4 shows exemplary operation of current automated clearinghouse payments.

FIG. 4 shows a current process 1100 for making electronic funds transfers (EFT) for bill payment or the like. An originating depository financial institution (ODFI) 1102, also known as an originator, sends instructions (e.g., payment data and remittance data) using a network such as the automated clearing house (ACH) 1104, Swift, EPN, CHIPS, Fedwire, and the like, as seen at 1108. As shown at 1110, the ACH or similar network 1104 relays the instructions to the receiving depository financial institution (RDFI) (e.g., receiver or a lockbox), designated 1106. In some embodiments, an ACH file format can be used; one non-limiting example of an ACH file format is the NACHA ACH CCD file format. Other formats can also be used; for example, extensible markup language (XML). It should be noted that a variety of networks can be used, both public (for example, ACH) and proprietary (for example, the aforementioned MASTERCARD RPPS system).

Currently, to carry out a straight transfer of a file from one party to another, GFT (Global File Transfer) takes advantage of in-place connectivity and does not offer file transfer protocol (FTP) services. A straight transfer may be carried out because of a relationship with a member and a vendor or third party. As will be appreciated by the skilled artisan, GFT is a system available from MasterCard International Incorporated wherein files are transferred over a payment network of the kind shown in FIG. 2, and is a non-limiting example of data file transfer via a payment network. File transfer protocol (FTP) is the standard network protocol used to exchange and manipulate files over an Internet Protocol computer network, such as the Internet. FTP file transfer can be employed in other embodiments of the invention. Appropriate file retention and/or billing policies can be set within the GFT network or other network.

There are a number of methods of passing a file through a payment system; for example:
a virtual private network (VPN) such as shown in FIG. 2 (e.g., the Banknet® network)
Internet—using a suitable secure technique for communicating data over the Internet, for example, an existing method such as MasterCard International Incorporated's MFE (MASTERCARD FILE EXPRESS) or the well-known secure file transfer protocol (SFTP) technique or similar techniques. As will be appreciated by the skilled artisan, the same are generally representative of so-called Straight-Through-Processing (STP) techniques which enable electronic payments to flow seamlessly from, for example, a company's Accounts Payable system, through the banking infrastructure, and to a vendor's Accounts Receivable system. Note that in at least some instances. STP techniques can also be employed in connection with the above-discussed VPN file transfer. The Straight Through Processing Transaction Set 820 (hereafter "STP 820") was developed by the Electronic Payments Network and represents a widely adopted standardized format that may be employed in one or more embodiments. The skilled artisan will appreciate that "820" in this context is a transaction set, not a reference to the processor 820 in FIG. 8. The skilled artisan will also appreciate that MasterCard File Express is an example of an application accessible online which handles both the compression and encryption of data for transmission, using, for example, the International Data Encryption Algorithm (IDEA) encryption scheme.

One or more embodiments provide methods, services, systems, apparatuses, and/or computer program products which connect merchants, either directly or through their service providers, with their customers, either directly or through their customers' service providers, to provide an electronic technique for notifying a payer of one or more bills, displaying one or more bills, storing one or more of the consumers' bills, authorizing a payment (or requesting or otherwise facilitating such authorization), as well as providing techniques for paying the bill with cash, debit card, credit card, prepaid or other form of payment card, EFT transaction and/or check (references to payment cards should be construed to refer to any kind of payment card unless specifically stated otherwise; references to consumers are also applicable to businesses which purchase goods and/or services unless specifically stated otherwise). In one or more embodiments, an operator of a payment network 2008 (referred to herein as a "PN" or "PNO") facilitates one or more steps. One or more embodiments preferably enable a bill to be presented and subsequently paid via a plurality of channels, including, but not limited to, a walk-in payment channel (such as Western Union), through a remote channel (such as a financial institution's online bill payment service, a mobile bill payment provider, etc.), and via the merchant web-site directly. The service is preferably service-provider agnostic, which allows the payer and merchant to access the service regardless of whether a change in their respective service providers has occurred. As discussed elsewhere herein, Automated Billing Updater (ABU) and/or Recurring Payment Cancellation Service (RPCS) are preferably integrated into the service, and the service may be offered in conjunction with, or integrated with, a bill payment service such as MasterCard RPPS or the like.

In addition, one or more embodiments allow subscribed entities (payers, payer service providers, merchants, merchant service providers, and the like) the ability to establish preferences in order to customize the presentation of the bill(s), the channel(s) through which the bill(s), notification(s), reminder(s) or payment authorization are delivered, the channel through which a payment is initiated, or the source of fiends or payment type that can be utilized to process the payment. The preferences may or may not be mutually exclusive, meaning more than one option can be selected for the distribution of non-financial messages (e.g., notification, reminder, alert, bill, etc.) as well as for the financial messages (payment). The operator of a payment network 2008 will preferably provide the flexibility to aggregate bills for a payer, and, through available stored preferences, the payer can pay multiple bills with a single instruction via any available channel using any eligible payment mechanism or combinations of eligible payment mechanisms (cash, debit, credit card, etc.). This service will be available for service providers and merchants to offer to their respective customers. The service is transferable in the event of a change in service providers (either the payer's service provider or his or her merchant's service provider).

The individual components of the service (e.g., bill delivery, bill reminder, alert, bill payment, etc.) can be delivered via different mechanisms. For example, a service provider may choose, via preferences, to send or receive non-financial messages via extensible markup language (XML) format connected to the operator of a payment network 2008 via Secure FTP (file transfer protocol), but may choose to send or receive payment messages via a virtual private network (VPN) type-channel or other. The service provider can request that the operator of a payment network 2008 construct the messages in a format and sequence that can be easily integrated with the service provider's own proprietary bill presentment and payment offering. The requested format and sequence may be different from the format and sequence from which the operator of a payment network 2008 received the information.

In one or more embodiments, a ubiquitous industry offering is provided that allows subscribers to access the service regardless of a change in their respective service providers. In addition, one or more embodiments allow payers the ability to pay, via establishment of preferences, a myriad of bills with one instruction (such as one click, one button, etc.). Further, one or more embodiments also support the payment with cash, check, debit card, credit card and EFT.

One or more embodiments provide a full-service offering for Bill Payment Providers (either FIs or non-FIs) (FI=financial institution; BPP=bill payment provider). One or more embodiments allow any BPP to offer bill presentment and payment services to its consumers without the time and expense related to infrastructure development and support. A service according to one or more embodiments also encourages and drives paperless billing and statements for both BPP and billers which results in reduced cost for both.

In one or more instances, a service, according to an aspect of the invention, provides one or more, and preferably all, of the following:
- Full-service bill presentment and bill payment
- Secure authentication and login retention
- Statement repository and/or historical repository
- Both basic and fully customized payment choices for Consumer
- Full reporting and download capabilities for Consumer
- Extensive biller and/or merchant directory with full search capabilities
- Assurance of accurate electronic funds transfer (EFT) biller information (from RPPS Biller Directory or a biller directory of a similar electronic bill payment system)
- Able to customize offerings per BPP
- BPPs and Billers use existing connectivity for service (if already a client of an operator of a payment network 2008, a non-limiting example of which is MasterCard International Incorporated of Purchase, new York, USA)
- Enhanced support and facilitation for a variety of payer types such as consumer, business, and government.

As discussed elsewhere herein, Automated Billing Updater (ABU) and/or Recurring Payment Cancellation Service (RPCS) are preferably integrated into the service, and the service may be offered in conjunction with, or integrated with, a bill payment service such as MasterCard RPPS or the like.

In one or more embodiments, merchants and/or billers (which may in some cases be one and the same; e.g., merchant can bill directly or work with a billing service provider) may be addressed as follows:
- An operator of a payment network 2008 could contact all current RPPS Billers (or all current billers of another electronic bill payment system or current members of other proprietary or open network directories in the RPPS system or another system) regarding inclusion into this service.
- An operator of a payment network 2008 may also have a Card Biller Directory which gives to such operator merchants who accept the corresponding brand of payment card for online payment.
- An operator of a payment network 2008 may also have an aggregated merchant database which provides names of merchants who have submitted card payments using the corresponding brand of payment card.
- An operator of a payment network 2008 may also have clearing databases which house all merchants who have submitted any payments using the corresponding brand of payment card or where an Originator has submitted payments for this merchant.

Discussion of varying types of directories is exemplary and non-limiting. In some instances, a single aggregated directory could be employed, or one or more existing directories could be consolidated into a single merchant database/directory.

In one or more embodiments, billers use the exemplary service as follows:
- Billers register for service, identifying the types of payment methods accepted.
- Once the Consumer has registered and requested electronic bill presentment, Billers send data in biller's format (predefined)
- Service translates data to format needed and stores information.
- Billers may send a summary message which contains basic information such as account number, date due, minimum amount due, balance, etc. Billers may also send a .PDF (portable document format) image of the statement, which the service would store. Other file formats could be used in other embodiments.
- Billers request notification(s) to be sent to the payer.
- In a preferred but non-limiting approach, the biller also accepts payment from operator of a payment network 2008 either via an electronic bill payment system such as the MASTERCARD RPPS system or a card payment.
- Some embodiments of the service could offer value-add to the biller such as promotional links, marketing tag lines, etc. Some embodiments of the service could allow the biller to include a second image containing an ad (advertisement) or promo (promotion). The Consumer could click on a link to view the biller's advertisement. The advertisement may be an html (hypertext markup language) page with links to the biller site. Other formats could be used in other embodiments. Other documents could also be presented (e.g., Privacy Notices or other disclosures)

In one or more embodiments, Bill Pay Providers (BPP) use the exemplary service as follows:

Bill Pay Provider (BPP) registers for service

BPP adds line of code or other method to launch the service from its website.

BPP and exemplary Service authenticate BPP credentials and connection

BPP promotes the service to its Consumers

BPP may or may not charge Consumers for this service

The Service would provide metrics to the BPP on the use of the Service from the BPP site.

If the BPP is the payer's FI, the BPP could provide available payment methods to the service.

In one or more embodiments, Consumers use the exemplary service as follows:

Note that some of the exemplary features are 'enhanced' features for those users who are more adept at this type of usage. In at least some instances, a basic service is provided which is very user friendly and easy to set up. For more complicated features (or even the basic service), in one or more embodiments, a so-called "wizard" or some comparable alternative is provided to step the Consumer through setup.

Consumer logs into BPP

Consumer registers for service.

Consumer creates unique authentication credentials for service which is retained by BPP. This is preferably done only one time.

BPP uses this information during authentication with service so a Consumer has single sign on.

The service retains the unique authentication credentials for the Consumer.

With authentication to service, application program interface (API) or similar method is used to present service to Consumer via the BPP website. Note that this can be done in a 'white label' fashion so the service retains the same visual of the BPP.

Consumer locates and selects all his or her billers. Consumer is preferably able to search for billers in various ways, such as by zip code, by state, by name, by merchant category. Service preferably saves the Consumer profile to display 'new billers in your area' and the like.

Consumer adds payment method(s) he or she wishes to use for each bill. These could be demand deposit account (DDA), different brands of credit or debit cards (e.g., MASTERCARD brand, VISA brand, DISCOVER brand, AMERICAN EXPRESS brand). In some instances, an FI may restrict card types to their bins (bank identification number or the like) only if they choose to; this could be a preference.

Consumer selects amount he or she wants to pay for each bill; for example:
        Full bill amount
        Minimum amount due
        Fixed amount
        Amount based on controls (described elsewhere)

Consumer selects how he or she wants to pay for each bill; for example:
        Weekly
        Monthly
        Twice a month
        On demand
        Upon receipt of bill The Consumer is preferably able to assign unique payment preferences for each biller if he or she chooses, select a payment preference for some and a default payment preference for the rest, or assign one payment preference to all billers.

In one or more embodiments, Consumers are afforded a "one-click payment" option as follows:

The Consumer will be able to do a 'one click' payment if he or she chooses. (A so-called "wizard" or similar functionality can be provided in some instances.) This can be done, for example, by having the billers selected, assigning payment preferences to each biller, and identifying how he or she wants to pay. For example, if he or she pays each week, then the service will display a screen showing all bills due (or all bills due for the next week—Consumer preference), including the biller, date due, minimum amount due, balance, and payment method chosen.

The service will also provide a link for each bill which will allow the Consumer to view the full bill. The full bill would be shown in a separate pop-up window so the Consumer doesn't lose his or her 'bill pay page.'

The Consumer will be able to modify the amount and date for each payment on an ad-hoc basis, if he or she chooses. The system can be configured to ask if he or she wants to make a corresponding permanent change to his or her one-click setup.

The Consumer is preferably able to remove or add billers to this list on an ad-hoc basis, if he or she chooses. The system preferably asks if he or she wants to make a corresponding permanent change to his or her one-click setup.

The service will preferably have a 'click to pay all' button. When the Consumer clicks on that button, the service will generate all appropriate authorizations and payments for all bills shown.

The service preferably has some built-in intelligence. If it appears the Consumer wants to set up automatic payments to all billers, or apply payment methods to all billers, and a one or more are missed, the service preferably provides a message letting the Consumer know that some were missed and giving the consumer the chance to update those.

In one or more embodiments, Consumers are afforded a "recurring payments" option as follows (as noted elsewhere herein, Consumers are a non-limiting example of payers and comments regarding consumers are equally applicable to other payers unless indicated otherwise):

The service allows the Consumer to set up recurring payments for any or all of the bills. This could include a notification that a payment was submitted.

The recurring payment option allows controls to be set for each payment. For example, a Consumer may want a recurring payment made to his or her electric bill as long as it is under a certain amount. If it is over a certain amount, the Consumer may want to receive a notification instead.

The service would allow the Consumer to use controls to determine the payment method. For example, if the electric bill is under $100, the Consumer may want a DDA payment made. If it is over $100, the Consumer may want his or her Rewards credit card used.

The Consumer is preferably able to change payment method information easily. If he or she needs to change a card or account number (due to fraud, account change, or the like), the system should ask if he or she wants to apply this change to all payments set up for the previous account. Then with one click, all payments can preferably be updated. Similarly, if the Consumer removes a payment method, the system preferably prompts the consumer to apply a new payment method to any payments that had the old method.

Automated Billing Updater (ABU) and Recurring Payment Cancellation Service (RPCS) are preferably integrated into the service. See, for example, US Patent Publication 2009/0171839 of Rosano et al. entitled "Systems and methods for processing recurring payment transactions," the complete disclosure of which is expressly incorporated herein by reference in its entirety for all purposes; US Patent Publication 2010/0174644 of Kerola et al. entitled "Integrated File Structure Useful In Connection With Apparatus And Method For Facilitating Account Restructuring In An Electronic Bill Payment System," the complete disclosure of which is expressly incorporated herein by reference in its entirety for all purposes; and US Patent Publication 2008/0046364, of Hall et al., entitled "Apparatus And Method For Facilitating Account Restructuring In An Electronic Bill Payment System," the complete disclosure of which is expressly incorporated herein by reference in its entirety for all purposes.

In one or more embodiments, reporting and/or budgeting features are provided as follows:

The service will retain historical payment and statement information for a predetermined time period, such as a predetermined number of months.

The service will preferably provide download capabilities for all payments made for tax or other purposes. The Consumer will be able to choose download formats that can be imported and/or uploaded into common tools such as Excel® software (registered mark of Microsoft Corporation, Redmond, Wash., USA), Quicken® software (registered mark of Intuit Inc. Mountain View, Calif., USA), D&B® software (registered mark of Dun & Bradstreet International, Ltd. Short Hills, N.J., USA), and the like. In one or more embodiments, this includes commonly used accounts receivable and/or accounts payable systems by businesses.

The service preferably provides reports to assist the Consumer with budgeting.

The Consumer can set up his or her reporting preferences such as monthly budgeting, yearend budgeting, or budgeting by merchant category code (MCC) or merchant and/or biller type. For example, the Consumer may want to track all medical expenses, utility costs, and so on.

The Consumer can preferably define how to subtotal bill payments on the report. Similar to the bullet above, the Consumer can preferably identify subtotaling by merchant category or can preferably specify which billers to break out for subtotals. A more complex version of this aspect, in some instances, allows the Consumer to set up his or her own categories, and then assigns the categories to specific billers, and/or to assign categories when payment is made. This feature preferably allows the Consumer to bundle his or her payment reporting in any way he or she desires, In some instances, the Consumer is afforded the opportunity to synchronize ("sync up") the payments with his or her statement from the bank (if this is his or her banking institution; i.e., consumer's bank is also the BPP). The bank statement could indicate which payments were made through this service.

The Consumer can report his or her payments based on payment method by month, by year, by merchant category, and so on.

The service will preferably allow the Consumer to set up reminders for each or all billers. Reminders can be, for example, in the form of e-mail/SMS (short message service) messages or both.

Similar reporting can be provided to billers who wish to track the success of the service.

In one or more embodiments, one or more of the following additional features are provided:

The service will retain the Consumer's login information which it received from the BPP authentication. If the Consumer changes BPP, he or she can register at his or her new BPP using the same login and password for the service. The new BPP will retain this and use it for authentication. The service will recognize this and provide the Consumer with the same experience as the previous BPP.

The service will support both C2B (consumer to business) and B2B (business to business). It preferably functions as simply a Payer/Payee service. However, in some instances, an optional feature allows the Consumer to identify if the subject account or payment is a business account or business payment and allows additional data fields to be sent such as purchase order number. Note that if this information is provided in the electronic bill (e-bill) from the biller, it should be retained and returned with the payment to the biller.

The service also preferably has a Payment Velocity included for billers. This will help the Consumer determine when the payment should be made. Velocity can vary based on the payment method chosen.

An optional feature includes a payment posting notification from the biller to the Consumer. In other words, if the Consumer would like to know exactly when the payment was posted, either the biller sends a notification to the service or the service generates this notice based on the payment velocity. Notification to the Consumer could be done by a message when the Consumer logs into the service or notification could be via e-mail and/or SMS message.

In one or more embodiments, operator of payment network 2008 partners with one or more financial institutions (FI) in order to submit payments. By partnering with a FI who processes all payment card types, the service could offer a wide variety of payment methods. However, the BPP may want to only accept its own payment methods. Because of this, the service is preferably flexible with regard to the methods offered per BPP and per biller. In some instances, 'issuer push' and/or 'card to DDA conversion' options (see discussion of BPP-Initiated Card payment below) are employed for payments, expanding the functionality and offerings of this service. For example, if a biller is able to receive a card payment, a payment may be converted from a non-card payment channel to a card payment channel. For example the consumer specified a DDA account as a source of funds for a bill payment, but the consumer also has a debit card. The payment may be converted from a DDA payment to a debit card payment. In another aspect, a "reward" credit card payment may be converted to a DDA/ACH payment in a case where a payee does not accept card payments—yet the cardholder may still receive a reward. See, for example, US Patent Publication 2010/0100480 of Altman et al. entitled "Apparatus and Method for Bill Payment Card Enrollment," the complete disclosure of which is expressly incorporated herein by reference in its entirety for all purposes.

One or more embodiments of a Bill Presentment (BPT) Service offer participants the ability to provide electronic bill presentments to consumers. The service can have multiple levels of options and can allow a participant to customize how the service is used. These levels also allow participants to "start small" and gradually increase their offerings to their customers as they are able to enhance their own systems or as their business model/goals change.

With regard to Bill Presentment Processing, one or more embodiments accept, validate, aggregate, and route all message types required for a full Bill Presentment solution. This includes, in one or more embodiments, the following message types:

Bill Presentment Enrollment
Bill Presentment Enrollment Confirmation
Bill Presentment Enrollment Correction
Bill Presentment Enrollment Correction Confirmation
Bill Presentment Summary
Payment Receipt Notification (explained below)
Image File Delivery (explained below)

In at least some cases, the service focuses on Bill Pay Providers (BPP) and Consolidators, but the service does not exclude interested billers from participating.

In at least some cases, participants are able to request participation in the service, as well as manage their service profiles, via a graphical user interface (GUI). The Bill Presentment solution can be a stand-alone product, which means participants of the service do not necessarily need to send and receive financial transactions through a separate electronic payment system operated by the payment network operator 2008 (e.g., the MASTERCARD RPPS service) in order to participate in a Bill Presentment service offered by the payment network operator 2008 (but of course, they could do so).

In one or more embodiments, payment network operator 2008 retains history of all information routed to receivers, as is standard practice today.

Extensive Participant Database—Because a payment network operator 2008 (e.g., MasterCard International Incorporated) may have a biller directory, such as the RPPS Biller Directory, payment network operator 2008 may be able to reach many different potential participants since the same are likely already customers of a bill payment system such as the RPPS/Bill Payment Processing system. This puts payment network operator 2008 in the position of offering a more complete, accurate, and expansive set of participants. In one or more embodiments, payment network operator 2008 would offer a participating bill presentment biller listing as an additional service. The BPP (typically an organization offering online bill payment services) could use this as the biller list to present to their online bill pay customers. This listing would not only identify the various payment methods for the biller (EFT and appropriate brand(s) of credit and/or debit card); it would also identify billers who provide BPT (bill presentment) and the method available for viewing the bill. Methods could be provided via a hot link and could consist of an image file (more details below), a single sign on (SSO) link to the biller's site for the statement (more details below), or a simple link to the biller's login page.

Cross-marketing—Service from payment network operator 2008 can provide methods for billers to submit 'marketing taglines' in the BPT messages for presenting on the BPP's website. These taglines can encourage consumers to visit the biller website for additional promotions or offerings and thus would make the offering more attractive to billers.

Message Translation—The service preferably supports any message format for both the BPP and the Concentrator/Biller. Payment network operator 2008 provides translation services for those participants who already submit bill presentment messages. In other words, payment network operator 2008 utilizes the existing bill statement file (image file or data message) submitted by the sender and translates the information from the sender format into the payment network operator's proprietary format for bill presentment processing; then translates the information from the proprietary format into the format required by the receiver before routing to the receiver. This allows any BPP and any Concentrator and/or Biller to participate with less impact. In addition, payment network operator 2008 supports any industry standards and would also offer a payment network operator-standard message definition for those who currently do not recognize BPT messages.

Full Single Sign-On (SSO)—The service can allow BPPs the ability to offer online statement viewing for their customers without the need to log into the biller's site. Payment network operator 2008 can either facilitate this ability (partner) or develop a system that would provide secure authentication and encryption. Note that this aspect may require the participation of and impact to both the BPP and the Biller:

Facilitate—BPPs and Concentrator/Balers would request authentication and key encryption for SSO. Via a partnership, payment network operator 2008 would facilitate the delivery of the request as well as the response. Payment network operator 2008 would accept as much impact as possible in order to reduce impact for participants.

In-house—payment network operator 2008 would develop an in-house SAML/SSO or similar solution that allows any BPP or Concentrator/Billers to participate in SSO. This would be a simplified model to reduce impact for participants.

Payment network operator 2008 would partner with BPP regarding authentication of payer sign on.

Image Delivery—For participants who don't wish to incur the expense of SSO for direct or indirect biller connectivity, payment network operator 2008 would provide Image Delivery services. For billers who choose to deliver an image file of the consumer's statement (as opposed to supporting or allowing SSO), payment network operator 2008 would accept these image files. Payment network operator 2008 would then offer two methods of image delivery for the BPP. (It is assumed the BPP would provide a hotlink on the payer's bill pay website for those bills where an image file is available; other approaches can be used in other embodiments.)

1) The BPP could choose to receive the image files as part of the BPT message delivery. The BPP would then store the files and deliver to their customer upon request.
2) The BPP could establish a proprietary SSO with payment network operator 2008. Payment network operator 2008 would retain the images and present the image via a webpage upon request of the BPP. This would occur in a similar manner as a full SSO/SAML, or similar solution except the BPP is acting as the Identity Service Provider and ensuring the consumer's identity before securely requesting the Image File from payment network operator 2008.

Payment network operator 2008 preferably supports a wide variety of image file types, but would preferably ensure they are limited to standard, widely-used types to ensure BPPs are able to display them:

> File types may include JPEG, Bitmap, TIFF, GIF, MS Word, Rich Text Format, or Adobe Reader. (.jpg, .bmp, .tif, .gif, .doc, .rtf, and .pdf)
>
> Payment network operator 2008 would allow BPPs to choose the types of image files to accept.
>
> Payment network operator 2008 would allow billers to submit multiple image file types in order to accommodate multiple BPP needs.
>
> Payment network operator 2008 would offer image file transformation services which would transform an image file from one type to another in order to accommodate BPP needs.
>
> Payment network operator 2008 would retain the most current version of the image file and would also require a new Bill Summary message to accompany any new image file in order to ensure synchronization between the information.

Summary Message Creation—Some billers may have the ability to provide a billing statement file but are not able, or don't wish to create a separate Billing Summary message. For these billers, payment network operator 2008 could accept the biller's statement (in an agreed-upon, consistent format) and translate it into a summary message on behalf of the biller. This message could then be routed to the BPP.

Metrics Reporting—payment network operator 2008 may, as appropriate, retain information related to both BPT messages and payments received through the RPPS/Bill Pay system (or similar system). By identifying matches on these, payment network operator 2008 is able to provide metrics to both BPP and Concentrator/Billers related to how many online payments result from the BPT. Note, however, that in some instances, the payment date and amount won't necessarily reflect the billing due date and amount. Furthermore, payment network operator 2008 would not necessarily see all payments associated with the BPT.) This reporting could be used to show a level of success with BPT.

Expedited BPT—On occasion a concentrator/biller may have the need to expedite a bill due to error correction or some other reason. In some embodiments, payment network operator 2008 would offer one-day or same-day processing and delivery of BPT data and image files. This processing could be handled automatically via an identification method provided in the BPT file or message. In some instances, acceleration of the payment may be an option.

Payment Receipt Notifications—An added feature for billers participating in the service would, in some instances, allow the biller to submit a 'payment received' notification. This would provide a confirmation back to the payer stating the payment was received by the biller and posted to the payer's account. This message could have additional marketing taglines or links which would benefit the biller. This could reduce the number of customer service calls from payers looking for payment confirmation.

Email/SMS/Mobile BPT Notifications—Payment network operator 2008 could offer Bill Presentment notification services for billers and/or BPPs who are not able, or don't wish to perform this themselves and would be for payers who indicate the desire to receive such messages. By the biller providing an email address or SMS/Mobile number in the message, payment network operator 2008 would format an email/SMS/Mobile message and send it to the payer. The email/SMS/Mobile message would be customized based on the biller, the BPP, and the payer. The biller or BPP may choose to include marketing taglines or links in their message. In some instances, this service could also be provided for BPT messages where the BPP does not accept BPT but the payer still wishes to receive notifications. Utilizing a service from payment network operator 2008, the biller could still send an electronic notification to the payer with an attachment containing the full statement or a secure link to the full statement:

> By combining email/SMS/Mobile capabilities with Image Delivery methods, payment network operator 2008 could handle various combinations of information delivery.
>
> Email/SMS/Mobile notifications could also contain a link where the payer could elect to discontinue the paper bill.
>
> The email or Mobile message could contain prompts that would allow the payer to initiate or schedule a payment. This payment could be an immediate submission or could be scheduled for a future date. This payment request would be submitted to the BPP or the biller where normal payment submission processing would occur. This email/mobile payment request would require a previously established security identifier (PIN or other authentication method) that would protect the payer should the communication vehicle fall into the wrong hands (for example, the cell phone is stolen).

BPP-initiated Card Payment (Issuer Push): In some instances, new processing capability allows a BPP to initiate a card payment, as opposed to notifying the biller to initiate the card payment. Today the BPP can initiate an EFT payment directly to a system such as the RPPS system or another EFT processing center. However, for a card payment, this must typically be initiated from the biller/acquirer. With this new service, payment network operator 2008 would allow and facilitate the processing of card payments from the BPP.

In some instances, the BPP would accept the card information from the payer, as is done today. The BPP would perform an authorization on the payment. When the payment is scheduled to be sent, the BPP would use the same file it uses with an EFT payment, except it would include additional information for the card payment. This file would be sent to payment network operator 2008. Payment network operator 2008 would recognize this as a card payment and format a clearing message which would be sent to the clearing system for processing. By utilizing new custom data elements and internal processing, payment network operator 2008 would notify the issuer and acquirer of the payment and would perform settlement with the appropriate parties.

There would be occasions when the biller does not wish to receive a card payment; however the payer wishes to submit the payment via a card. In this instance, when payment network operator 2008 receives the card payment in the file from the BPP, payment network operator 2008 would generate a card transaction for the issuer Card processing and settlement for the issuer would process as normally provided for the issuer. The payment network operator 2008 would replace the card transaction with an EFT transaction for the biller, would generate a payment notification to the biller and would initiate an EFT settlement for the biller.

In some instances, payment network operator 2008 may offer so-called gateway processing for other brands of payment cards. This allows payment network operator 2008 to also accept card payment transactions for those payment schemes. In some instances, the same may be formatted and routed through a payment gateway.

In one or more embodiments, payment network operator 2008 may also function as a BPP. Payment network operator 2008 could develop a consumer front-end that allows consumers to initiate payments to billers. A directory such as the RPPS Biller Directory could be used to provide a very comprehensive list of billers, as well as payment methods accepted, and so on. Because payment network operator 2008 may have gateways for other payment schemes, the front-end may be able to accept not only EFT and card payments from the brand of card associated with payment network operator 2008, but could also accept other brands of card transactions based on acceptance from billers.

In some instances, working in partnership with an originating depository financial institution (ODFI), the payment network operator 2008 acting as a BPP would accept and track payment requests, provide Bill Presentment services, and initiate payments through RPPS or the like, a suitable global clearing and management system (GCMS), or a suitable gateway. Payment processing as described above in 'BPP-Initiated Card Payments' would be available with this service. Because payment network operator 2008 controls the processing, payment network operator 2008 could offer expedited payments for payment cards branded with the brand of payment network operator 2008 or EFT payments, restricted to those billers who could accept them.

As noted, in one or more embodiments, a ubiquitous industry offering is provided that allows subscribers to access the service regardless of a change in their respective service providers. In one or more embodiments, this is facilitated by having payment network operator 2008 (PNO) function as a data warehouse. The PNO receives the bill information from the merchant side and potentially translates it into a proprietary format of the PNO. Further, that data may be stored in a storage system of the PNO, and the PNO may be responsible for relating the bills for a specific consumer, grouping same together, and making same available even in the event that the consumer's point of entry to the storage system changes. For example, if the consumer currently accesses the information via ACME BANK on-line banking and now switched to BAKER BANK on-line banking, the historical data 599, the preference data 526 and the sign on data 522 (see FIG. 5) could still be available to the consumer despite the change in entry point. In one or more embodiments, the consumer does not access the storage provided by the PNO directly. The PNO can still understand and identify the appropriate information required by the consumer who is changing access points.

When the consumer is authenticated with his or her current service provider and enrolls in the service, a unique identifier of the consumer may be retained by the PNO, as appropriate, and associated with any of the billers, accounts, and the like of the given payer. When the consumer signs up with the new service provider, he or she provides the unique identifier to the PNO which uses same to pull up the appropriate information.

In other words, subscribers can access the service regardless of a change in their respective service providers, because of the performance or other facilitation of one or more steps by the PNO, based on data persisted within the network of the PNO.

Appropriate security should also be implemented between the PNO and one or more providers. For example, in the above example, it may be desirable to prevent further access by ACME BANK after the switch to BAKER BANK. The consumer (payer) may be afforded the opportunity to disable ACME BANK from obtaining access (in case ACME BANK retained any authentication information) and may then sign up with BAKER BANK. In some instances, a database may be provided within the network of the PNO, wherein the payer has a unique identifier and only a single provider is associated with such ID. When the payer signs up for BAKER BANK, ACME BANK is no longer associated with the unique identifier. However, in some cases, it is desirable to allow a person to pay from multiple providers (for example, someone who banks with multiple banks). This could also be significant where two people share an account. Thus, in some cases, multiple providers could be associated with the aforementioned ID. In other cases, a suitable authorization process can be employed. It will be appreciated that it may not be desirable to limit a person to a single entry point.

In the authorization approach, in some cases, a preference or profile 526 is populated upon initial enrollment. A single-sign-on experience may be afforded in some cases. Once the payer's service provider authenticates him or her, the authentication with the PNO also occurs, and the PNO relies on the service provider to carry out this first level. The various databases in block 520 can, in at least some instances, be under the control of a payment network operator 2008 (see comments elsewhere about various alternatives for database 522).

Figure 5:
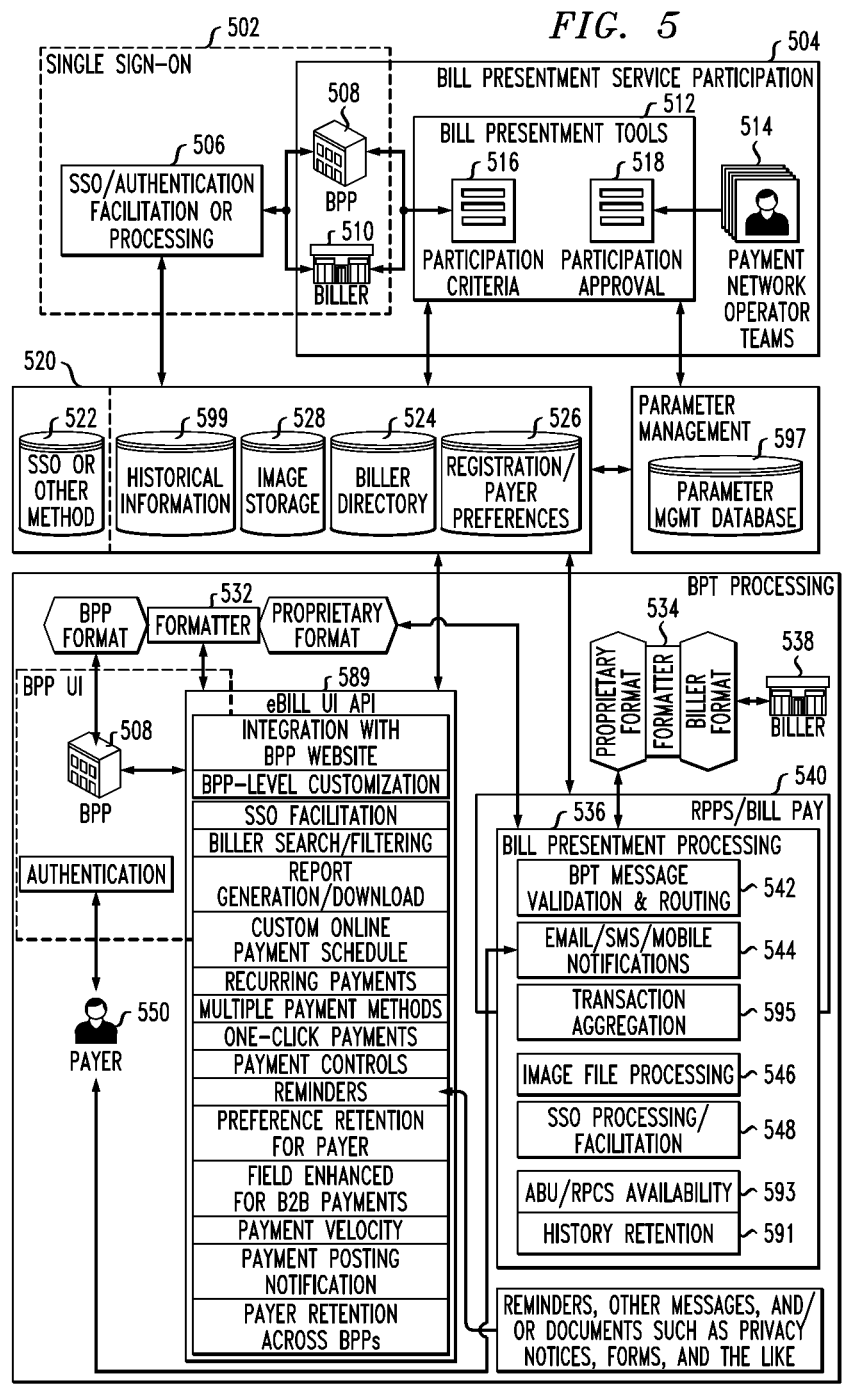
FIG. 5 depicts an exemplary system block diagram.
Figure 6:
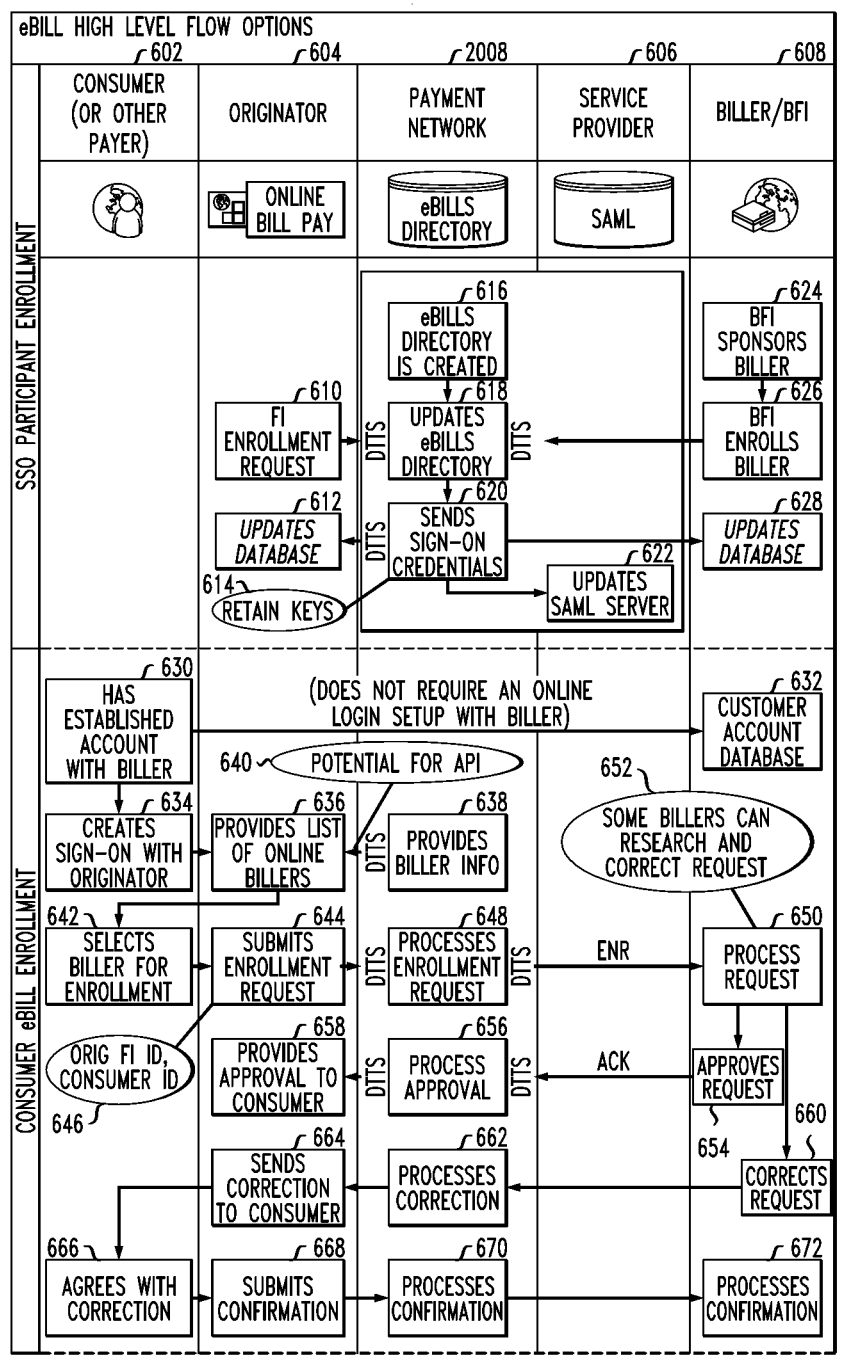
FIGS. 6 and 7 present an exemplary data flow diagram and flow chart.
Figure 7:
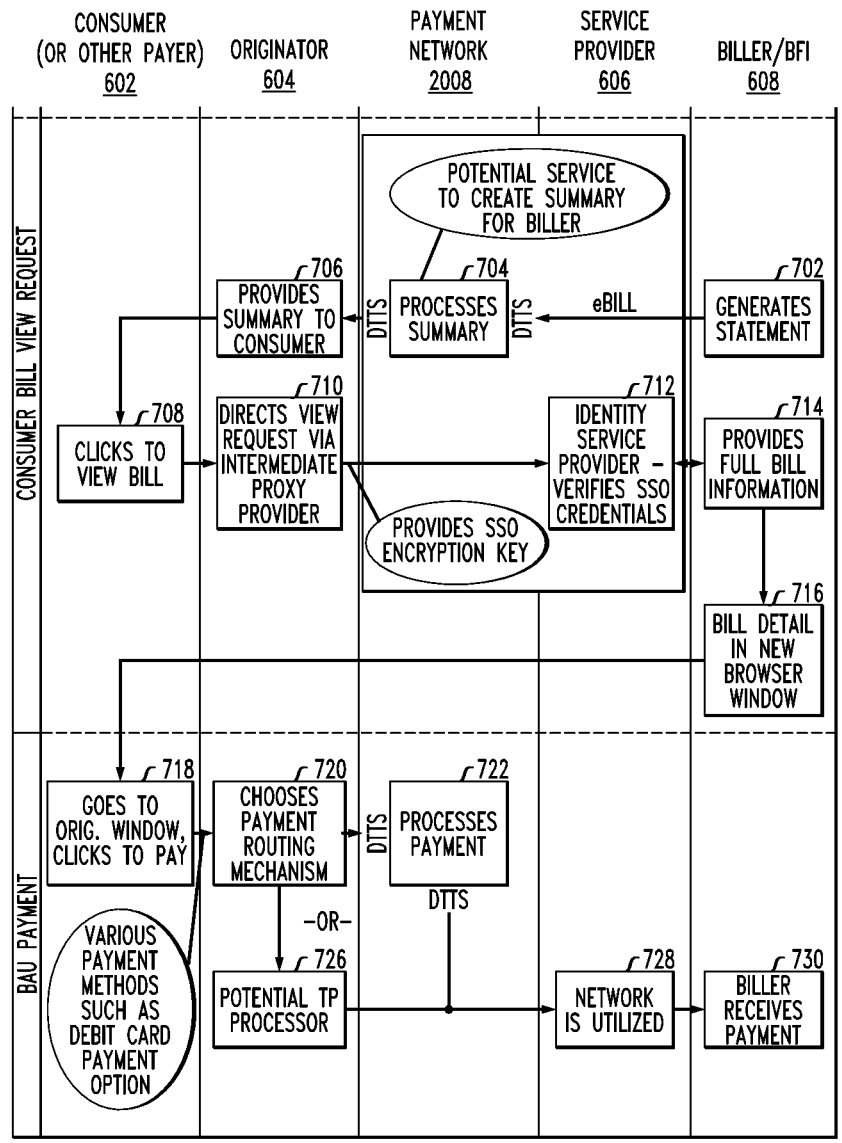

Thus, in addition to ubiquity and allowing subscribers to access the service regardless of a change in their respective service providers, one or more embodiments allow access from multiple entry points (i.e., via different bill payment providers or multiple accounts with the same bill payment provider). With reference to FIGS. 5-7, it will be appreciated that BPPs are equivalent to originators (although the skilled artisan will appreciate that the payer may sometimes interface with a customer service provider which may or may not be an ODFI). Furthermore, billers 510, 538, 608; BPPs 508, 604; payers 550, 602; and the like are shown as single entities for avoiding drawing clutter but are all representative of multiple entities. A payer can be with many BPPs, any one BPP can have multiple payers, and so on. This could occur in the case of a joint account, or where people do business with multiple banks.

Element 606 is an EFT service provider. Furthermore, a SAML (security assertion markup language) server is a non-limiting example of a technique for secure Internet SSO. In addition, SAML or similar services (providing a database for SSO credential retention and authentication) may be provided by another provider besides the provider in block 606 and even by the PNO. An API is just one non-limiting example of an interface, a consumer is one non-limiting example of a payer, and the RPPS system is a non-limiting example of an electronic bill payment system.

As noted, in one or more embodiments, payers are afforded the ability to pay, via establishment of preferences, a myriad of bills with one instruction (such as one click, one button, etc.). For example, in some instances, for all of the bills that a given payer decides to pay through a given provider, default preferences are set up per bill; the same may include, for example, the payment method, the desired payment date, payment amount, and so on; a single button may be provided when the bills are received and the same may be labeled, for example, "click to pay all." Some or all of such preferences may be stored, for example, in database 526, with processing in block 536.

The bill pay GUI may be made available in the form of a web site hosted by the PNO. With reference to FIG. 5, in some instances, consumers or other payers would not log directly onto same, but rather would access same through their service provider, as seen at 508, 550. The commercial participants such as the bitters and BPPs may have direct web (or other) access to the GUI, as at 508, 510, 512. The SSO database 522 could be operated by the PNO, or by a service provider; by way of example and not limitation, a service provider who provides EFT services. Bill presentment processing block 536 is preferably provided in the form of a software platform running on one or more servers by, or on behalf of the PNO. Another platform 540 is preferably provided in the form of a software platform running on one or more servers by, or on behalf of, the PNO, and provides bill payment services (RPPS service is a non-limiting example; in some instances, software platform 540 might implement techniques such as those in the aforementioned U.S. Provisional Patent Application Ser. No. 61/438,106, or other techniques of other electronic bill payment systems). Platforms 536, 540 are preferably integrated and interface with each other. Formatters 532, 534 allow the BPP and the biller to use their own in-house file formats; the same are sent to the PNO and converted to the PNO's format (which may be proprietary) by formatters 532, 534. These formatters also can carry out the reverse process, changing from the PNO's proprietary format to the appropriate format for the biller or BPP. Formatters 532, 534 may be implemented, for example, by suitable software modules under control of the PNO or a third party service bureau.

Transaction aggregation block 595 refers to a situation where multiple transactions are coming from multiple originating bodies and are processed and aggregated per receiving body; in some cases, with multiple payments coming from multiple providers; the same may be processed and aggregated per biller or per concentrator. Image file processing 546 refers to images of the billing statements. Block 589 lists one or more functions that may be provided by the user interface. Note that the "reminders" block is exemplary of a variety of messages and/or documents such as privacy notices, forms, and the like that the payer may receive in the same manner as a bill (e.g., via the UI, originator, and so on). Non-bill messages, forms, and/or documents typically do not require a payment response.

As noted, one or more embodiments support the payment with cash, check, debit card, credit card and EFT. A consumer or other payer who wishes to pay with cash or check may utilize a service provider having a brick-and-mortar walk-in facility, wherein cash or a check may be physically tendered. For a card payment, appropriate payment card account information may be stored; for example, in database 526. For an EFT, appropriate demand deposit account information may be stored; for example, in database 526. Card payment and EFT payment methods are also available to the payer in the walk-in facility. In some instances, database 526 may not have this level of detail, but may only store the available options, but specific demand deposit account information and/or payment card account information may be stored by the BPP instead. In this latter case, when switching BPPs, the payer may have to re-enter the demand deposit account information and/or payment card account information (unless the BPP the person is switching to allows a decoupled payment account, i.e., not at their financial institution). In one or more embodiments, the PNO makes the preferences available to the financial institution(s). The consumer establishes the preferences and detailed account information with the BPP. However, in some cases, all the details are stored by the PNO; for example, in database 526. In such a case, when the consumer or other payer makes a payment instruction, consider the case where the BPP is not a financial institution, but is merely a consumer-facing service. In such a case, it will be appreciated that the "one-click" preferences are preferably stored in a centralized location such as database 526, such that, no matter where the person logs in, the preferences can be delivered. Thus, in conclusion, in some instances, all the preference information, including detailed payment card and/or demand deposit account information, is stored in the database 526; in other cases, some may be stored in database 526 and some elsewhere, for example, with the BPP(s).

In some instances, an electronic repository of bills is set up in a central location and is accessible to the financial institutions, which come in on their own (not via any request) to access and obtain their customer's bills.

Turning again to FIG. 5, SSO is depicted at 502, with BPP 508 and biller 510. Each entity can make use of SSO authentication facilitation or processing 506, to interface with databases 524, 526, 528, and/or 599 in block 520. An SSO or similar database is shown at 522. BPP 508 and biller 510 seek participation in bill presentment service 504 as at 516 using tools 512. Teams 514 from the PNO evaluate and approve same as at 518. Appropriate parameter management functionality may be provided at 597.

Note that with respect to FIGS. 5-7, 9, and 10, unless expressly stated otherwise or clearly apparent from the context, "Biller" should be understood to be a Biller and/or BSP and "BPP" should be understood to be a BPP and/or CSP or something similar, inasmuch as a service provider could be involved.

Payer 550 accesses BPP 508 with a suitable UI and after suitable authentication. UI 589 may provide many features as indicated. Formatters 532, 534 and platforms 536, 540 are discussed elsewhere, as is biller 538. Platform 536 may provide, for example, validation and routing 542, notifications 544, aggregation 595, image file processing 546, SSO 548, ABU/RPCS or similar functionality 593, and/or history retention 591.

The skilled artisan will of course appreciate that the BPP 508 is also representative of a CSP and that biller 538 may in some instances use a BSP as an intermediary.

With reference to FIGS. 6 and 7, note consumers or other payers 602, originators or BPPs 604, PNO 2008, service provider 606, and billers or BFIs 608. The skilled artisan will appreciate the BFI stands for biller financial institution. In SSO participant enrollment, entity 604 requests enrollment at 610; a directory is created by PNO at 616, and the same is updated at 618. A BFI may sponsor a biller as at 624 and may enroll same at 626. PNO sends sign-on credentials at 620 and entities 604, 608 update their databases at 612, 628. Entity 606 or the like updates the SAML server or the like at 622. PNO may retain keys where appropriate as at 614.

DTTS means Data Translation and Transformation; basically converting a file from one format to another utilizing a data map and rule set.

Consumer 602 may have an established account with the biller as indicated at 630 and may be present in a customer account database as at 632. The consumer 602 creates a sign-on with entity 604 at 634 and a list of online billers is provided at 636. The consumer selects a biller for enrollment at 642. Entity 604 submits an enrollment request at 644 (may include, e.g., the originating FI's ID and a consumer ID, as at 646), and PNO processes same at 648. Note that for block 636, biller information may be obtained from PNO at 638 via an API 640 or the like. Entity 608 processes the request at 650 (optionally with research and correction capability 652). Approval is indicated at 654 and the same is processed by the PNO at 656. Entity 604 provides the same to the consumer at 658.

Optional correction is shown at 660, with processing by PNO at 662 and the same sent to the consumer by entity 604 at 664. If the consumer agrees at 666, confirmation is submitted at 668, and processed at 670 and 672.

In FIG. 7, entity 606 generates a statement at 702 which may be entered into a summary form 704 by PNO and provided to the consumer at 706 by entity 604. The consumer clicks to view at 708. This request is directed by entity 604 at 710 with credential verification by entity 606 or the like at 712. Full bill information may then be provided as at 714; for example, in a new browser window as at 716. The consumer at 718 goes to the original window and clicks "pay" and entity 604 picks a payment routing mechanism at 720 (many options, including debit card, could be available). PNO may process the payment at 722, or as at 726, a third party may be employed for an EFT network or the like at 728; payment is received at 730.

Figure 9:
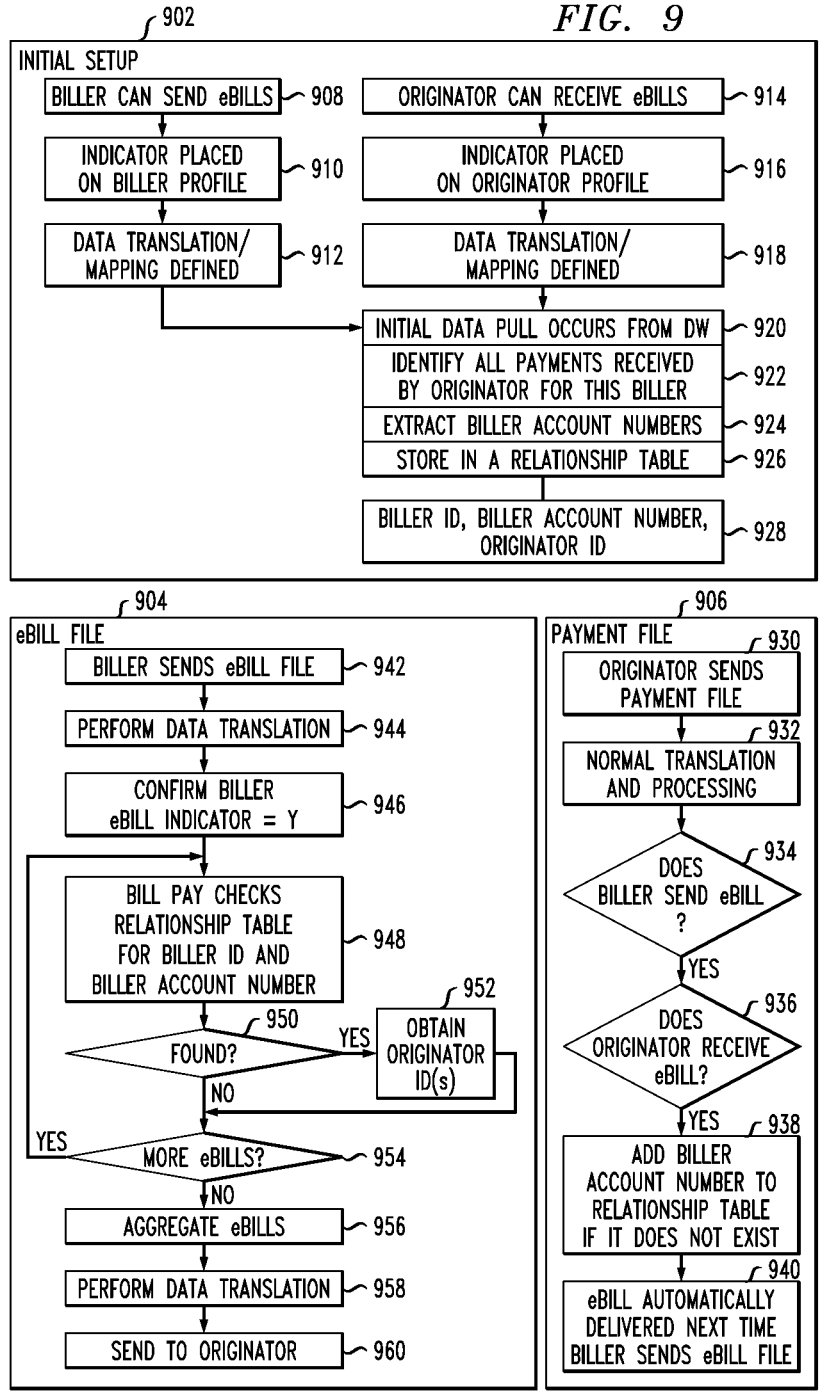
FIG. 9 depicts exemplary enrollment techniques.

FIG. 9 shows an option wherein no payer enrollment is required. In this instance, originators/BPPs must identify that they are able to receive e-bills, as in step 914, and billers must identify that they are able to send e-bills, as in step 908. Any payers utilizing the BPP service automatically participate if the BPP uses the PNO 2008 to process the payment. Appropriate accommodation can be made where an originator wants to send e-bills but does not want to send the payment to the PNO. In initial setup 902, it is determined that a biller can send e-bills at 908, with an indicator placed on the biller profile at 910. Data translation and/or mapping are defined at 912. It is determined that the originator can receive e-bills, as at 914, with an indicator placed on the originator profile at 916. Data translation and/or mapping are defined at 918.

Given the above discussion of FIG. 5, the skilled artisan will appreciate that steps 908, 910, 914, and 916 can be carried out by suitable program instructions included in platforms 536 and/or 540 with storage of the appropriate indicators in a suitable data store; for example, at 524 and/or 526. Interaction with platforms 536 and/or 540 can be facilitated with a suitable user interface as described elsewhere, such as UI 589. Furthermore, translation and mapping functionality can be implemented, for example, in blocks 534 (for communications to and from the billing entity) and 532 (for communications to and from the consuming entity).

Initial data pull from the data warehouse is at 920; in 922, identify all payments received by originator for this biller (i.e., look up payments between the two parties of interest). In 924, extract biller account numbers (i.e., for those instances where a payment was submitted between the two parties of interest) and in 926 store them (and any other appropriate data such as, by way of example and not limitation, Biller ID and Originator ID) in a relationship table (e.g., in block 526) as at 928. The skilled artisan will appreciate that "DW" in this context stands for "data warehouse" (e.g., historical information 599).

An e-bill file aspect is at 904. The biller 538 sends the file at 942; data translation is carried out at 944 (e.g., in block 534), and a confirmation is made at 946 that the biller's e-bill indicator is "Y" (for example, suitable program instructions included in platforms 536 and/or 540 check a data store such as 526 and/or 524 to determine whether a "Y" indicator was placed at step 910). Given the teachings herein, the skilled artisan will appreciate that exemplary contents of the e-bill file could include the Biller Account number and the amount due (and in some cases the e-bill file does not include an identification of the corresponding originator). The bill pay platform 540 may check table 928 (stored, for example, in block 526) for the biller ID and account number, as at 948. If found ("Yes" branch of 950), platform 540 proceeds to 952 and obtains originator ID(s) and proceeds to 954. The skilled artisan will appreciate, given the teachings herein, that multiple originator IDs could be present, for example, if the consuming entity pays the biller for the Biller Account number in question with multiple methods of payment (say, from two different banks). If not found, see in 954 if there are more e-bills. If yes, go back to 948. If no, aggregate e-bills in 956 (i.e., those destined for the same originator), translate in 958, and send to originator in 960.

With respect to block 954, note that a number of different bills might be received from a given Biller—e.g., multiple bills in a single file, or multiple files each with a single bill, or multiple files, at least some of which might contain multiple bills. With respect to block 956, many different billers each might have one or more bills destined for the same originator. Step 956 can be carried out, for example, with platform 536 (see, e.g., sub-block 595); and step 958 can be carried out, for example, with block 532.

It should be noted that routing of a bill for the same Biller Account number to multiple originators could occur, in some cases, where a consuming entity enrolls in an electronic billing service through multiple originators.

A payment file aspect is at 906. The originator sends the payment file at 930 with normal translation and processing at 932 (e.g., using platform 540 after suitable translation in block 532). If the biller sends an e-bill as per 934 (i.e., indicator set to "Y" in step 910; stored, e.g., in data stores 524 and/or 526), see if it can be received by the originator as at 936 (i.e., indicator was set to "Y" in 916). If yes, add the biller account number to table 928 created in step 926 if not already there, as at 938, and automatic delivery will take place, as at 940, when the biller next sends an e-bill file. Furthermore, in some cases, even if the consumer has not yet indicated a desire to participate in e-billing, the information can be stored for future use, in lieu of automatic delivery.

Figure 10:
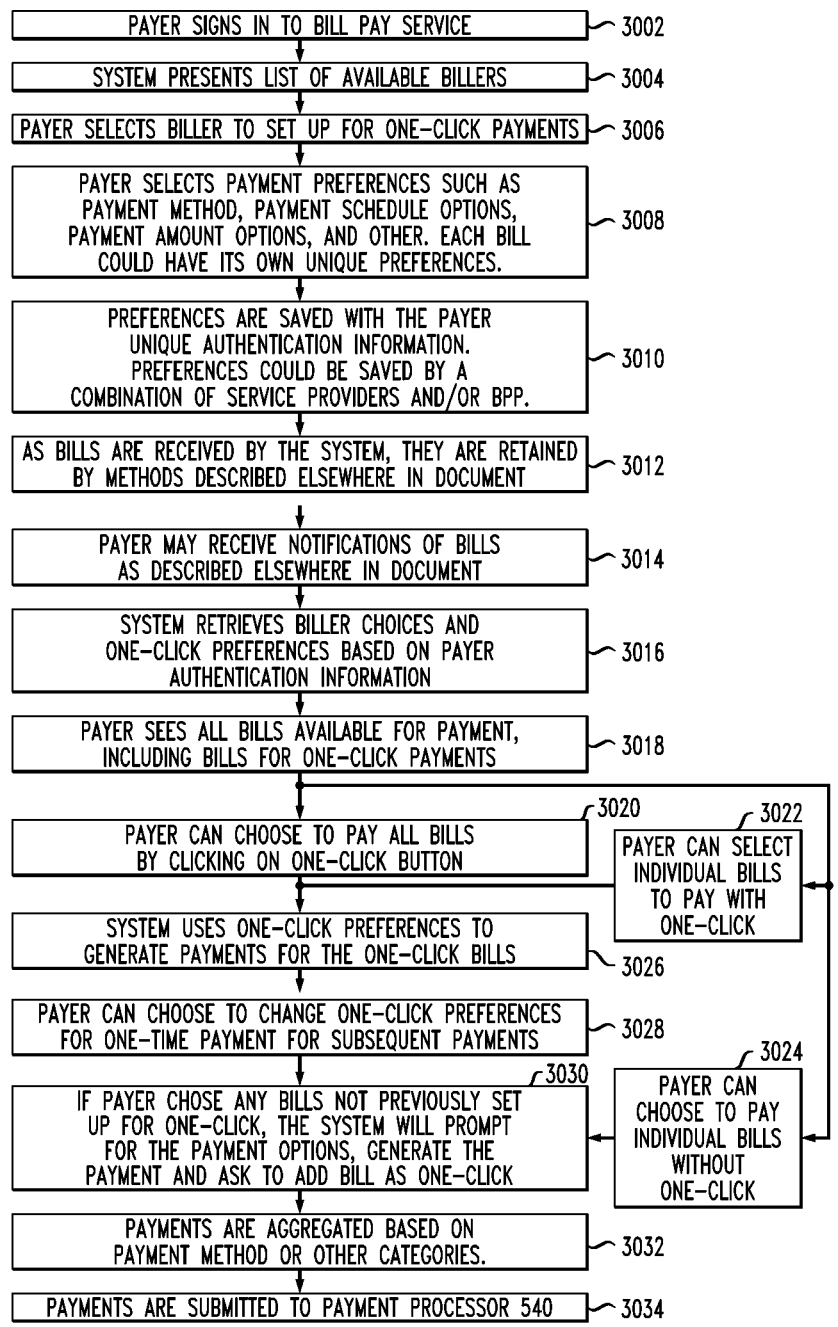
FIG. 10 depicts an exemplary "one click" payment aspect.

FIG. 10 shows the payer signing in at 3002 (the skilled artisan will appreciate, given the discussion of FIG. 5, that a suitable user interface 589 could be employed, with appropriate authentication). The system presents a list of available billers in 3004 (the skilled artisan will appreciate, given the discussion of FIG. 5, that this could be carried out, for example, via user interface 589 interfacing with platform 540 and/or platform 536, using data in data store 524, for example). The payer 550 selects biller(s) to set up for one-click payments in 3006. Preferences are selected in 3008 and saved in 3010 (for example, in data store 526 (data store 526 is typically operated by PNO 2008 or a vendor acting under its direction)). The payer will typically employ UI 589 for these steps, with appropriate interaction with platforms 536 and/or 540. Note that each bill can have its own unique preferences; for example, pay mortgage in full every month using payment source "A"; make minimum payment each month for credit card "X" using payment source "B"; and so on.

As bills are received, as per 3012, they are retained as described elsewhere (for example, in some embodiments, in the image store 528). Notifications may be received, as described elsewhere, as at 3014 (see for example block 544).

In 3016 (e.g., after appropriate data has been save during enrollment), based on payer authentication information, biller choices and one-click preferences are retrieved. All the bills are visible to the payer at 3018. All bills can be paid with one-click, at 3020; some can be paid in this manner, as at 3022, or one-click may not be used, as at 3024. In either 3020 or 3022, the system uses the one-click preferences as 3026; the payer may be given a chance to change these at 3028. If any bills not set up for one-click are chosen, the system may prompt the user appropriately, as at 3030. Block 3024 also leads to block 3030. Aggregation is depicted at 3032 with payment at 3034. These steps can be carried out, for example, by platform 536 interfacing with UI 589 and data stores such as 524, 526 (except that actual payment is typically carried out by the platform 540).

An overall system may include additional servers, clients, or other computers of other entities, interconnected by one or more networks as discussed herein.

Given the discussion thus far, it will be appreciate that, in general terms, an exemplary method, according to an aspect of the invention, includes the step of providing, under control an operator of a payment processing network, a bill presentment service (such as provided by platform 536) wherein bills received from a plurality of billing entities are made available to a plurality of consuming entities via a plurality of consuming entity service providers. In this regard, note that as used herein, including the claims, "under control of" is intended to include the case where the service is provided solely by the operator of the payment processing network as well as the case where the service is provided by the operator of the payment processing network and one or more vendors operating under the direction and control of the operator of the payment processing network—by way of a non-limiting example, consider the case where a vendor acts as a service provided 606 to provide a SAML server. Furthermore, as used in the context of the claims, an operator of a payment processing network includes any centralized electronic bill payment network such as RPPS or BILL PAY and/or an entity that operates a network which facilitates payments via payment cards and similar instruments (entity 2008 is a non-limiting example of the latter). Capability such as that associated with network 2008 may be useful where the entity also affords participating consumer entities the option to make payments using payment card type techniques (such as card not present or card on file type payments).

As used herein, including the claims, "consuming entities" are defined as entities such as consumers and/or businesses that buy goods and/or services. As used herein, including the claims, "billing entities" are defined as entities such as BSPs, billers, BFIs, and/or concentrators. As used herein, including the claims, "consuming entity service providers" are defined as entities such as BPPs (which can sometimes be originators (ODFIs)) and/or consolidators. Furthermore, while in one or more embodiments as depicted in the figures, certain named entities may be illustrative of other entities (e.g., data flows from biller 538 in FIG. 5 could be from a BSP), in the claims, the defined terms consuming entities, billing entities, and consuming entity service providers are used where generality is desired and references to any more specific entities are intended to be specific.

An additional step includes storing in a database such as database 526, accessible to the operator of the payment processing network, registration and preference data pertaining to each of the plurality of consuming entities. As used herein, including the claims, "accessible to" means that the database is controlled by the operator of the payment processing network or by one or more vendors operating under the direction and control of the operator of the payment processing network.

A further step includes allowing a given one of the consuming entities which has switched from a first one of the consuming entity service providers to a second one of the consuming entity service providers to access the bill presentment service via the first one of the consuming entity service providers, prior to the switching, and via the second one of the consuming entity service providers, subsequent to the switching, using the stored registration and preference data. A subset of the registration and preference data pertains to the given one of the consuming entities. The given one of the consuming entities is allowed to access the bill presentment service via the second one of the consuming entity service providers without having to take any updating action as to at least a portion of the subset of the registration and preference data.

In some instances, an additional step includes providing, by the operator of the payment processing network, at least a portion of a bill payment service (such as that provided by platform 540 in FIG. 5) wherein the consuming entities are afforded an option of paying the bills from the plurality of billing entities. In such cases, the aforementioned at least a portion of the subset of the registration and preference data includes payment preference data specifying how the given one of the consuming entities wishes to pay at least two of the billing entities (understood to include paying billers directly or through intermediaries).

In some cases, an additional step includes affording the given one of the consuming entities an option to pay the at least two billing entities with a single command, in accordance with the payment preference data (as described, for example, in connection with the "one-click" option).

As noted elsewhere, in some instances, the payment preference data specifies, for each of the at least two billing entities, a form of payment and an amount of payment (as discussed above, amount does not necessarily mean an actual numerical amount of currency, but could also be specified as, for example, the entire bill, the minimum payment, a percentage, a fixed amount, and the like).

As noted elsewhere, a number of different forms of payment are possible. Thus, in some cases, an additional step includes affording the given one of the consuming entities an opportunity to specify, in the payment preference data, at least payment card payment and electronic funds transfer payment (for example, from a demand deposit account). In such cases, a further step can include affording the given one of the consuming entities an opportunity to specify, in the payment preference data, at least one of cash payment and check payment. In some cases, these could be undertaken at a 'brick and mortar" facility (for the avoidance of doubt, understood to include any physical as opposed to virtual location, regardless of construction materials used).

As noted above, in some instances, conversion of the form of payment can be undertaken. Thus, in some cases an additional step includes the operator of the payment processing network facilitating an electronic funds transfer to payment card conversion and/or the operator of the payment processing network facilitating a payment card to electronic funds transfer conversion.

In another aspect, the aforementioned at least a portion of the subset of the registration and preference data may include unique login data for the given one of the consuming entities.

In a further aspect, in some instances, an additional step includes the operator of the payment processing network providing, as a portion of the bill presentment service, a user interface (UI) configured to permit the plurality of consuming entities to view the bills. The user interface may be offered as a service to at least some of the consuming entity service providers. See, for example, discussion above of Ebill UI API 589 and the BPP UI of BPP 508.

As noted, in some instances, the operator of the payment processing network may function as one of the consuming entity service providers; at least to a subset of the consuming entities. Thus, the consuming entity could be switching between two different consuming entity service providers other than the operator of the payment processing network, from a consuming entity service provider other than the operator of the payment processing network to the operator of the payment processing network as a consuming entity service provider, or from the operator of the payment processing network as a consuming entity service provider to a consuming entity service provider other than the operator of the payment processing network.

As indicated elsewhere, in some cases, an additional step includes the operator of the payment processing network translating the bills received from the plurality of billing entities into at least one format understandable by the plurality of consuming entities; indeed, a variety of translation functionality may be carried out—for example, using blocks 532 and 534.

In some embodiments (e.g., single sign on or SSO embodiments), an additional step includes the operator of the payment processing network facilitating the consuming entities viewing statements of the plurality of billing entities online without having to sign on to web sites of the plurality of billing entities. That is, the consuming entity is able to visit the billing entity's web site without having to re-do secure sign-in. Refer also to the above discussion and note that as used in the claims, "facilitating the consuming entities viewing statements of the plurality of billing entities" is intended to cover both the "Facilitate" and "In-house" options.

In another aspect, the operator of the payment processing network may facilitate the consuming entities viewing image files of statements of the plurality of billing entities, as per block 546, for example.

In one or more embodiments, an additional step (see, e.g., FIG. 6 and corresponding text) includes the operator of the payment processing network facilitating enrollment of the plurality of billing entities, the plurality of consuming entities, and the plurality of consuming entity service providers in the bill presentment service. In such cases, at least a portion of the registration and preference data is typically provided during the enrollment.

In some instances (for example, as described above with respect to FIG. 9), a "transaction tracking" technique can be employed wherein the providing, storing, and allowing steps are carried out without enrollment of the plurality of consuming entities. In such instances, additional steps can include, as at 908, receiving from the plurality of billing entities an indication of ability to send the bills in electronic form; as at 914, receiving from the plurality of consuming entity service providers an indication of ability to receive the bills in electronic form; and tracking a plurality of transactions to identify those of the plurality of consuming entities for whom the bills in electronic form are intended; for example, as at 920-928. Transaction tracking is preferably undertaken in instances wherein the operator of the payment processing network provides at least a portion of a bill payment service wherein the consuming entities are afforded an option of paying the bills from the plurality of billing entities.

Thus, in one or more embodiments, the PNO employs one or more techniques for identifying recipients of ebills received from Billers. A Biller would not necessarily be required to identify where the ebill needs to be delivered. Instead, this information would be tracked by retaining information from enrollments, payments, and potentially information sent by the Originator.

By analyzing past payment history, the PNO can identify the Originator that sends in a payment on the Biller's account. When the PNO processes the consumer enrollment, it can retain the Originator who submitted the enrollment. An Originator may want to receive ebills but not be committed to sending payments. The Originator can send the PNO a list of Biller's accounts on which they want to receive ebills. Different methods can determine different pricing. For Originators who retain and return ebill information, this can guarantee a 'clean' payment. The PNO might need to provide trace or other information in the ebill. The Biller could potentially send the PNO all ebills, rather than trying to determine which the PNO would process. The PNO would make the decision on which to send through and charge the Biller appropriately. The PNO can potentially include Account Conversion information in the ebill transaction, notifying the Originator of an account number change. This function could be integrated with several other functions, such as a centrally located repository of consumer preferences 526.

In one or more embodiments, provide a 'relationship' database and/or storage that identifies Biller ID, Originator ID, and Biller Account number. Allow a Biller to indicate they will send ebills. Allow an Originator to indicate they will receive ebills. When these indicators are applied, analyze historical payment information for transactions between these two customers. When found, retain the Biller account numbers in the relationship table. Allow data translation setup related to ebill for both Biller and Originator. When an chill file is received from a Biller, validate the Biller participates in the service before processing. For each chill received from the Biller, determine if the PNO has a receiving Originator on file. If yes, send the chill to the Originator. If the Originator is receiving the chill, determine if the Originator also sends payments for this Biller Account. This may determine a pricing difference. For each payment transaction received from an Originator, determine if the Biller sends chill. If yes, add the information to the relationship table, if it does not exist.

Metrics could be reported on this information. In some cases, this might initially be internal reports to determine the success of the program by identifying an increase in the accounts for ebill, as well as an increase in those accounts for which the PNO receives payments.

With reference to FIG. 9, in some instances, transaction tracking can include storing data indicative of the ability to send the bills in electronic form, as at 910; and storing data indicative of the ability to receive the bills in electronic form, as at 916. In such instances, the tracking can include, as at 926, storing, in a relationship table, based on historical data, billing entity identifiers, billing entity account numbers, and consuming entity service provider identifiers. Transaction tracking can further include, as at 950 and 952, upon the operator of the payment processing network obtaining a bill from a given one of the billing entities in electronic form, consulting the relationship table to obtain at least one of the consuming entity service provider identifiers corresponding to a given one of the billing entity identifiers and a given one of the billing entity account numbers. An additional step in such instances can include, as at 960, making the bill from the given one of the billing entities available to at least one of the consuming entities corresponding to the at least one of the consuming entity service provider identifiers.

In some instances, consulting the relationship table includes consulting the relationship table to obtain at least a second consuming entity service provider identifier (as indicated by the "(s)" in step 952) corresponding to the given one of the billing entity identifiers and the given one of the billing entity account numbers. In such instances, a further step can include making the bill from the given one of the billing entities available to at least a second one of the consuming entities corresponding to the at least second consuming entity service provider identifier.

In some cases, the tracking further includes, as at 934-938, examining payment files from given ones of the consuming entity service providers to identify billing entity account numbers to be added to the relationship table if not already present therein, and adding the billing entity account numbers to the relationship table if not already present therein. In such cases, optionally, as at 940, an additional step includes automatically electronically presenting future electronic bills associated with the billing entity account numbers added to the relationship table. In other instances, as noted elsewhere, the data may just be retained for possible future use.

As noted, in some cases, an additional step includes (typically, the PNO) notifying at least some of the plurality of consuming entities when at least a portion of the bills are available for viewing; for example, via an electronic mail, a text message, and/or a telephone call.

On the other hand, in some instances, at least some of the plurality of consuming entity service providers periodically check with the operator of the payment processing network to determine when at least a portion of the bills are available for viewing; in such cases, the PNO may not undertake any notification.

As also discussed in the exemplary system and article of manufacture details, in some instances, the method can include the additional step of providing a system, wherein the system includes distinct software modules. Each of the distinct software modules is embodied on a tangible, computer-readable recordable storage medium, and the distinct software modules include a bill presentment platform module (e.g., module to implement block 536), a database module (e.g., a module to implement 520 or any portion thereof), and a user interface module (e.g., a module to implement 589). The step of providing the bill presentment service can then be carried out by the bill presentment platform module executing on at least one hardware processor, and the step of storing the registration and preference data can be carried out by the database module executing on the at least one hardware processor. Furthermore, the step of allowing the entity to access the service can be carried out, at least in part, by the user interface module executing on the at least one hardware processor. In many cases, at least the user interface is likely to execute on a different hardware processor than does the bill presentment platform module and the database module.

Furthermore, given the discussion thus far, it will also be appreciated that, in general terms, another exemplary method, according to another aspect of the invention, includes the step of providing, under control of an operator of a payment processing network, a bill presentment service (e.g., such as that facilitated by platform 536) wherein bills received from a plurality of billing entities are made available to a plurality of consuming entities. An additional step includes providing, by the operator of the payment processing network, at least a portion of a bill payment service (such as that described with respect to platform 540, for example) wherein the consuming entities are afforded an option of paying the bills from the plurality of billing entities. A further step includes storing in a database, such as database 526, by the operator of the payment processing network, registration and preference data pertaining to each of the plurality of consuming entities. At least portion of the registration and preference data includes payment preference data specifying how a given one of the consuming entities wishes to pay at least two of the billing entities (again, payment should be understood as including direct or indirect payment, unless expressly stated to the contrary). Yet a further step includes affording the given one of the consuming entities an option to pay the at least two of the billing entities with a single command, in accordance with the payment preference data (for example, as described elsewhere with respect to the "one-click" option.

Even further, given the discussion thus far, it will also be appreciated that, in general terms, still another exemplary method, according to still another aspect of the invention, includes the step of providing, under control of an operator of a payment processing network, a bill presentment service wherein bills received from a plurality of billing entities are made available to a plurality of consuming entities via a plurality of consuming entity service providers; and obtaining, by the operator of the payment processing network, a given one of the bills from a given one of the billing entities, where the given one of the bills has a single biller account number associated therewith. A further step includes routing the given one of the bills having the single biller account number associated therewith from the given one of the billing entities to multiple ones of the consuming entity service providers for presentation to a corresponding one of the consuming entities via the multiple ones of the consuming entity service providers. Refer to the above discussion of block 904, but note that in the broadest case, the ability to make a bill associated with a single biller account number available for presentation to the consuming entity via multiple consuming entity service providers can be provided as part of, or independent of, transaction tracking.

Still further, given the discussion thus far, it will also be appreciated that, in general terms, an even further exemplary method, according to an even further aspect of the invention, includes the step of providing, under control of an operator of a payment processing network, a bill presentment service wherein bills received from a plurality of billing entities are made available to a plurality of consuming entities via a plurality of consuming entity service providers; as well as the step of providing, by the operator of the payment processing network, at least a portion of a bill payment service wherein the consuming entities are afforded an option of paying the bills from the plurality of billing entities. The step of providing the bill presentment service is carried out without enrollment of the plurality of consuming entities. Additional steps include, as at 908, receiving from the plurality of billing entities an indication of ability to send the bills in electronic form (with storage at 910); as at 914, receiving from the plurality of consuming entity service providers an indication of ability to receive the bills in electronic form (with storage at 916); and tracking a plurality of transactions to identify those of the plurality of consuming entities for whom the bills in electronic form are intended; for example, as at 920-928. With regard to the aforementioned storage, with reference to FIG. 9, in some instances, transaction tracking can include storing data indicative of the ability to send the bills in electronic form, as at 910; and storing data indicative of the ability to receive the bills in electronic form, as at 916.

In such instances, the tracking can include, as at 926, storing, in a relationship table, based on historical data, billing entity identifiers, billing entity account numbers, and consuming entity service provider identifiers. Transaction tracking can further include, as at 950 and 952, upon the operator of the payment processing network obtaining a bill from a given one of the billing entities in electronic form, consulting the relationship table to obtain at least one of the consuming entity service provider identifiers corresponding to a given one of the billing entity identifiers and a given one of the billing entity account numbers. An additional step in such instances can include, as at 960, making the bill from the given one of the billing entities available to at least one of the consuming entities corresponding to the at least one of the consuming entity service provider identifiers.

In some instances, consulting the relationship table includes consulting the relationship table to obtain at least a second consuming entity service provider identifier (as indicated by the "(s)" in step 952) corresponding to the given one of the billing entity identifiers and the given one of the billing entity account numbers. In such instances, a further step can include making the bill from the given one of the billing entities available to at least a second one of the consuming entities corresponding to the at least second consuming entity service provider identifier.

In some cases, the tracking further includes, as at 934-938, examining payment files from given ones of the consuming entity service providers to identify billing entity account numbers to be added to the relationship table if not already present therein, and adding the billing entity account numbers to the relationship table if not already present therein. In such cases, optionally, as at 940, an additional step includes automatically electronically presenting future electronic bills associated with the billing entity account numbers added to the relationship table. In other instances, as noted elsewhere, the data may just be retained for possible future use.

Also contemplated are apparatuses including means for carrying out any one, some, or all of the indicated method steps of any of the indicated methods. The means can include, for example, distinct software modules executing on one or more hardware processors with one or more memories, network elements, and the like, to implement any one, some, or all of the components depicted in FIG. 5; the means can also include specialized hardware.

Furthermore, also contemplated are computer program products including a tangible computer readable recordable storage medium having computer readable program code embodied therewith, the computer readable program code including computer readable program code configured to carry out or otherwise facilitate any one, some, or all of the indicated method steps of any of the indicated methods.

Even further, also contemplated are apparatuses including any one, some, or all of the elements depicted in FIG. 5. For example, such an apparatus could include a bill presentment platform 536 configured to provide, under control of an operator of a payment processing network, a bill presentment service wherein bills received from a plurality of billing entities such as 538 are made available to a plurality of consuming entities such as 550 via a plurality of consuming entity service providers such as 508. As noted, platform 536 could be implemented by software running on a general purpose computer and/or specialized hardware. Such an apparatus could also include a database such as 520 or any portion thereof (e.g., 526), coupled to the bill presentment platform and accessible to the operator of the payment processing network, configured to store registration and preference data pertaining to each of the plurality of consuming entities; and a user interface module 589 configured to allow a given one of the consuming entities which has switched from a first one of the consuming entity service providers to a second one of the consuming entity service providers to access the bill presentment platform via the first one of the consuming entity service providers, prior to the switching, and via the second one of the consuming entity service providers, subsequent to the switching, using the stored registration and preference data. A subset of the registration and preference data pertains to the given one of the consuming entities, and the user interface module is configured to allow the given one of the consuming entities to access the bill presentment platform via the second one of the consuming entity service providers without having to take any updating action as to at least a portion of the subset of the registration and preference data.

In another aspect, an apparatus could include a bill presentment platform 536 configured to provide, under control of an operator of a payment processing network, a bill presentment service wherein bills received from a plurality of billing entities are made available to a plurality of consuming entities; a bill payment platform 540 configured to provide, by the operator of the payment processing network, at least a portion of a bill payment service wherein the consuming entities are afforded an option of paying the bills from the plurality of billing entities; and a database such as 520 or any portion thereof (e.g., 526), coupled to the bill presentment and/or payment platforms and accessible to the operator of the payment processing network, registration and preference data. Such data pertains to each of the plurality of consuming entities, and at least a portion of the registration and preference data includes payment preference data specifying how a given one of the consuming entities wishes to pay at least two of the billing entities. A user interface module 589 configured to afford the given one of the consuming entities an option to pay the at least two of the billing entities with a single command, in accordance with the payment preference data.

In still another aspect, an apparatus could include a bill presentment platform 536 configured to provide, under control of an operator of a payment processing network, a bill presentment service wherein bills received from a plurality of billing entities are made available to a plurality of consuming entities via a plurality of consuming entity service providers. Such platform (optionally, aided by block 534) could obtain a given one of the bills from a given one of the billing entities. The given one of the bills has a single biller account number associated therewith. Such platform, optionally aided by block 532 and/or a user interface module 589, routes the given one of the bills having the single biller account number associated therewith from the given one of the billing entities to multiple ones of the consuming entity service providers for presentation to a corresponding one of the consuming entities via the multiple ones of the consuming entity service providers.

In an even further aspect, an apparatus could include a bill presentment platform 536 configured to provide, under control of an operator of a payment processing network, a bill presentment service wherein bills received from a plurality of billing entities are made available to a plurality of consuming entities; and a bill payment platform 540 configured to provide, by the operator of the payment processing network, at least a portion of a bill payment service wherein the consuming entities are afforded an option of paying the bills from the plurality of billing entities. In some instances, the provision of the bill presentment service is carried out without enrollment of the plurality of consuming entities. The platforms 536 and/or 540 receive from the plurality of billing entities an indication of ability to send the bills in electronic form, and a suitable database module such as that described elsewhere stores data indicative of the ability to send the bills in electronic form. The platforms 536 and/or 540 receive from the plurality of consuming entity service providers an indication of ability to receive the bills in electronic form, and a suitable database module such as that described elsewhere stores data indicative of the ability to receive the bills in electronic form. The platforms 536 and/or 540 track a plurality of transactions to identify those of the plurality of consuming entities for whom the bills in electronic form are intended. The tracking may be carried out with the assistance of the database module and may include, for example, storing, in a relationship table, based on historical data such as at 599, billing entity identifiers, billing entity account numbers, and consuming entity service provider identifiers; and, upon the operator of the payment processing network obtaining a bill from a given one of the billing entities in electronic form, the platforms 536 and/or 540 may consult the relationship table in the database module to obtain at least one of the consuming entity service provider identifiers corresponding to a given one of the billing entity identifiers and a given one of the billing entity account numbers. The platforms 536 and/or 540 cooperate with the aforementioned user interface module 589 to make the bill from the given one of the billing entities available to at least one of the consuming entities corresponding to the at least one of the consuming entity service provider identifiers.

System and Article Manufacture Details

Embodiments of the invention can employ hardware and/or hardware and software aspects. Software includes but is not limited to firmware, resident software, microcode, etc. Software might be employed, for example, in connection with one or more of a terminal 122, 124, 125, 126; a reader 132; payment devices such as cards 102, 112; a host, server, processing center 140, 142, 144 (optionally with data warehouse 154) of a merchant, issuer, acquirer, processor, concentrator, payment network operator, originator, service provider, biller, customer, bank, consuming entity, billing entity, consuming entity service provider, or any other entity as depicted in the figures; and the like. Firmware might be employed, for example, in connection with payment devices such as cards 102, 112. Firmware provides a number of basic functions (e.g., display, print, accept keystrokes) that in themselves do not provide the final end-use application, but rather are building blocks; software links the building blocks together to deliver a usable solution.

Figure 8:
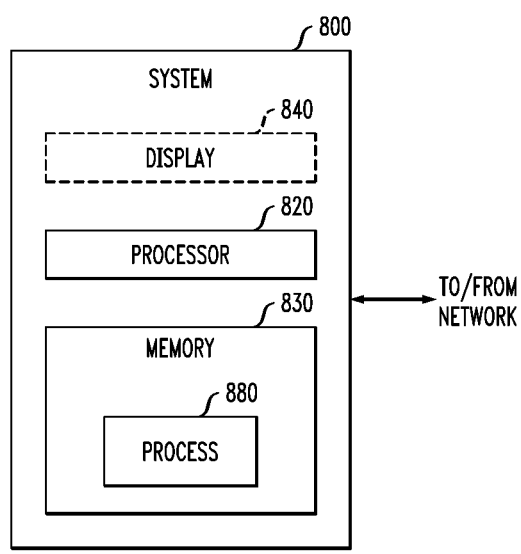
FIG. 8 is a block diagram of an exemplary computer system useful in one or more embodiments of the invention.

FIG. 8 is a block diagram of a system 800 that can implement part or all of one or more aspects or processes of the invention. As shown in FIG. 8, memory 830 configures the processor 820 (which could correspond, e.g., to processor portions 106, 116, 130, processors of remote hosts in centers 140, 142, 144, servers implementing one or more platforms, or processors associated with any entities as depicted in the figures, and the like) to implement one or more aspects of the methods, steps, and functions disclosed herein (collectively, shown as process 880 in FIG. 8). Different method steps can be performed by different processors. The memory 830 could be distributed or local and the processor 820 could be distributed or singular. The memory 830 could be implemented as an electrical, magnetic or optical memory, or any combination of these or other types of storage devices. It should be noted that if distributed processors are employed, each distributed processor that makes up processor 820 generally contains its own addressable memory space. It should also be noted that some or all of computer system 800 can be incorporated into an application-specific or general-use integrated circuit. For example, one or more method steps could be implemented in hardware in an ASIC rather than using firmware. Display 840 is representative of a variety of possible input/output devices (e.g., displays, mice, keyboards, and the like).

The notation "to/from network" is indicative of a variety of possible network interface devices.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is intended to encompass a recordable medium, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, e.g., by processing capability on the various elements, platforms, and so on, processors associated with any entities as depicted in the figures, and the like, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention, such as, for example, the aforementioned terminals 122, 124, 125, 126; processing centers 140, 142, 144 with data warehouse 154; processors associated with any entities as depicted in the figures, such as server(s) implementing one or more platform(s); and the like, or payment devices such as cards 102, 112; can make use of computer technology with appropriate instructions to implement method steps described herein. By way of further example, a terminal apparatus 122, 124, 125, 126 could include, inter alia, a communications module, an antenna coupled to the communications module, a memory, and at least one processor coupled to the memory and the communications module and operative to interrogate a contactless payment device (in lieu of the antenna and communications module, appropriate contacts and other elements could be provided to interrogate a contact payment device such as a contact card or read a magnetic stripe).

Some aspects can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the invention can include a computer program comprising computer program code means adapted to perform one or all of the steps of any methods or claims set forth herein when such program is run on a computer, and that such program may be embodied on a computer readable storage medium. Further, one or more embodiments of the invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 800 as shown in FIG. 8) running a server program. It will be understood that such a physical server may or may not include a display, keyboard, or other input/output components. A "host" includes a physical data processing system (for example, system 800 as shown in FIG. 8) running an appropriate program. Servers or hosts may run platform software, database software, security software, or any other suitable type of software.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g., platforms such as bill presentment and/or bill payment, databases such as 520, 597, user interfaces, and so on). The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Thus, aspects of the invention can be implemented, for example, by one or more appropriately programmed general purpose computers, such as, for example, servers or personal computers, located at one or more of the entities in the figures, as well as within the payment network. Such computers can be interconnected, for example, by one or more of payment network 210, another VPN, the Internet, a local area and/or wide area network (LAN and/or WAN), via an EDI layer, and so on. The computers can be programmed, for example, in compiled, interpreted, object-oriented, assembly, and/or machine languages, for example, one or more of C, C++, Java, Visual Basic, COBOL, and the like (an exemplary and non-limiting list), and can also make use of, for example, Extensible Markup Language (XML), known application programs such as relational database applications, spreadsheets, and the like. The computers can be programmed to implement the logic and/or data flow depicted in the figures.

In at least some instances, some messages may be in accordance with ISO standard 8583 (for example, authorization requests and authorization request responses). The ISO (International Organization for Standardization) 8583 standard for Financial transaction card originated messages—Interchange message specifications is known to the skilled artisan and is expressly incorporated herein by reference in its entirety for all purposes. In at least some instances, some messages may be in accordance with NACHA Automated Clearing House (ACH) rules and regulations.

Although illustrative embodiments of the invention have been described herein with reference to the accompanying drawings, it is to be understood that the invention is not limited to those precise embodiments, and that various other changes and modifications may be made by one skilled in the art without departing from the scope or spirit of the invention. For example, items described in terms of a pilot program may be extended to encompass more entities, and items listed as mandatory in some exemplary embodiments may be optional in others, and vice versa.

Reproduction of Pertinent Portions of U.S. Provisional Patent Application Ser. No. 61/438,106

Pertinent portions of U.S. Provisional Patent Application Ser. No. 61/438,106 are reproduced below; figure numbers and reference numbers have been changed where necessary to avoid confusion with the above text and FIGS. 1-10. This material is reproduced to illustrate for the skilled artisan one type of bill payment platform 540 suitable for use with one or more embodiments of the invention. In the event of any conflict between definitions or terminology between this material and the text above, it is intended that the text above take precedence.

One or more embodiments process payments (e.g., electronic funds transfer "EFT") in a batch mode, edit the information received from payment originators to ensure completeness, feed a settlement system (for example, one operated and/or provided by a payment network operator such as MasterCard International Incorporated of Purchase, N.Y., USA), feed a billing system (for example, one operated and/or provided by a payment network operator such as MasterCard International Incorporated of Purchase, N.Y., USA), and forward remittance information to a party such as, for example, a concentrator representing the biller.

Figure 11:
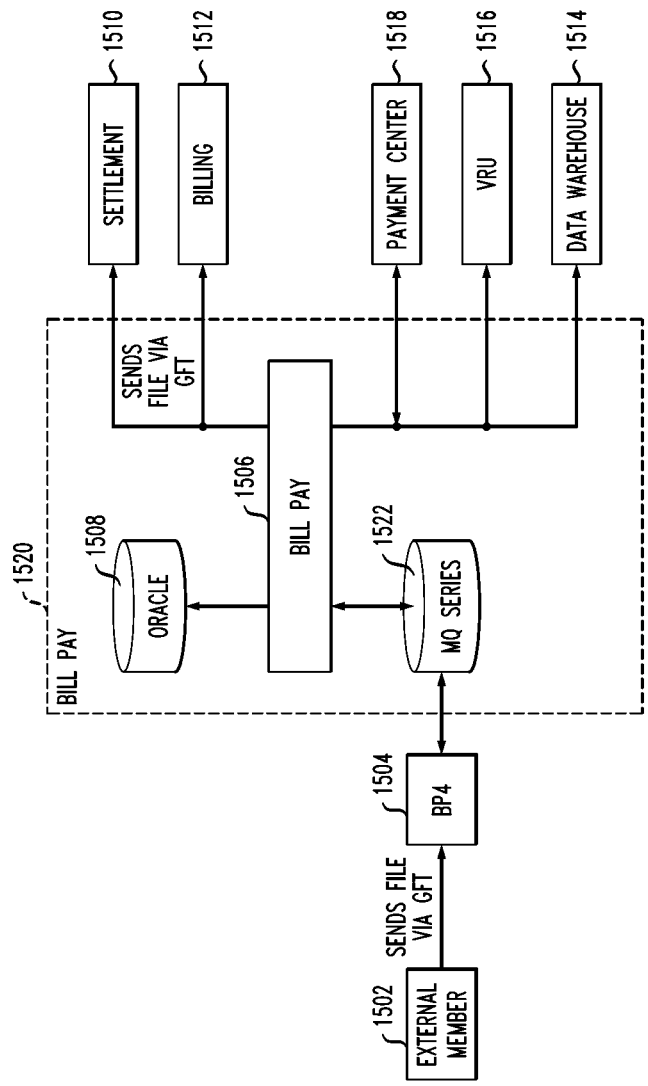
FIG. 11 depicts exemplary system interfaces, from U.S. Provisional Patent Application Ser. No. 61/438,106.

One or more embodiments are supported by various web applications. In some instances, these web applications are largely standalone and not integrated; other approaches can be used in other instances. Non-limiting examples of web applications include:

Online Biller/Creditor Directory—Houses significant customer processing parameters which are employed for successful payment edits and processing in the payment engine CSR Tool eService-based payments center online research facility Non-limiting exemplary system architecture will now be described. With reference to FIG. 11, the bill pay inbound preprocessor, BP4, numbered 1504, receives data from GFT (e.g., from external member 1502). After file integrity and data integrity checks, the bill pay inbound preprocessor communicates the file level fields to the bill pay business rules processor 1506. The fields are saved into the bill pay relational database 1508 and validated. If the file level validation results in a status of accepted, the bill pay inbound preprocessor communicates the batch data (along with the detail transactions contained in the batch) one by one to the bill pay business rule processor. Again, the fields are saved into the bill pay relational database and validated. When the process is finished, the relational database has all data needed to issue confirmation, remittance, settlement 1510, billing 1512, data warehouse 1514, voice response unit (VRU) 1516, and payment center 1518 files. One of the last actions that the business rules validation takes is to post a message saying that there are transactions available for downstream processes.

As depicted in FIG. 11, the bill pay system 1520 interfaces with BP4 application 1504 and communicates via MQ Series® messaging (registered mark of International Business Machines Corporation, Armonk, N.Y., USA); furthermore, in a non-limiting embodiment, the bill pay database 1508 is hosted on an ORACLE® database (registered mark of Oracle Corporation, Redwood Shores, Calif., USA). Other messaging and/or database software can be used in other cases.

Figure 12:
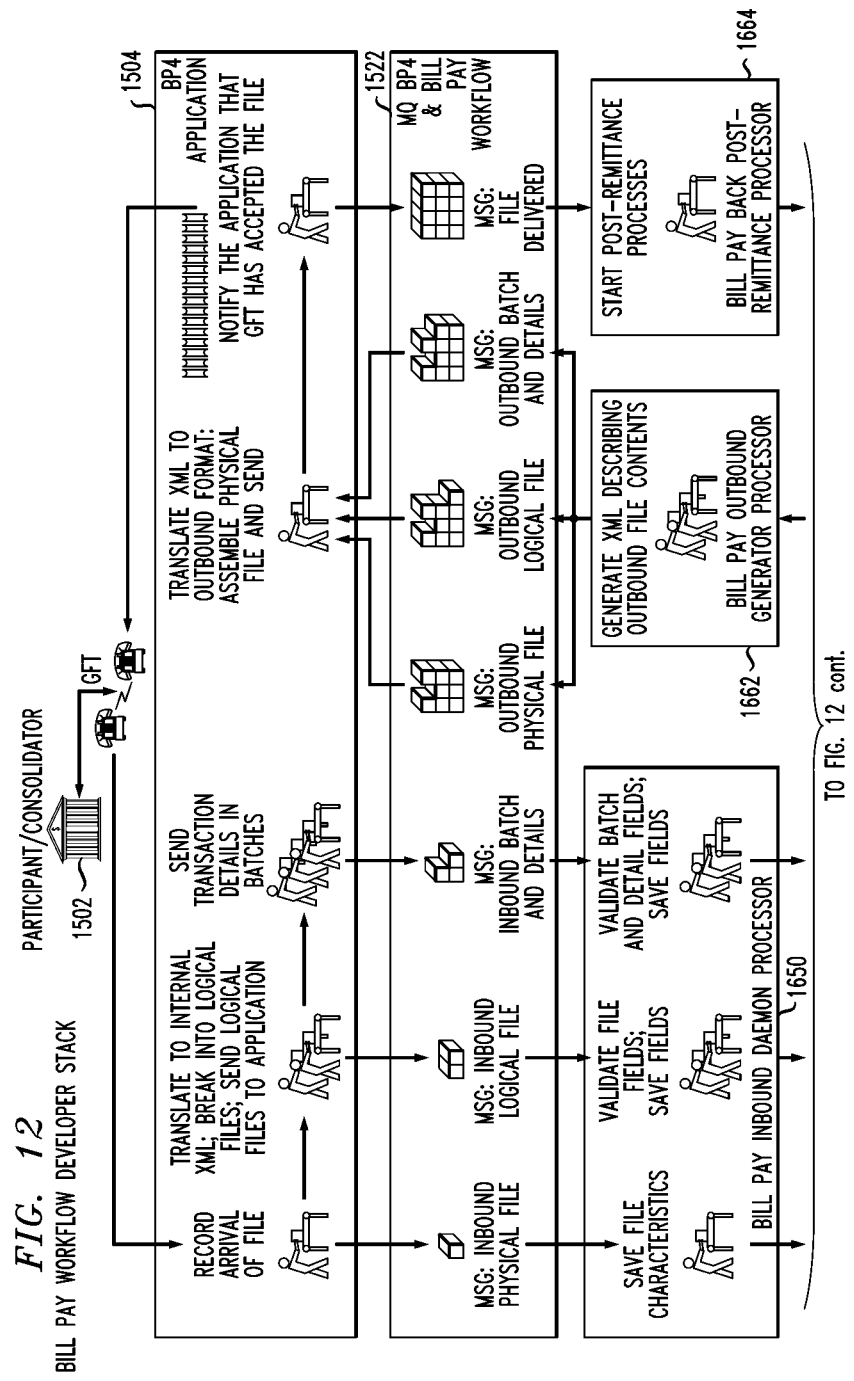
FIG. 12 depicts an exemplary workflow developer stack, from U.S. Provisional Patent Application Ser. No. 61/438,106.
Figure 12:
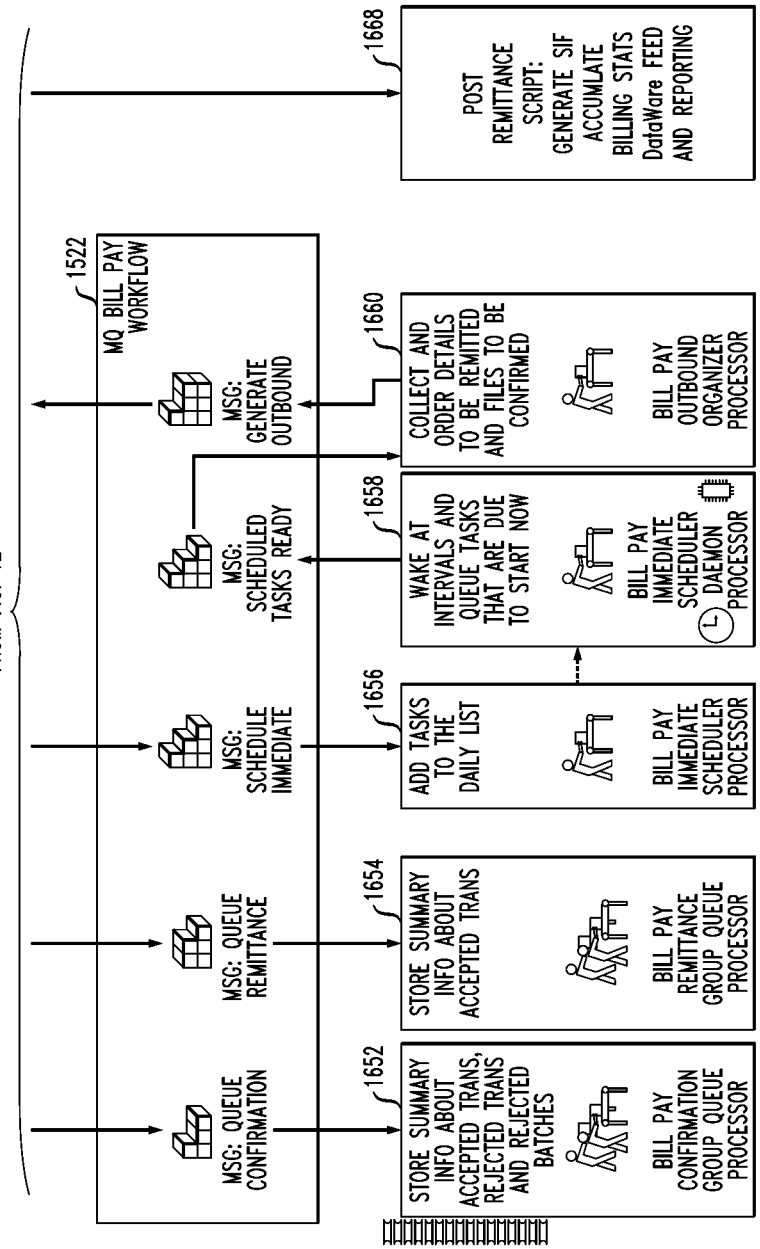

FIG. 12 shows an exemplary bill pay application and workflow in the form of an exemplary path of an EFT file and transactions within bill pay. It shows the touch-points between BP4, bill pay processors, and MQ interaction.

Discussion of exemplary bill pay processors will now be provided.

The inbound daemon processor 1650 reads the messages from the request queue, processes the data and persists to the database. After successfully processing the inbound data, it queues up work in the internal queues such as the confirmation queue, remittance queue, immediate schedule queue, and the like. Once it is done with processing the inbound file and batch data, it performs several post process tasks. For example; query the file and verify the batch count. If this batch is the last batch for that file, then it implies that file inbound processing is complete, and it is time to kick off other downstream processing tasks such as confirmation queuing. Another post process task is monitor processing.

In a non-limiting example, the bill pay inbound daemon processor 1650 can receive 3 types of request messages from the BP4 inbound process:
Physical file message
Logical File message/File message
Batch message Bill pay inbound daemon processor 1650 reads the messages from the request queue, processes the data and persists it to the database. After successfully processing the inbound data, it queues up work in the internal queues such as the confirmation queue, remittance queue, immediate schedule queue, reporting queue, and the like.

When the business rule validation is complete, three messages are sent to the workflow from the inbound daemon processor 1650. These messages are delivered independently of each other. The actions produced by the messages may run at the same time as other processes in the system as they are only dependent on data generated before the messages are delivered.

The confirmation group queue processor 1652 reads the internal work message from the confirmation queue, fetches the file ID, and begins the confirmation group queue processor.

The remittance group queue processor 1654 reads the internal work message from the remittance queue, fetches the file ID, and begins the remittance group queue processor.

The immediate schedule processor 1656 reads the internal work message from the immediate schedule queue, fetches the file ID, and begins the immediate schedule processor. The processor sends a message when it has identified work that needs to be done "right now."

The scheduler daemon processor 1658 wakes up at intervals and checks the task list table to see if there are any tasks to be done immediately. If so, it will send an outbound ready message to the outbound organizer processor 1660 as follows; with no attributes and puts the message in the outbound ready queue 1799.

```
<internalwork worktype="BeginOutbounding">
</internalwork>
```

Any business data is preferably passed via the attribute list in the internal work object. For example, when an inbound process is done with processing and when it verifies that the inbound file has completed in-bounding the data, it puts an <internalwork> (with an <inboundfileid> attribute in it) to a list of internal processes, such as confirmation queuing, remittance queuing, scheduler daemon, and reporting process.

The bill pay scheduler daemon processor 1658, once it identifies that there are tasks to be done by the outbound organizer processor 1660, puts an internal work object (at present no attributes are identified) in the outbound ready queue.

The outbound organizer processor 1660 process builds the outbound files and produces messages that the bill pay outbound generator processor 1662 uses to send the files to the participants 1502. Three messages are sent.

The outbound generator processor 1662 reads the messages in the outbound organizer processor ready queue. If an outbound ready message exists, then this processor 1662 starts generating the outbound data and will queue up the data in the outbound tables. It then reads the data from these table(s), and generates work request message(s) to the BP4 system 1504.

The back post remittance processor is shown at 1664.

The processors within the bill pay system preferably communicate with each other using internal work object representation. When a process is done with its processing, it might put an internal work message in the queue, and the other process listening to the messages in the queue will start processing after reading the internal work message. For example, the inbound process will generate the internal work instances and put the message in the confirmation queue, remittance queue, and immediate schedule queue respectively. See also FIG. 15 wherein listening to task list 1440 is used to generate reports, build settlements, build billing, and build outbounds, as at 1901, 1903, 1905 and 14, respectively. Presented below is exemplary information regarding the types of MQ queues.

Figure 13:
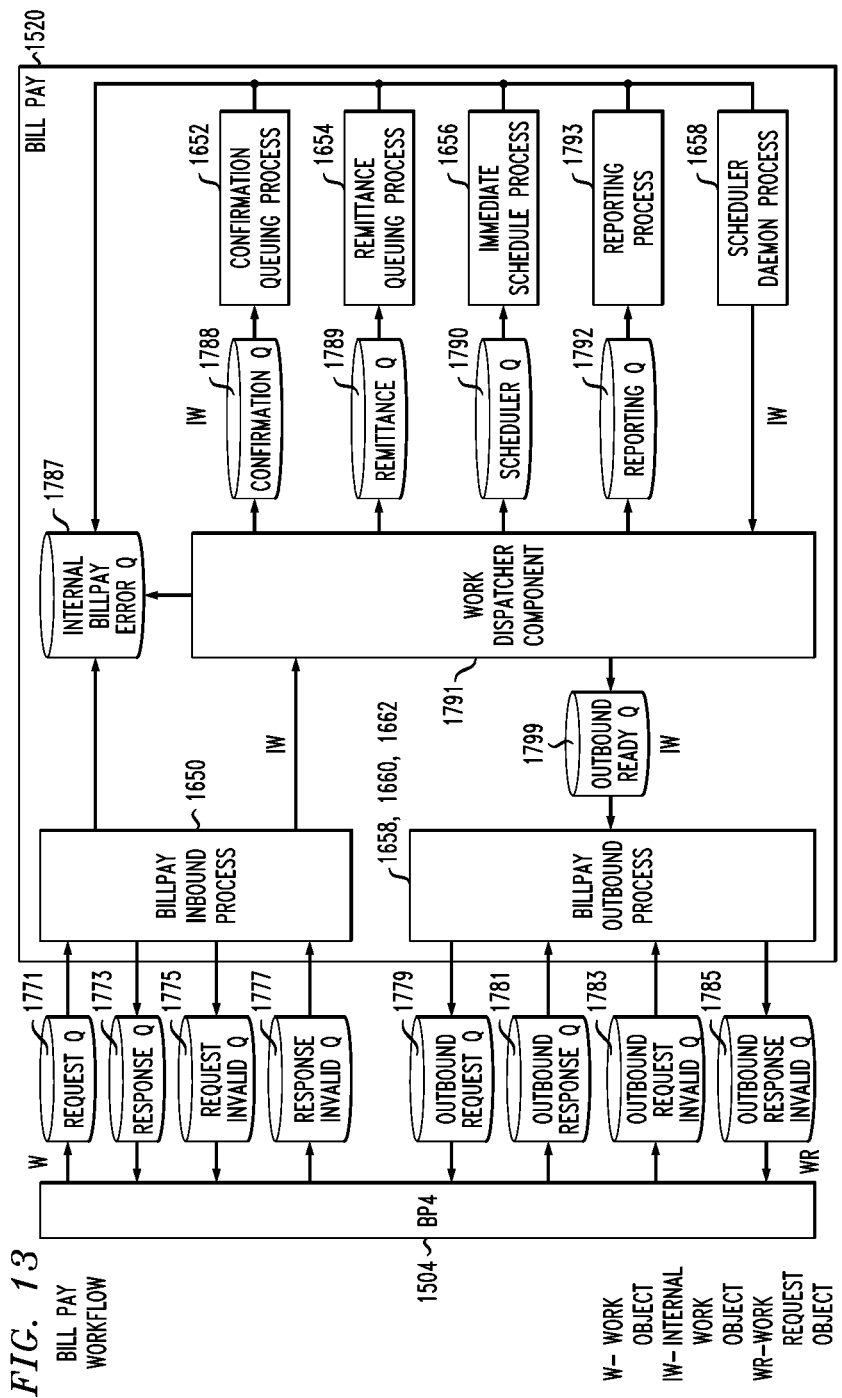
FIG. 13 depicts an exemplary system block diagram, from U.S. Provisional Patent Application Ser. No. 61/438,106.

The MQ BP4/bill pay inbound queues include (see FIG. 13):
The request queue 1771 is a logical queue that holds the work messages input by BP4 1504 for bill pay 1520 to process.
The response queue 1773 is a logical queue, to which bill pay 1520 puts response messages back after successfully processing the inbound data.
The request invalid queue 1775 is a logical queue, when bill pay 1520 identifies any errors pertaining to the BP4 work message format. The bill pay application puts the messages in this queue. The messages in this queue pertain to any BP4 work format errors in the message and not to bill pay system errors.
The response invalid queue 1777 is employed if BP4 did not receive the message in the format it is expecting (valid format), if so then BP4 might place the response sent by bill pay in a response invalid queue
The MQ BP4/bill pay outbound queues include:
The outbound request queue 1779 is a logical queue that holds work request messages put by the bill pay outbound process. BP4 1504 picks the messages from this queue, and prepares an outbound file, to be sent to the customer.
The outbound response queue 1781 is a logical queue that holds response messages to the work request messages, sent by BP4 process 1504.
The outbound request invalid queue 1783 is a logical queue that holds invalid work request messages, sent by bill pay 1520.
The outbound response invalid queue 1785 is a logical queue that holds invalid work request response messages, sent by BP4 1504.
The MQ Bill Pay Internal Workflow Queues include:
Error queue 1787: messages are written to this queue when a bill pay system error or any exception occurs while processing the inbound data, confirmation queuing, remittance queuing, and the like.
The confirmation queue 1788 is an internal queue that is used for processing internal work within bill pay. Messages in this queue are queued up for pick up and processing by the confirmation queuing process. (Note that "bill pay" or "the bill pay system" is used herein as a shorthand for one or more exemplary, non-limiting embodiments.)
The remittance queue 1789 is an internal queue that is used for processing internal work within bill pay. Messages in this queue are queued up for pick up and processing by the remittance queuing process.

The immediate schedule queue 1790 is an internal queue that is used for processing internal work within bill pay. Messages in this queue are queued up for pick up and processing by the immediate schedule queuing process 1656.

The reporting queue 1792 is an internal queue that is used for processing internal work within bill pay. Messages in this queue are queued up for pick up and processing by the reporting process 1793.

Work dispatcher 1791 is discussed below.

Exemplary bill pay support components include post remittance script 1668 which generates the settlement in full (SIF) file and accumulates billing statistics.

workflow for re-queuing a file for input; in some instances, the re-queuing would only apply to files received on the current processing day.

In one or more embodiments, Focus is employed to determine the record type based on field 1 on the transaction detail/addenda record in combination with the record type of the parent record in the file structure hierarchy.

One or more embodiments interface with other applications, either internal or external to bill pay. Most, but not all, of these "interfaces" involve data interfaces. Areas where non-data related changes to other applications are required may also be present in some instances.

The below table presents a non-limiting exemplary summary of interfaces:

| Interface # | Interface Description | Internal | External | Input | Output | Interface Type | Other Impacted Departments |
|---|---|---|---|---|---|---|---|
| 1 | MOD-CIE | ✓ | ✓ | ✓ | ✓ | File | File Transfer |
| 2 | ACH-CIE | ✓ | ✓ | ✓ | ✓ | File | File Transfer |
| 3 | Common Global | ✓ | ✓ | ✓ | ✓ | Message | File Transfer |
| 4 | File validation and conversion | ✓ | | | ✓ | Java jar | File Transfer |
| 5 | File workflow message | ✓ | | ✓ | ✓ | MQ | File Transfer |
| 6 | Batch workflow message | ✓ | | ✓ | ✓ | MQ | File Transfer |
| 7 | Payment Center | ✓ | ✓ | | ✓ | Browser | eService |
| 8 | Returns Service | ✓ | | ✓ | | Web Service | eService |
| 9 | Data Warehouse | ✓ | ✓ | ✓ | ✓ | Feed File | Data Warehouse |
| 10 | Portfolio Conversion Registration | ✓ | | | ✓ | Param Synch | <none> |
| 11 | Portfolio Conversion Account file | | ✓ | ✓ | | File | GFT GIS |
| 12 | Stop file Registration | ✓ | | | ✓ | Param Synch | <none> |
| 13 | Account Stop file | | ✓ | ✓ | | File | GFT GIS |

It should be noted that in some instances, flags for payments addenda may be set to "no" where payments with addenda are not allowed. Other instances may permit such addenda.

In one or more embodiments, a series of lookup tables is employed to contain valid values for file, batch and detail fields. These tables are used instead of hard-coding values in the program. A separate table is not needed for each field—a generic set of tables can be provided to cover lookups. Some fields have only single lookup values. Other fields have lookups keyed on multiple inputs (relations between this field and another field).

Note that fixed outbound formats could have overflows in the amount totals.

One or more embodiments may include capability for design system reports for application support tracing files through the validation process showing errors and warnings that were generated.

In one or more embodiments, the bill pay inbound preprocessor is capable of breaking a physical file into multiple logical files, as shown at 1522, 1650. Furthermore, the bill pay inbound preprocessor, in at least some instances, passes the number of rejected batches in the file message in addition to the number of total batches; the bill pay inbound preprocessor is capable of determining the bulk type, file name and deliver date/time for files associated with the specific file IDs (workflow IDs). Alternately, the preprocessor provides a One or more embodiments may be linked to an appropriate bill pay database model.

One or more embodiments employ a customer-initiated entry (CIE) batch entry description lookup table which defines the valid entries and assigns an ID for each batch with description: 'RPS PAYMENT', 'REVERSAL', 'RETURN', 'RPS SDAY', 'EXCEPTION', and 'E PAYMENT'. Again, references to the RPPS system are exemplary and non-limiting.

| CIE Batch Entry Description | |
|---|---|
| Batch Entry ID | Batch Entry Description |
| 1 | RPS PAYMNT |
| 2 | RETURN |
| 3 | REVERSAL |
| 4 | RPS SDAY |
| 5 | EXCEPTION |
| 6 | E PAYMENT |

The CIE service class code lookup table defines the valid entries and associates them back to the batch entry descriptions with which they may appear.

CIE Service Class Code

| Service Class Code | Batch Entry ID |
|---|---|
| 200 | 1 |
| 220 | 1 |
| 200 | 2 |
| 220 | 2 |
| 225 | 2 |
| 200 | 3 |
| 225 | 3 |
| 200 | 4 |
| 220 | 4 |
| 200 | 5 |
| 220 | 5 |

The CIE transaction code lookup table defines the valid entries and associates them back to the service class code.

CIE Transaction Code

| Transaction Code | Service Class Code |
|---|---|
| 21 | 200 |
| 22 | 200 |
| 26 | 200 |
| 27 | 200 |
| 21 | 220 |
| 22 | 220 |

This CIE batch entry to transaction code lookup table defines the valid transaction codes for each batch entry description.

CIE Batch Entry Transaction Code

| Batch Entry ID | Transaction Code |
|---|---|
| 1 | 22 |
| 2 | 21 |
| 3 | 27 |
| 4 | 62 |
| 5 | 22 |
| 6 | 22 |

The date range entity gives the various date ranges needed by the application.

In some cases, it is appropriate to check whether the inbound format is compatible with the biller's outbound format. In some embodiments, all formats are compatible with each other except that inbound ACH-CTX (National Automated Clearing House (NACHA) Corporate Trade Exchange (CTX)) batches must be associated with billers that accept outbound ACH-CTX. Other approaches could be used in other instances.

Non-limiting exemplary actors and use cases for the system will now be described. This view presents the needs of the user by work streams. One or more embodiments include the following components interacting with each other via messages posted through a workflow engine.

In a non-limiting example, the standard payment work stream accounts for more than 80% of the transaction volume through the bill pay system (other embodiments may have different percentages). Furthermore, in some instances, many of the other bill pay work streams flow through standard payment processes as well. Aspects of standard payment processing and the corresponding outbound remittance data, confirmation file, billing, and settlement processes will now be discussed.

In general, the bill pay inbound preprocessor 1650 receives data from GFT. After file integrity and data integrity checks, the bill pay inbound preprocessor communicates the file level fields to the bill pay business rules processor 1506. The fields are saved into the bill pay relational database 1508 and validated. If the file level validation results in a status of accepted, the bill pay inbound preprocessor 1650 communicates the batch data (along with the detail transactions contained in the batch) one by one to the bill pay business rule processor 1506. Again, the fields are saved into the bill Pay relational database and validated. When the process is finished, the relational database 1508 has all data needed to issue a confirmation file and remittance files. In one or more embodiments, one of the last actions that the business rules validation takes is to post a message saying that there are transactions available for downstream processes. The bill pay confirmation file and outbound remittance processes will be interested in this message.

Figure 14:
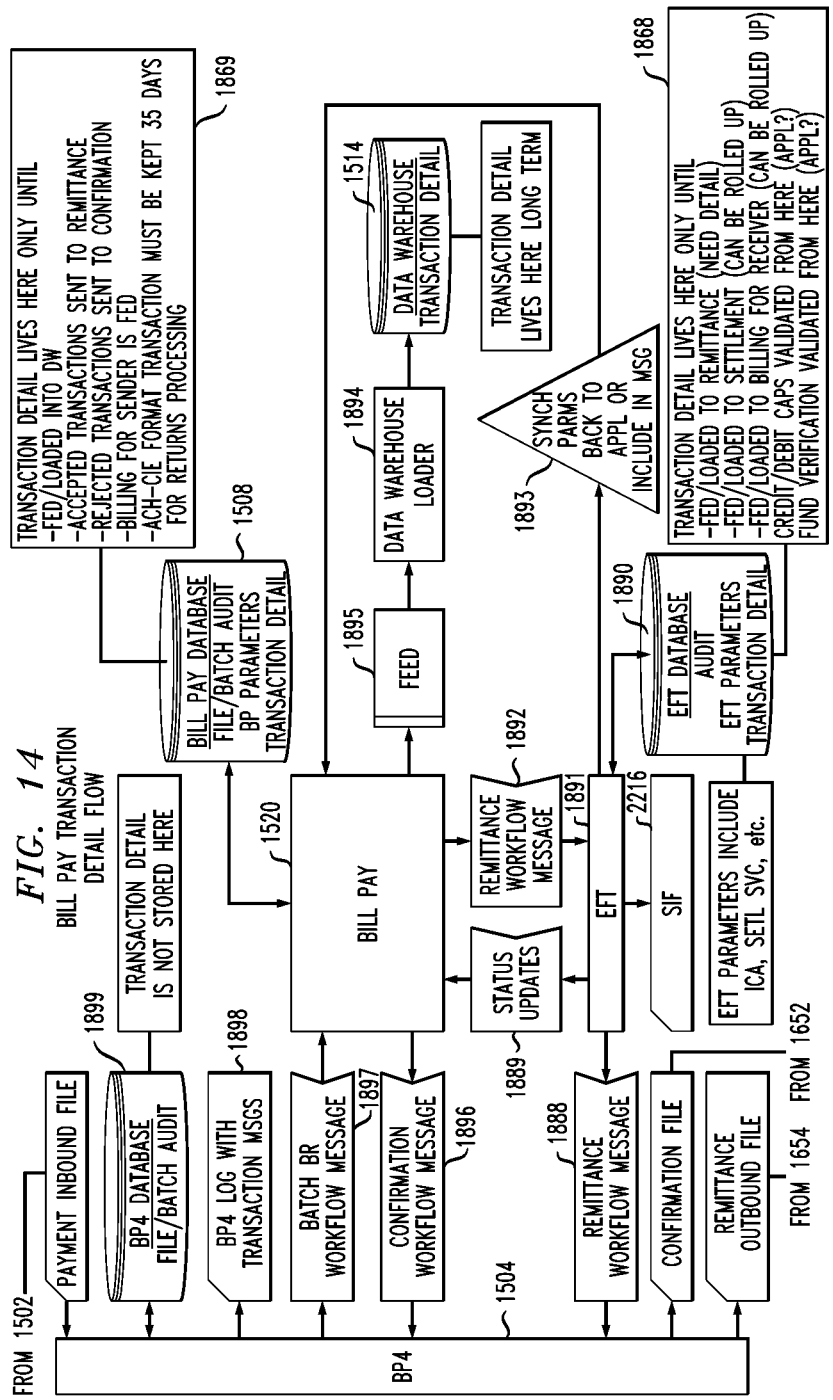
FIG. 14 depicts an exemplary detailed transaction flow, from U.S. Provisional Patent Application Ser. No. 61/438,106.

FIG. 14 shows an exemplary flow of detail transaction data within the system and how long those details are stored. Other embodiments may take different approaches. A payment inbound file is received from an external member 1502, by BP4 system 1504. A BP4 log with transaction messages is maintained at 1898. A BP4 database 1899 is maintained for file and/or batch audit. In some embodiments, transaction detail is not stored in database 1899. Batch background workflow messaging and confirmation workflow messaging are shown at 1897, 1896 respectively. See also 1522 in FIG. 11. As shown at 1895, system 1520 feeds data warehouse loader 1894 with transaction details to be persisted in data warehouse 1514. Bill pay database 1508 includes file and/or batch audit details, bill payment parameters, and transaction details. In some embodiments, data is maintained here for a limited period as indicated at 1869. Remittance workflow messages 1892 effectuate, for example, electronic funds transfer 1891. Suitable status updates are returned to system 1520 at 1899. Remittance workflow message 1888 is sent to BP4 system 1504; outbound remittance files have been handled at 1654 and confirmation files at 1652. As shown at 1893, parameters from EFT 1891 may be synchronized back to system 1520 and/or included in messaging. EFT database 1890 includes audit data, EFT parameters, and transaction details. In some embodiments, data is maintained here for a limited period as indicated at 1868. The SIF file is shown at 2216.

Figure 15:
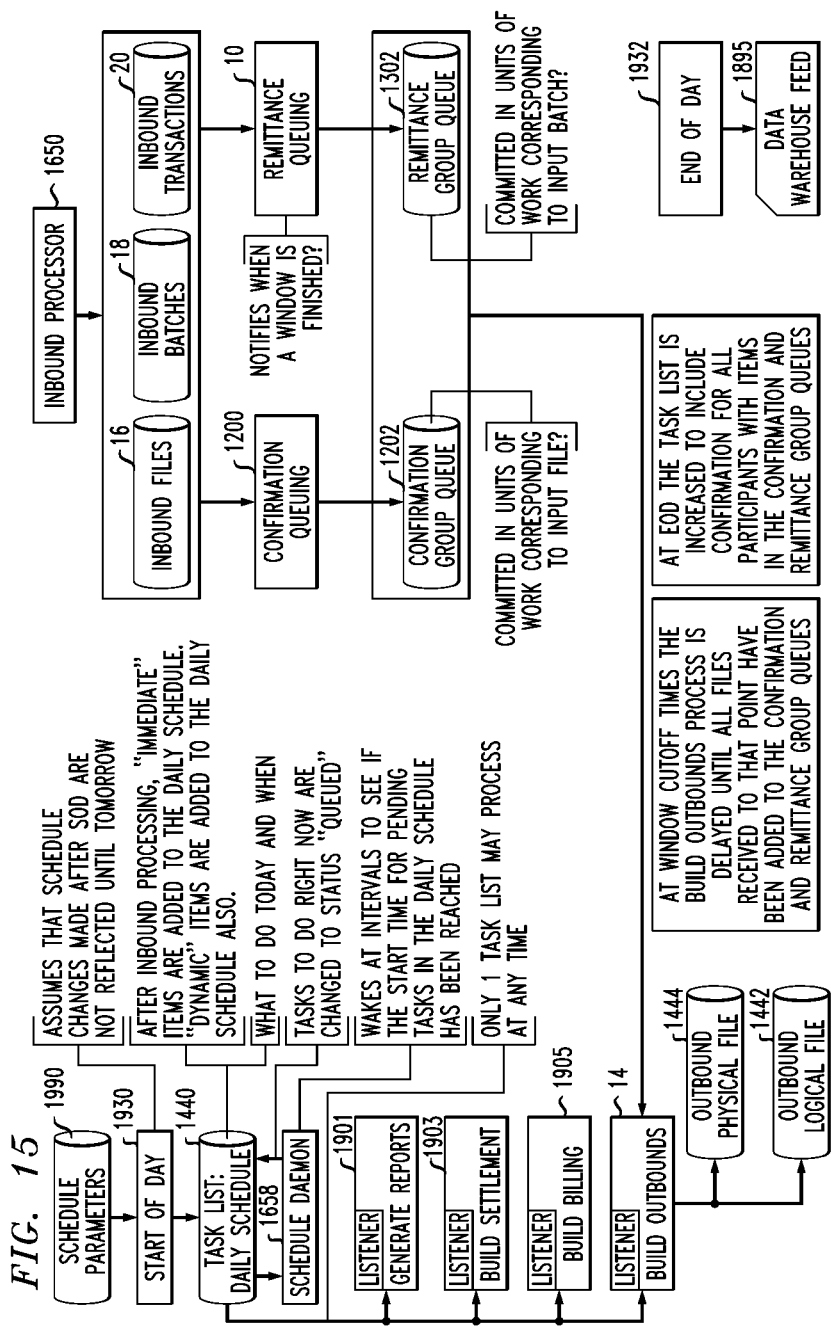
FIG. 15 depicts an exemplary outbound data flow, from U.S. Provisional Patent Application Ser. No. 61/438,106.

An overview data flow in the Bill Pay core system is shown in FIG. 15.

In one or more embodiments, significant outbound components include:
   Start of Day processor 1930
   Workflow Messages, such as those discussed elsewhere
   Outbound Scheduler processor 1658, 1660, 1662
   Confirmation File processor (see, e.g., queuing process 1200, 1202)
   Remittance File processor (see, e.g., queuing process 10, 1302)
   End of Day processor 1932
   Start of Day Process: This process 1930 performs tasks to be performed at the start of each processing day. In some cases, each originator has a daily credit cap amount, and the accumulated net amount of transactions from the originator received during the processing day may not exceed this cap. In one or more instances, a table will be set up to keep track of the running net credit amount used for the day. The following fields are available in the table, in an example:

| Field | Start of Day Initialization Value |
| --- | --- |
| RPPS ID of the originator | From the parameter data |
| Insert date and time of this row | The current date and time |
| Running net credit amount used today | Zero (0.0) |
| File ID that was processed to bring remainder to this amount | Zero (0) |
| Credit amount present in this file | Zero (0.0) |

When a temporary credit cap update is made to allow inbounds to process, there is preferably an option for the entry of an expiration date associated with the new cap. At start of day, the caps that are expired will typically be rolled back to their previous values.

In the following illustrative example the credit cap amount for the participant is set at 1800. (The skilled artisan will appreciate that 1800 in this context is a value and not a reference character.) On Jun. 19, 2008, the participant has a particularly busy day and needs to temporarily update the cap amount. Support staff raises the cap to 3000, but sets the expiration date time to the next start of day. The original amount of 1800 is put as the default cap amount. Then the start of day procedures on Jun. 20, 2008 detect that the row is expiring and so insert the third row to revert the cap amount back to normal.

| Credit Cap Profile | | | | | | |
| --- | --- | --- | --- | --- | --- | --- |
| Partici-pant | Cap Amt | Effective DTM | Last Up-dated DTM | Last Updated user id | Expire DTM | Default Cap Amt | Comments |
| P1 | 1800 | Jan. 1, 2008 2:00 am | Dec. 28, 2007 9:33 am | Support1 | <null> | <null> | Original set up |
| P1 | 3000 | Jun. 19, 2008 | Jun.19, 2008 11:42 am | Support2 | Jun. 20, 2008 2.00 am | 1800 | Emergency update |
| P1 | 1800 | Jun. 20, 2008 2:00 am | Jun. 20, 2008 2:18 am | BillPay | <null> | <null> | Auto inserted by start of day |

The configuration data is information that is specific to the bill pay application in general:
  Number of processing days into the past that will be accepted as a transmission date on file header record
  Number of processing days into the past that should be considered in duplicate file check
  Format type to bulk type association. The format type is code from the FILE FORMAT table. The bulk type is the GFT bulk type used to transmit an inbound file of that format type to an entity such as the operator of a payment processing network (e.g., MasterCard International Incorporated of Purchase, N.Y., USA)
  Central site destination
  Duplicate file exclusion list
  Elements 14, 16, 18, 20, 1901, 1903, 1905, 1990, 1440, 1442, and 1444 in FIG. 15 are discussed elsewhere herein.

Figure 16:
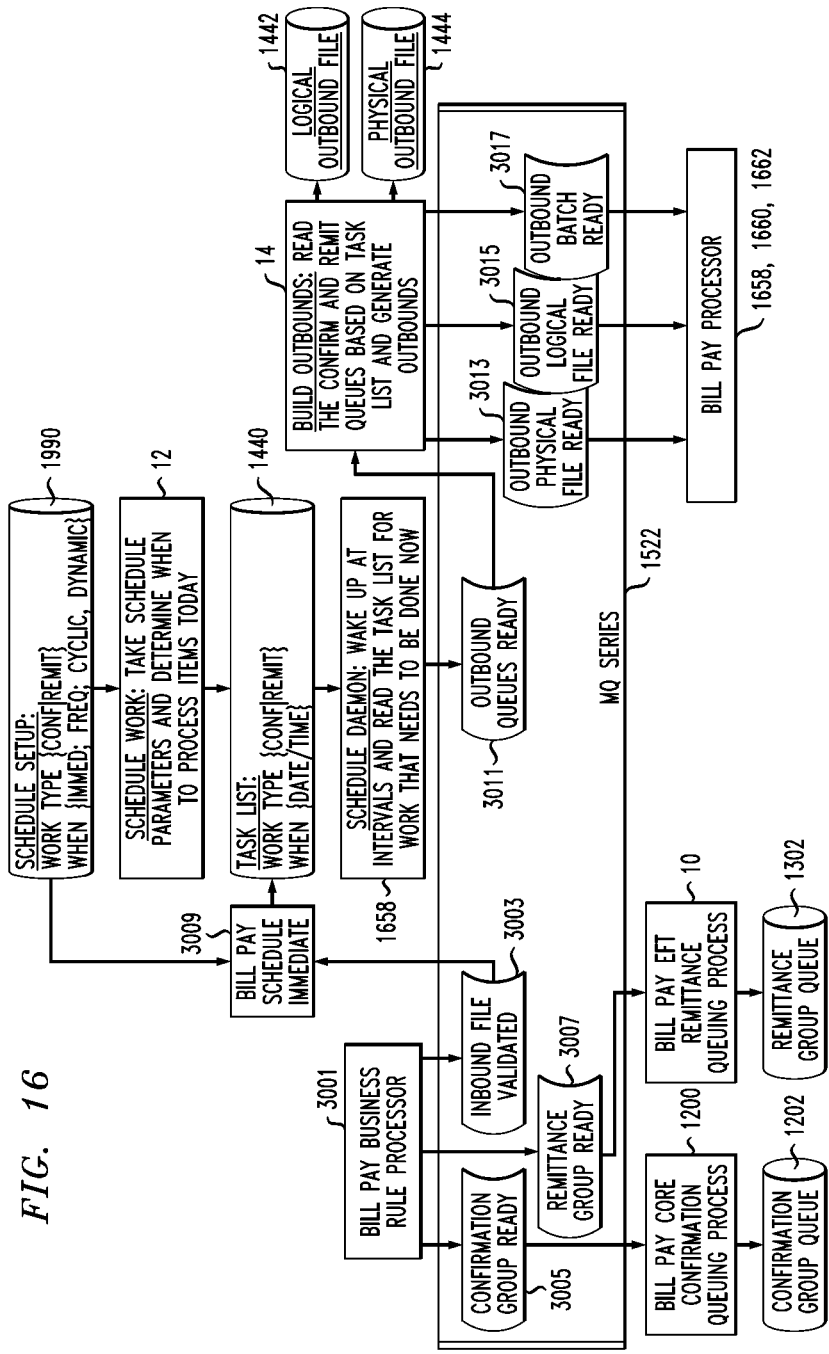
FIG. 16 depicts an exemplary message flow for outbound file processing, from U.S. Provisional Patent Application Ser. No. 61/438,106.

With regard to confirmation and remittance outbound file message design, in an exemplary embodiment, the message flow to the various bill pay components is as depicted in FIG. 16.

In one or more embodiments, when the business rule validation is complete at 3001, three messages are sent to the workflow:
  Inbound file validated 3003—This message is a cue to a component of the work schedule to check whether any "immediate" processing is to be initiated as a result of the inbound file. The inbound file ID is preferably included in the message. The sending participant of the file may be profiled for an immediate confirmation file. Any of the participants represented by the inbound batches may also be profiled for immediate remittance.
  Confirmation group ready 3005—This message tells the confirmation queuing processor that it may start generating confirmation group data. The inbound file ID is an example of significant data that should be included in the message.
  Remittance group ready 3007—This message tells the remittance queuing processor 10 that it may start generating remittance group data. The inbound file ID is an example of significant data needed in the message.

These messages are delivered independently of each other, in some instances. The actions produced by the messages may run at the same time as other processes in the system as they are typically only dependent on data generated before the messages are delivered.

In one or more embodiments, the work schedule process 12 sends the following message when it has identified work that needs to be done "right now" (i.e., as per "bill pay schedule immediate" block 3009):
  Outbound queues ready 3011—This message says that the task list has items with a status of "queued" and that all associated confirmation and remittance groups are ready to process for those items. The build outbound files processor 14 reads this message. All data needed to process this message is preferably contained in the task list table, so no application data needs to be embedded in the message.

In one or more embodiments, the process 14 that builds outbound files produces messages that the bill pay postprocessor uses to send the files to the participants. In some cases, three messages are sent.
  Outbound physical file ready 3013—This message announces that a physical file is to be sent to one or more bill pay participants 1502. The bill pay system should typically wait to send other messages about the file until a response is received for the corresponding physical file description message. Data in the message includes, for example:
    Number of logical files to be sent to the post processor to be packaged into a single physical file.
    ICA to receive the file
    End point to receive the file
    Bulk type to assign to the physical file.
  Outbound logical file ready 3015—This message announces that a logical file is to be sent to a bill pay participant 1502. The bill pay system should wait to send other messages about the logical file until a response is received for this message. Data in the message includes, for example:

Number of batches to be sent to the post processor to be packaged into a single logical file.

Reference to the physical file to contain the logical file.

Attributes needed to populate the file header and control information for the logical file.

Outbound batch ready 3017—This message directs the bill pay post-processor to create summary or detail batches for the associated logical file. The bill pay system should wait to send confirmation batch messages until a response is received for the corresponding confirmation file message. The message parameters will include, for example:

Reference to the associated logical file

Outbound format to which the data must be converted before being sent to the end receiver.

Sort order indicator giving the position within the logical file for the batch. Different format types typically require confirmation batches to appear before or after payment batches. This parameter allows the bill pay core system to communicate that order to the post-processor.

Common format object containing data for the batch and transaction record fields.

Figures 17A, 17B:
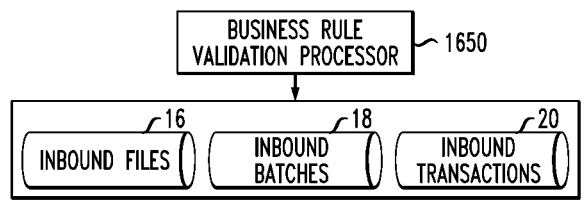
FIG. 17A depicts exemplary data from inbound files in block form, from U.S. Provisional Patent Application Ser. No. 61/438,106.
FIG. 17B depicts exemplary data from inbound files in tabular form, from U.S. Provisional Patent Application Ser. No. 61/438,106.

With reference to FIGS. 17A and 17B, in one or more embodiments, with regard to confirmation and remittance outbound file data design, when the inbound processing is completed in block 1650, the participant-supplied data is stored in three primary tables 16, 18, and 20, corresponding to the logical files, the batches and the transaction details. From this inbound data, the confirmation process and the remittance process generate information that will eventually be out-bounded.

In one or more embodiments, the batch and detail tables have a status table associated with them to keep track of the data life cycle. Valid status settings are, for example:

Pending (values stored but not business rule validated)

Postponed (values stored but business rule validation on hold for maintenance window)

Validated (business rule validation complete—all error codes assigned)

Queued for confirmation (file and batch level)

Queued for remittance (batch level only)

The inbound detail table also preferably has a reference to the remittance group queue row associated with it. It is preferably null-able because it will typically not be populated until the remittance queuing process is run. This column may also be updated from the build outbound files process to adjust batches for batch limits or duplicate trace numbers.

Figure 18:
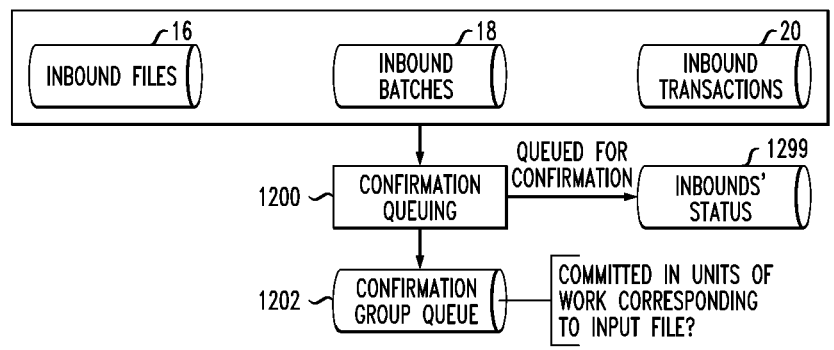
FIG. 18 depicts an exemplary confirmation queuing process, from U.S. Provisional Patent Application Ser. No. 61/438,106.

With regard to an exemplary confirmation queuing process 1200, refer to FIG. 18. This process organizes data that will eventually be output in the form of a confirmation file. The goal is to produce a set of confirmation groups (or batches) describing the transactions that were accepted and the ones rejected from the inbound file. This information is stored in the confirmation batches table. In one or more embodiments, the following logic is executed:

If any transactions were accepted, a summary row is produced giving the number of transactions accepted and the total debit and credit amounts of those transactions.

If any transactions were rejected, a summary row is produced giving the number of transactions rejected and the total debit and credit amounts of those transactions.

If any inbound batches were rejected, a row is produced for each rejected batch giving the number of transactions in each batch and the total debit and credit amounts of those transactions.

If any detail transactions were rejected, a row is produced for each accepted inbound batch that contained one or more rejected details giving the number of rejected details and the total debit or credit amounts of those rejected transactions.

A sample depiction of the resulting table 1202 is given below.

| | | | | | | | Post-Processor |
|---|---|---|---|---|---|---|---|
| Inbound File ID | Inbound Batch ID | Type | Dtl/ Addenda Count | Debit Amt | Credit Amt | Outbound Logical File ID | Work ID |
| 1234 | <null> | Sum Acpt | 3 | 0 | 1625.00 | | |
| 1234 | <null> | Sum Rej | 5 | 0 | 2050.00 | | |
| 1234 | 1236 | Batch Rej | 2 | 0 | 950.00 | | |
| 1234 | 1235 | Dtl Rej | 2 | 0 | 550.00 | | |
| 1234 | 1237 | Dtl Rej | 1 | 0 | 550.00 | | |
| 1238 | <null> | Sum Acpt | 4 | 0 | 1100.00 | | |

Confirmation Group Queue

When the process is finished, this data is ready to be related back to the inbound tables to be able to produce confirmation out-bounds. For the inserted confirmation groups, the status of the associated rows in the inbound batch and inbound transactions are updated to "queued for confirmation."

The outbound logical file ID and post-processor work ID columns will typically start out null. During the build outbound files process the columns will be assigned a value. These columns will allow the tracing of batches to the output confirmation files.

Figure 19:
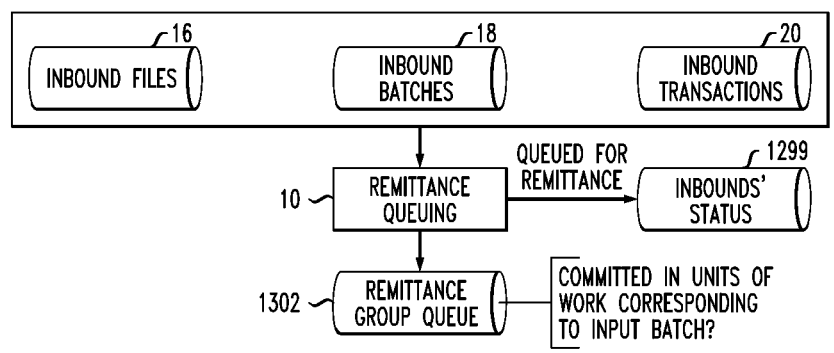
FIG. 19 depicts an exemplary remittance queuing process, from U.S. Provisional Patent Application Ser. No. 61/438, 106.

With regard to an exemplary remittance queuing process 10, refer to FIG. 19. This process organizes data that will eventually be output in the form of remittance payment details. The goal is to produce a set of remittance groups (or batches) describing the transactions that are to be forwarded to the billers through the concentrator. This information is stored in the remittance groups table by biller ID. In an example, the following logic is executed for each inbound batch of the file.

If the batch was accepted and one or more transactions were accepted, then generate a row containing the number of accepted transactions and the total debit or credit amount of the accepted transactions.

A sample depiction of the resulting table 1302 is shown below.

Remittance Group Queue

| Inbound Batch ID | Biller ID | Dtl/ Addenda Count | Debit Amt | Credit Amt | Outbound Logical File ID | Post-Processor Work ID |
|---|---|---|---|---|---|---|
| 1235 | B1 | 2 | 0 | 625.00 | | |
| 1239 | B4 | 2 | 0 | 400.00 | | |
| 1236 | B2 | 0 | 0 | 0.00 | | |
| 1237 | B3 | 1 | 0 | 1000.00 | | |
| 1240 | B3 | 2 | 0 | 700.00 | | |

In one or more embodiments, when the process is finished, this data is ready to be related back to the inbound tables to be able to produce remittance out-bounds. For the inserted remittance groups the status of the associated rows in the inbound batch is updated to "queued for remittance."

Note that during the building of the remittance outbound files, in one or more embodiments, rows in this queue destined for the same biller will be combined into a single outbound batch if the batch types are compatible.

The outbound logical file ID and post-processor work ID columns will typically start out null. During the build outbound files process the columns will be assigned a value. These columns will allow the tracing of transaction details to the output remittance files.

With regard to scheduler processes, in one or more embodiments, the schedule parameters table(s) 1990 will hold the settings that each participant has chosen for receiving confirmation and remittance files. The bill pay system support staff will maintain these parameters along with the other parameter data. Each outbound type may have different schedule parameters from the following options, for example:

Immediate—the outbound process is initiated immediately after the inbound process is complete for each file.

Frequency—the outbound process is initiated at different times in the day specified as every so many minutes (or other time units) beginning at a certain time and continuing throughout the process day until another time (for example, every 2 hours beginning at 11:00 am and continuing through 8:00 pm)

Time of day—the outbound process is initiated at specific times of the day (for example at 12:00 pm, 5:00 pm and 8:00 pm)

Window—the outbound process is initiated at certain times throughout the processing day as set by the bill pay business team. This would simulate the current RPPS cycles, in a non-limiting example. Each participant would choose one or more windows in which to receive out-bound files.

Sample data depicting schedule parameters is given below.

| | | Schedule Parameters | | | | | |
|---|---|---|---|---|---|---|---|
| Participant | Work Type | Schedule Type | Data | Minutes | Start Time | End Time | Time |
| P1 | Outbound | Frequency | | 120 | 12:00 PM | 8:00 PM | |
| P2 | Remittance | Window | W1, W3, W5 | | | | |
| P2 | Same Day | Frequency | | 120 | 8:00 AM | 6:00 PM | |
| P3 | Remittance | Window | W1 | | | | |
| P4 | Remittance | Time | | | | | 12:00 pm, 8 pm |
| P5 | Remittance | Window | W2, W5 | | | | |
| P6 | Confirmation | Immediate | | | | | |
| P6 | Remittance | Window | W1, W3, W5 | | | | |

In some instances, the following configuration tables are employed in association with the schedule table:

| Work Categories | |
|---|---|
| Work Type | Category |
| Outbound | <null> |
| Confirmation | Outbound |
| Remittance | Outbound |
| Payment | Remittance |
| Exception | Remittance |
| Same Day | Remittance |
| Credit Counseling | Remittance |
| Returns | Remittance |
| Reversal | Remittance |

In one or more embodiments, the work categories table defines the grouping and granularity of the configurable outbound types. In the sample data all types can be addressed by the term "Outbound." "Remittance" is further divided into five other types.

| Processing Windows | |
|---|---|
| Window ID | Start Time |
| W1 | 12:00 PM |
| W2 | 2:30 PM |
| W3 | 5:00 PM |
| W4 | 8:00 PM |
| W5 | 2:00 AM |

Figure 20A:
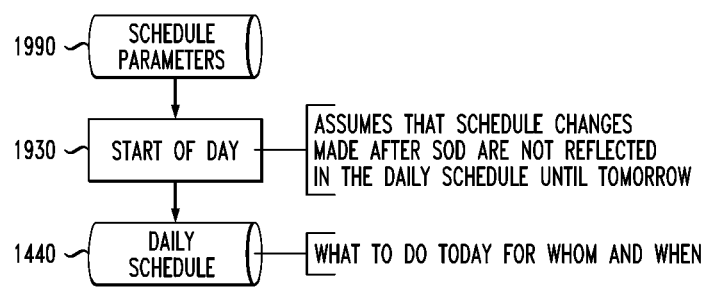
FIG. 20A depicts exemplary daily schedule generation, from U.S. Provisional Patent Application Ser. No. 61/438, 106.

Referring to FIG. 20A, in a non-limiting example, the start of day process 1930 produces a daily schedule 1440. At the start of each processing day a process is run that creates the daily schedule from these parameters 1990. The schedule sets forth what to do today, for whom, and when.

Sample data depicting the daily schedule is given in FIG. 20B.

In some cases, the overall schedule for the current day is generated just once during start of day processing. However, items that are set up as "immediate" typically cannot be added to the schedule until the associated inbound files actually arrive. Throughout the processing day rows for the "immediate" items will be added as a time event with the current time as the event DTM. For example:

| | Task List: Daily Schedule | | | | | Task Status | |
|---|---|---|---|---|---|---|---|
| Task ID | Participant | Outbound Type | Event | Event Data | Event DTM | Status | Status DTM |
| T21 | P6 | Confirmation | Time | | 10:45 AM | Pending | <today> 10:45 AM |

If dynamic scheduling of remittance is needed, those items are also inserted into the daily schedule table with similar settings.

In one or more embodiments, the valid status settings in the task list are:

Pending—the initial status of each task

Queued—queued for processing "right now." The schedule daemon has identified the task as ready to start.

Started—the task is in progress now. The build outbound process has started gathering the transaction details associated with the task.

Completed—the task is complete. The build outbound process has generated the logical and physical file information and forwarded the outbound to the bill pay post-processor.

Figure 21:
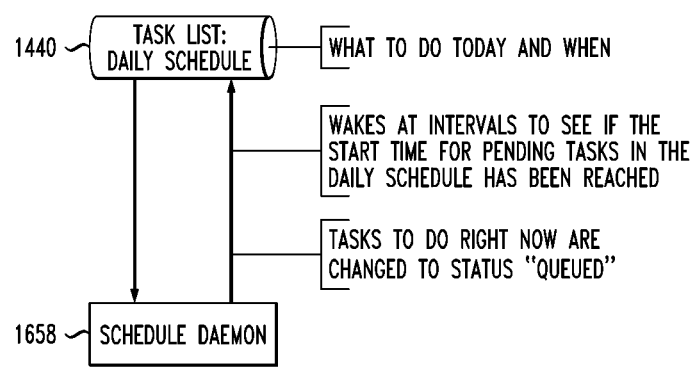
FIG. 21 depicts an exemplary schedule daemon process, from U.S. Provisional Patent Application Ser. No. 61/438, 106.

Referring to FIG. 21, one or more embodiments employ a schedule daemon process 1658 which lists tasks to be done "Right Now." At regular intervals, a schedule daemon process will compare the time of day with the pending items in the daily schedule 1440 to see if any action needs to be taken. If items are found, a number of configuration tables are consulted to control the generation of a task priority list.

The items in the task list table with the status "queued" are those to be done "right now." For outbound processing, it lists the items by participant, work type, destination end point and bulk type. To facilitate the list creation, the following configuration tables are utilized in one or more embodiments.

The list of queued tasks is joined to the following configuration tables to enable the building of outbound files.

Outbound Default Bulk Type (Content)

| Outbound Type | Format Type | Format Version | Bulk Type |
|---|---|---|---|
| Outbound | MOD-CIE | 1.0 | B0 |
| Confirmation | MOD-CIE | 1.0 | B1 |
| Payment | MOD-CIE | 1.0 | B2 |
| Exception | MOD-CIE | 1.0 | B3 |
| Same Day | MOD-CIE | 1.0 | B4 |
| Credit Counseling | MOD-CIE | 1.0 | B5 |
| Returns | MOD-CIE | 1.0 | B6 |
| Outbound | ACH-CIE | 1.0 | B0 |
| Confirmation | ACH-CIE | 1.0 | B1 |
| Payment | ACH-CIE | 1.0 | B2 |
| Exception | ACH-CIE | 1.0 | B3 |
| Same Day | ACH-CIE | 1.0 | B4 |
| Credit Counseling | ACH-CIE | 1.0 | B5 |
| Returns | ACH-CIE | 1.0 | B6 |

The outbound default bulk type table gives the default bulk type defined for each outbound type. Participants may elect to send some outbound types to a different bulk type for easier identification.

Participant Outbound Content Setup

| Participant | Outbound Type | Bulk Type Override Switch | End Point |
|---|---|---|---|
| P1 | Outbound | N | E1 |
| P2 | Outbound | N | E2B |
| P2 | Same Day | N | E2A |
| P3 | Outbound | N | E3 |
| P3 | Returns | Y | E3 |
| P4 | Outbound | N | E4 |
| P5 | Outbound | N | E5 |

The participant outbound parameters record the choices the participant has made regarding delivery destination options. The main entry giving the default bulk type and end point designations are given as outbound type "Outbound," the most general type in the hierarchy. Overrides for sub-categories indicate a different destination for the specific category. Participants can choose different bulk type and/or end point for any outbound type. In the sample data:

Participant P2 has elected to receive all outbound files as bulk type B0 at end point E2B with the exception that any same day payments are to be received at end point E2A (as bulk type B0).

Participant P3 has elected to receive all outbound files as bulk type B0 at end point E3 with the exception that any returns are to be received as bulk type B6 at the same end point, E3.

These configuration tables then allow the schedule daemon to produce the list of tasks ready to perform now for the outbound process. The following sample data can be produced by combining the tables. Note that in one or more embodiments, the following sample is a virtual table produced by the program code; there is no physical table in the database corresponding to it. Other embodiments could take a different approach.

| Task List - Things To Do Right Now | | | | | | Task Status | | |
|---|---|---|---|---|---|---|---|---|
| Task ID | ICA | Participant | Bulk Type | End Point | Work Type | Task ID | Status | Time |
| T1 | I1 | P1 | B0 | E1 | Confirmation | T1 | Pending | 12:02 PM |
| T2 | I1 | P1 | B0 | E1 | Remittance | T2 | Pending | 12:02 PM |
| T3 | I2 | P2 | B0 | E2B | Remittance | T3 | Pending | 12:02 PM |
| T4 | I2 | P2 | B0 | E2A | Same day | T4 | Pending | 12:02 PM |
| T5 | I3 | P3 | B0 | E3 | Remittance | T5 | Pending | 12:02 PM |
| T6 | I3 | P3 | B6 | E3 | Return | T6 | Pending | 12:02 PM |
| T7 | I1 | P4 | B0 | E4 | Remittance | T7 | Pending | 12:02 PM |

In the sample data, the tasks to be done now are:
Outbound a confirmation file for participant P1 using bulk type B0 to end point E1
Outbound a remittance file for participant P1 using bulk type B0 to end point E1
Outbound a remittance file for participant P2 using bulk type B0 to end point E2B
and the like.

Note that in the virtual task list, each unique combination of ICA, bulk type and end point is a unique outbound physical file.

In one or more embodiments, valid values in the task status table are:
Pending
Started (or queued)
Complete If the schedule daemon starts its processing at the end of day, an additional sweep will be made to ensure that there are no tasks left over for the start of the next day. The sweep should consider the following:
- Any pending content in the confirmation group queue should have a corresponding task with the status of pending.
- Any pending content in the remittance group queue should have a corresponding task with the status of pending.

The final step of the daemon execution is to produce a message to start the building of the outbound files. The timing of this message is straight forward if the task list is produced only from "Time" events in the daily schedule. However, in some instances, special processing is needed when "Window" events are involved.

When the time arrives for window processing, the system must typically delay the building of the outbound files to give the system time to finish the inbound process for any data already received. To do this, a list of files that have been received but not queued for confirmation or remittance is produced. The starting of the outbound building process is delayed until all batches for those files have been received and until all details in those files have been queued for confirmation and remittance.

The task list may, in some cases, be built before all inbounds are queued; it is dependent only on the schedule and configuration tables. However, if the task list is built before all the inbounds are queued, files received in the meantime (during the delay) to be confirmed or remitted in the "immediate" mode will wait until the next task list is built.

Figure 22:
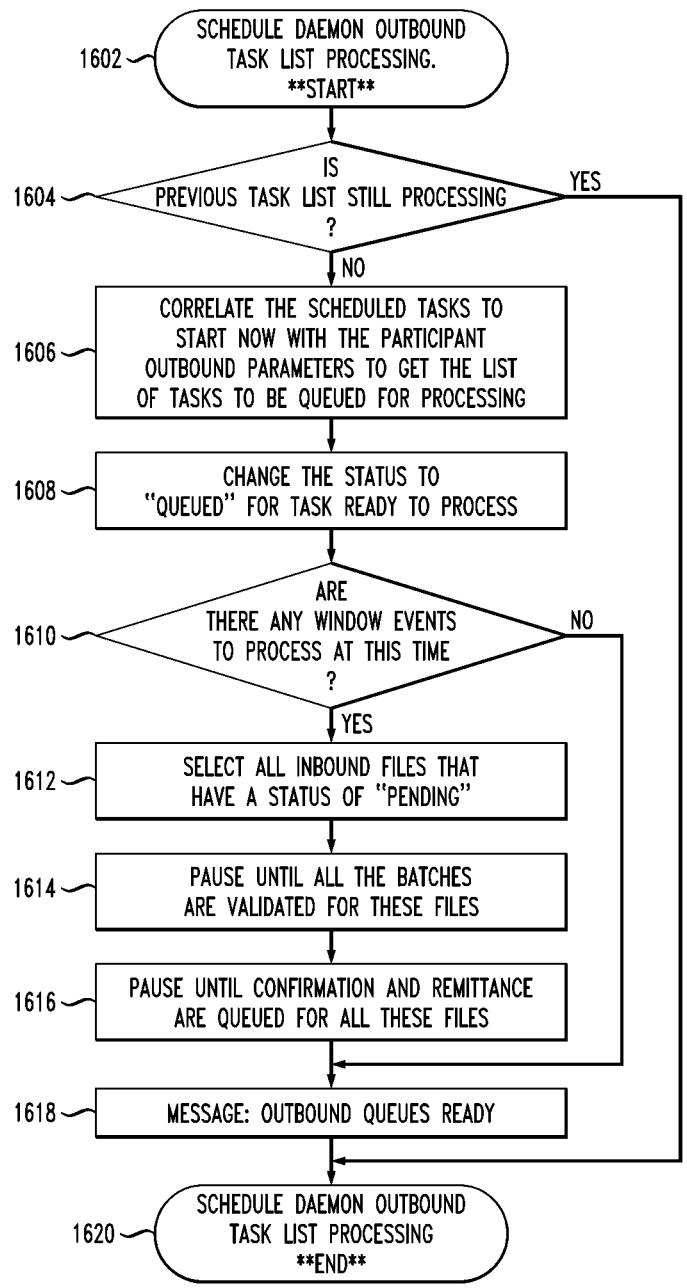
FIG. 22 presents a flow chart for exemplary task list initiation when window events are present, from U.S. Provisional Patent Application Ser. No. 61/438,106.

FIG. 22 shows exemplary task list initiation when window events are present. Processing begins at 1602. In decision block 1604, determine whether the previous task list is still processing. If not, as per the "NO" branch, proceed to step 1606 and correlate the scheduled tasks to start now with the participant outbound parameters to get the list of tasks to be queued for processing. Then, in step 1608, change the status to "queued" for tasks that are ready to process, and proceed to decision block 1610. In block 1610, determine whether there are any window events to process at this time. If not, as per the "NO" branch, send a message that outbound queues are ready, in step 1618, and proceed to end step 1620. Note that if, in decision block 1604, it was determined that the previous task list was still processing ("YES" branch), then processing proceeds directly to end block 1620.

If decision block 1610 yields a "YES," then proceed to step 1612 and select all inbound files that have a status of "pending." Then, in step 1614, pause until all the batches are validated for these files. Further, in step 1616, pause until confirmation and remittances are queued for all the files in questions, and proceed to step 1618.

In an alternative approach for delaying the start of processing at a window, send a message to the pre-processor to send back: a list of files queued for processing, their size, and the time they arrived from GFT. For all files that arrived by the cutoff time and (optionally) are under a certain size, wait until their confirmation and remittance groups are complete.

Figure 23:
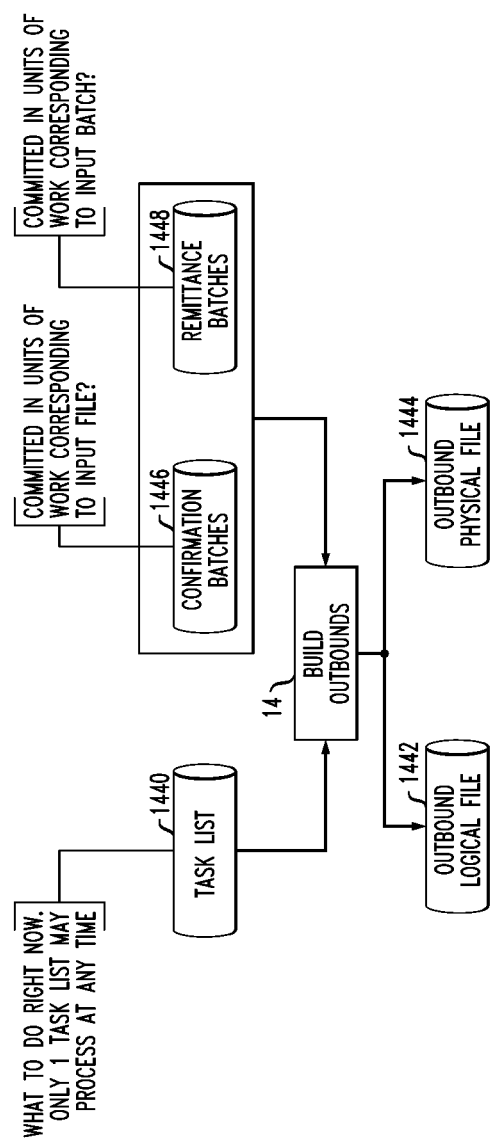
FIG. 23 depicts an exemplary build outbound files process, from U.S. Provisional Patent Application Ser. No. 61/438, 106.

Reference should now be had to FIG. 23 in connection with an exemplary build outbound files process. When the task list 1440 is generated and the confirmation queue 1446 and remittance queue 1448 are ready, the building of the outbound files (logical 1442 and physical 1444) may begin. This process takes all the confirmation and remittance batches 1446, 1448 associated with each task in the list and produces messages to the post processor to generate the outbound files, as per "build outbounds" block 14.

In one or more embodiments, the following configuration tables are employed to help this process (some exemplary participant parameters).

| | Participant | | |
|---|---|---|---|
| Participant | Outbound Format | No Data Style | Confirmation Style Code | ... |
| P1 | MOD-CIE | None | O |
| P2 | ACH-CIE | None | O |
| P3 | MOD-CIE | None | O |
| P4 | ACH-CIE, ACH-CTX | EmptyFile | O |
| P5 | MOD-CIE | None | O |

The exemplary participant table holds parameters for each participant. Some of those parameters are shown here as a non-limiting example. The outbound format type tells the formats the participant may use for outbound files. The no data style tells whether a "no data file" is to be sent to the participant if no detail transactions are received for them on a window that they have chosen. The no data style may have the values:
None
Empty
ZeroCount The confirmation style code tells what level of detail is to be included in confirmation files for this participant. The values are:
- 'O' indicating the original RPPS style (again, references to RPPS are exemplary and non-limiting. In other embodiments, for example, a similar code could be provided to indicate some other style, such as a style of a legacy system).
- 'F' indicating a comma delimited confirmation file showing all input records.
- 'R' indicating a comma delimited confirmation file showing only rejected records.
- 'M' indicating the confirmation file that will be accessed through MOL and is not to be automatically sent by the bill pay system.

The below table presents exemplary configuration data for the outbound file Structure:

| | Outbound Configuration | | | |
|---|---|---|---|---|
| Config ID | Dest Format | Outbound Type | Logical file ID | Order |
| C1 | MOD-CIE | Reversal | L1 | 6 |
| C1 | MOD-CIE | Payment | L1 | 3 |
| C1 | MOD-CIE | Exception | L1 | 5 |
| C1 | MOD-CIE | Same Day | L1 | 2 |
| C1 | MOD-CIE | Credit Counseling | L1 | 7 |
| C1 | MOD-CIE | Returns | L1 | 4 |
| C1 | MOD-CIE | Confirmation | L2 | 1 |
| C2 | ACH-CIE | Reversal | L3 | 5 |
| C2 | ACH-CIE | Payment | L3 | 2 |
| C2 | ACH-CIE | Exception | L3 | 4 |

-continued

| Outbound Configuration | | | | |
|---|---|---|---|---|
| Config ID | Dest Format | Outbound Type | Logical file ID | Order |
| C2 | ACH-CIE | Same Day | L3 | 1 |
| C2 | ACH-CIE | Credit Counseling | L3 | 6 |
| C2 | ACH-CIE | Returns | L3 | 3 |
| C2 | ACH-CIE | Confirmation | L4 | 7 |

The outbound file structure configuration tells which outbound types can be grouped together in the same logical files and what order those types are to appear in the file.

The below table presents exemplary Outbound Physical File data:

| Physical Outbound File | | |
|---|---|---|
| Outbound File ID | Outbound File Date Stamp | ICA |
| 2000 | 6/11/2008 11:46 | P1 |
| 2001 | 6/11/2008 12:02 | P2 |
| 2002 | 6/11/2008 12:02 | P2 |
| 2003 | 6/11/2008 12:02 | P3 |
| 2004 | 6/11/2008 12:02 | P3 |
| 2005 | 6/11/2008 12:02 | P4 |

The above table contains the description of the physical files to be outbound. There is one row for each physical file. The outbound file ID is a sequence number. This ID is put back into the confirmation queue and remittance queue tables showing which groups are associated with which physical file. As noted above, each unique combination of ICA, bulk type and end point in the task list table represents a distinct outbound physical file. The rows in this table are generated by querying the task list, The below table presents exemplary outbound logical file data:

| Logical Output File | | | | | | | |
|---|---|---|---|---|---|---|---|
| Logical File ID | Participant | Outbound Config ID | Physical Outbound File ID | File ID Modifier | Debit Amt | Credit Amt | Dtl/Addenda Count |
| LF1 | P1 | C1 | 2000 | 1 | | | |
| LF2 | P1 | C2 | 2000 | 2 | | | |
| LF3 | P2 | C3 | 2001 | 1 | | | |
| LF4 | P2 | C3 | 2002 | 2 | | | |
| LF5 | P3 | C1 | 2003 | 1 | | | |
| LF6 | P3 | C1 | 2004 | 2 | | | |
| LF7 | P4 | C3 | 2005 | 1 | | | |

This table lists all the logical files containing outbound information. It is built by correlating the task list table with the outbound file configuration table. The following are combined to tell whether the confirmation and remittance groups can be combined into a single logical file or whether multiple logical files are needed:

The participant in the confirmation queue and remittance queue tables

The outbound format of the participant from the outbound configuration table

The outbound type from the confirmation queue and remittance queue table

Each logical file may combine one or more confirmation and remittance groups.

After the content is placed in the two outbound file tables, messages to the bill pay post-processor are generated to guide the creation of the actual outbound files.

This process preferably also addresses:

File ID Modifier—This logical file attribute is used by the MOD-CIE and ACH-CIE (customer initiated entry) formats to give a unique modifier for each file from a single participant in a single calendar day.

Batch Limit—Each biller is allowed to set a limit on the maximum accumulated net amounts within any batch sent to them. The build outbound file process must take this limit into consideration when combining transaction details into batches from the remittance group queue.

Duplicate Trace Numbers—Within a MOD-CIE or ACH-CIE batch, trace numbers must be ascending and must be unique. If multiple inbound files are received in a day it is possible that duplicate trace numbers may be present. Any duplicate trace numbers must be put in separate batches.

No Data File—Participants may elect to receive a "no data" file for windows, frequencies or times in which they receive no remittance data. This process must detect that and provide the "no data" files if requested.

Figure 24:
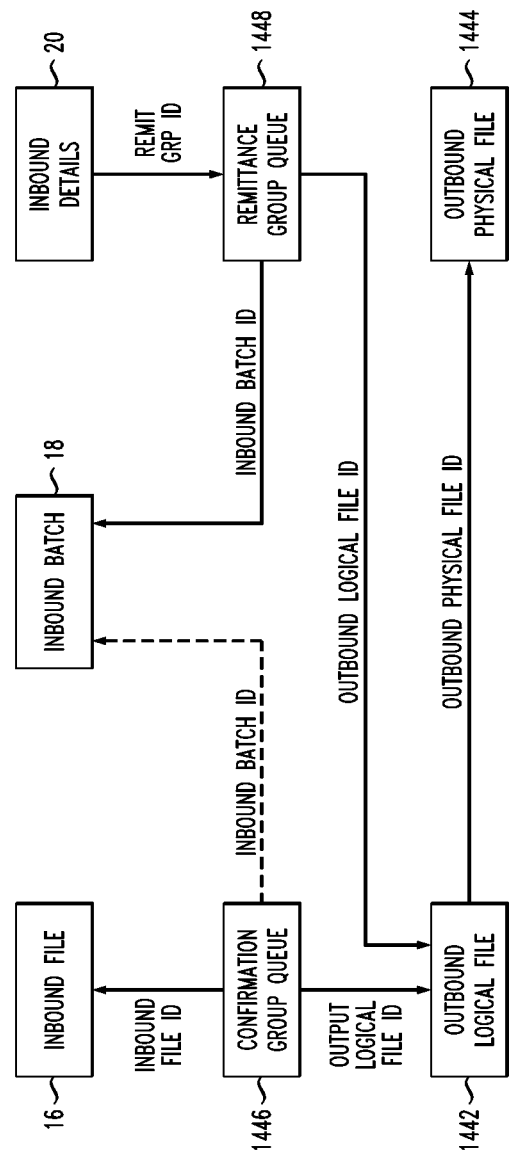
FIG. 24 depicts exemplary tracing between inbound and outbound data, from U.S. Provisional Patent Application Ser. No. 61/438,106.

FIG. 24 shows how the various previously-described inbound and outbound tables are linked together in one or more embodiments. These mappings allow tracing from/to inbound detail to/from physical remittance files and also from/to inbound batches to/from physical confirmation files.

Figure 25:
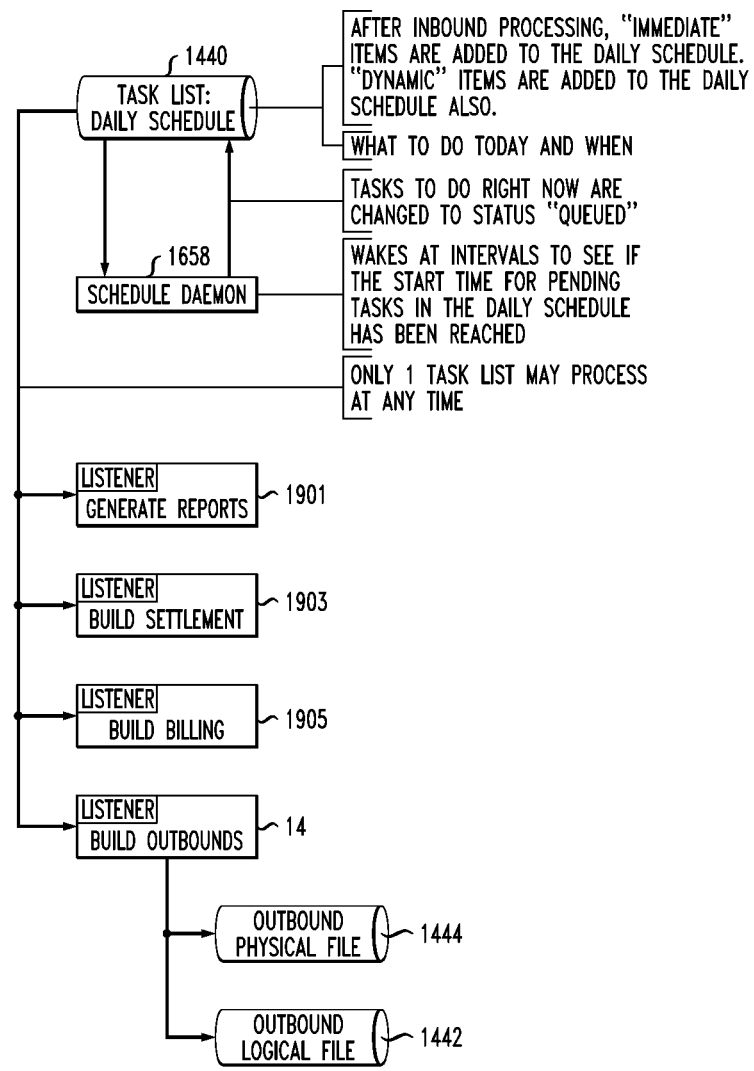
FIG. 25 depicts exemplary bill pay outbound data flow, from U.S. Provisional Patent Application Ser. No. 61/438, 106.

FIG. 25 depicts an exemplary settlement process with bill pay outbound data flow. As a part of the start of day processing, the daily schedule 1440 is generated based on the scheduled parameters. This daily schedule also includes the details for the creation of the settlement files (SIF). In some instances, the SIF files will be created only during the window event. For all the "Remittance outbound" type, a separate entry will be created for the settlement process. During the window time frame, after completion of the remittance processing, the schedule daemon 1658 will start the settlement process which will create the SIF files. The SIF files will be generated in parallel to the creation of the outbound files.

In one or more embodiments, the remittance group queue table will be the driver table for the SIF creation process. An example of sample remit group data follows:

| Remittance group queue | | | | | | |
|---|---|---|---|---|---|---|
| Inbound Batch ID | Biller ID | Dtl/Addenda Count | Debit Amt | Credit Amt | Outbound Logical File ID | Post-Processor Work ID |
| 1235 | B1 | 2 | 0 | 625.00 | | |
| 1239 | B4 | 2 | 0 | 400.00 | | |
| 1236 | B2 | 0 | 0 | 0.00 | | |
| 1237 | B3 | 1 | 0 | 1000.00 | | |
| 1240 | B3 | 2 | 0 | 700.00 | | |

In a non-limiting example, the settlement service which will be used for the bill pay system will be US000000002. This information will, in one or more embodiments, be taken from the MPS table.

For the SIF version 3, the payment party account reference code is a mandatory field. This field can be obtained from the MPS parameter system. This is unique for the settlement service-payment party combination. This field is profiled in the SAM profile system and propagated to the MPS parameter system. Of course, throughout this exemplary embodiment, items which are mandatory may be optional in other embodiments.

The MPS tables which will be accessed are as follows. A DB2® connection (registered mark of International Business Machines Corporation) to the MPS tables can be established from the bill pay database, for example.

TGPABUD—business partner name-business partner table

TGPAMSD—settlement service info-input sources associated with member assignment

TGPAXBD—transfer agent ID-transfer agent assignments

The logical details of the originator/concentrator values are summarized as follows (table for direction code):

| | Originator | | | Concentrator | | |
|---|---|---|---|---|---|---|
| | Debit/ | | | | | |
| | Credit Code | Direction Code | Type Code | Debit/Credit Code | Direction Code | Type Code |
| Payments | D | S | 04 | C | R | 05 |
| Returns | C | R | 05 | D | S | 04 |
| Reversals | C | S | 04 | D | R | 05 |
| Return Reversals | D | R | 05 | C | S | 04 |

In a non-limiting example, payment party type code "04" always goes with direction code "S," and payment party type code "05" always goes with direction code "R." It is dependent on who is sending or receiving the actual transactions. Debit credit code is dependent on the direction of the funds. For example for all the payment transactions, it is a debit for originator and a credit for the concentrators. For payment transactions, the originator is the sender so the direction code is 'S' and the concentrator is the receiver of the funds, hence the direction code is 'R.'

During the SIF process, a record is inserted in the SIF status table corresponding to a single SIF file. The SIF file serial number is a unique number assigned to each of the physical SIF files. It is a sequential count of each file starting at 1 and rolling over to 1 after reaching 99999. This feature can be used to track individual files. This file serial number is also used during the Settlement Notification (SINF) process to identify the status of the file. Furthermore, in one or more embodiments, the relevant SIF details are created in the SIF detail table. This table can be used to generate settlement reports in the future. Refer to the two tables of FIG. 26 for more details.

In one or more embodiments, the SIF files will be transmitted to the SAM system using an internal GFT bulk type. Since GFT already stores the files by default, the physical files will not be stored in the bill pay system. Other embodiments may take a different approach.

After processing the SIF file, the SAM system will generate the corresponding Settlement Notification (SINF) files. The SINF file will be transmitted to the bill pay system using internal bulk type in GFT. A new TWS job will be created which will be triggered on the arrival of the SINF file in the specified directory location. The SINF files will be processed by the bill pay system looking for the return status. The status will be stored and if there are errors then a FATAL error will be logged and notification will be generated for immediate attention by the bill pay system support team, using, for example, IBM Tivoli® software (registered mark of International Business Machines Corporation). Again, other approaches may be used in different embodiments.

The retention of data in the SIP tables can be decided based on appropriate considerations.

Figure 27:
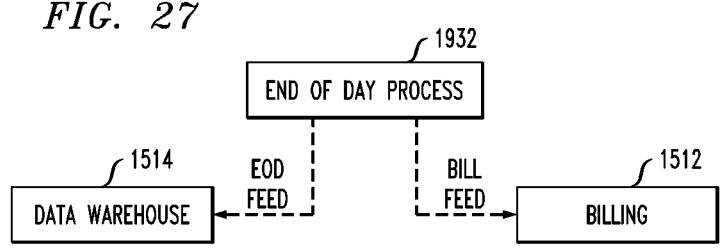
FIG. 27 depicts an exemplary end of day process, from U.S. Provisional Patent Application Ser. No. 61/438,106.

An exemplary end of day process 1932 will now be described with respect to FIG. 27. In some instances, this will be done after the completion of processing of the $5^{th}$ window. In this particular example, the following steps needs to be done as a part of the end of day process:

Any records which are in the confirmation and remittance queue which were not processed must be processed and the corresponding confirmation/remittance files must be created. The files cannot be held for the next day processing.

The system will generate No-Data file for the participants who were profiled to receive and did not get any transactions for the current day.

Some of the staging tables must be purged and cleaned before the start of the day processing begins.

As a part of the process, a feed needs to be generated for the data warehouse 1514.

A billing feed 1512 will be generated and delivered to the billing application.

At the completion of the End of day process, the parameter maintenance window begins and continues till the start of the day process begins.

The following table shows the mapping of the Data warehouse fields and the corresponding bill pay tables which contains the data.

| Data Warehouse Field | Bill Pay Table |
|---|---|
| Sending RPPS ID | Inbound file |
| Sending RPPS IDName | Participant setup |
| Consolidator Name | Consolidator setup |
| Contact Name | Participant setup |
| Telephone Number | Participant setup |
| Fax Number | Participant setup |
| Email address | Participant setup |
| Receiving RPPS ID | Participant setup |
| Original Biller ID (True) | Inbound file |
| Alias Biller ID | Same as Original Biller ID (True) for phase 1 |
| Converted Biller ID | Same as Original Biller ID (True) for phase 1 |
| Merchant Name | Biller setup |
| Concentrator Name | Participant setup |
| Contact Name | Participant setup |
| Telephone Number | Participant setup |
| Fax Number | Participant setup |
| Email Address | Participant setup |
| Converted Biller Id | Same as Original Biller ID (True) for phase 1 |
| Date file processed inbound | Inbound file status |
| Time file processed inbound | Inbound file status |
| Date file processed outbound | Physical outbound file |
| Time file processed outbound | Physical outbound file |
| Tran code | Inbound detail |
| Tran status | Inbound detail |
| Original Account number | Inbound detail |
| Converted Account Number | Same as Original Account number for phase 1 |
| Customer Name | Participant setup |
| Error Code(s) | Inbound file error, Inbound batch error |
| Amount of transaction | Inbound detail |
| Trace number | Inbound detail |
| File control information (file debit, credit amounts) | Inbound file |
| Encrypted Trace Number | Inbound detail |
| Batch control information | Inbound batch |

| Data Warehouse Field | Bill Pay Table |
|---|---|
| Error status | Inbound file error |
| ICA | Participant setup |
| Currency Code | Inbound detail, Inbound batch, Inbound file |
| Product Code | Participant setup |
| Business Code | Participant setup |

In some instances, the billing process is kicked off as a part of the end of the day processing. For the specified day of processing, the billing process will accumulate all the details required for the creation of the billing files.

The billing process will create the following files and deliver them to the MCBS application.
 a) Sender Billing—For all accepted transactions, billing data details for the sending ICA/RPPS ID
 b) Receiver Billing—For all accepted transactions, billing data details for the receiving ICA/RPPS ID
 c) Reject billing—For all rejected transactions, billing data details for the sending ICA/RPPS ID.
 d) Audit—Contains summary of the sending/receiving/reject billing files.

The inbound detail table contains all the necessary data related to the accepted and rejected detail records. The billing process will get all the transaction records for the given processing day from the inbound detail table, ICA/RPPS ID information from the related tables, and generate the physical billing files. At the end of the processing it will update the inbound file status table with the completion of the billing status. The physical billing files will not be stored in the bill pay system. These files will be accessible from the GFT for the internal users. Other approaches could be used in other embodiments.

VRU (Voice Response Unit) Design

In some instances, one or more embodiments will replace or supplement an existing system. Purely by way of example and not limitation, in some such cases, only a VRU summary table will be populated and VRU maintenance information will be copied from a current (e.g., legacy) VRU contacts table. In some cases, one or more embodiments do not involve the addition of new members; in such cases, there may not be any anticipated changes for VRU maintenance. An interface for maintaining members may be covered in the internal tools requirements. A "PHONE" table may contain a phone type indicating VRU.

In some cases, such as, for example, a transition process, a new VRU summary table can be compared to an existing one, but not actually be used as the data source to perform the VRU calls. Later, when the table will start to be used to perform the actual VRU calls, the 'call completed' switch on all the existing records can be set to 'Y' first.

In a non-limiting example, a process for verifying that the VRU calls have been completed can be performed by a Perl script that is kicked off by TWS job SRPS0011D at 06:30 AM Monday through Saturday. If there are no rows from the prior day's cycles or if any rows from the prior day's cycles do not have the call completed switch set to 'Y,' the script will send an email to the RPPS Help Desk and page RPPS Account Support via e-mail. If the calls actually failed, Account Support will manually make the calls and update the VRU Summary table via the CSR Tool.

Again, purely by way of a non-limiting example of transitioning from a legacy system to a system employing one or more aspects of the invention, during an initial part of the transition, data views or feeds from the bill pay (e.g., new application) tables will be created. These will be used to manually compare existing legacy system data to the corresponding bill pay data. In future phases of the transition, the bill pay views or feeds will replace the current methods of populating RPPS or similar data warehouse tables.

Figure 28:
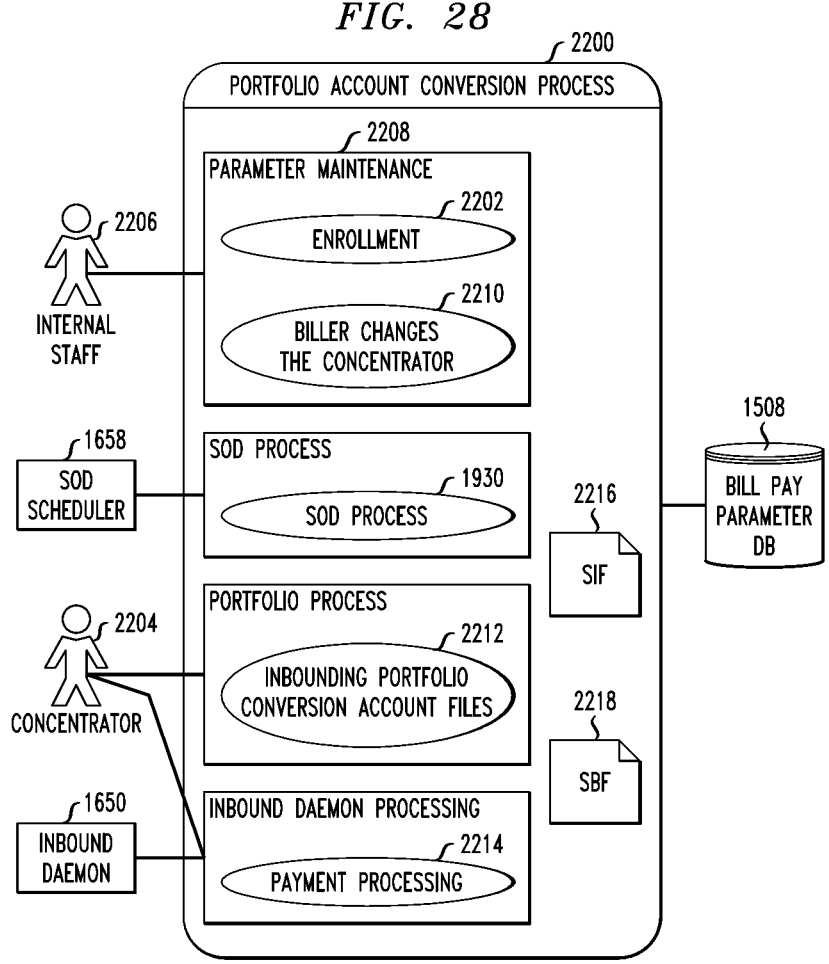
FIG. 28 depicts an exemplary portfolio conversion process, from U.S. Provisional Patent Application Ser. No. 61/438, 106.

FIG. 28 presents a high level flow diagram for an exemplary portfolio conversion process 2200. During enrollment 2202, the concentrators 2204 and/or biller will provide the information to product support 2206 to register and/or enroll a biller for the service; this can be done, for example, in the parameter maintenance 2208.

Where the biller changes the concentrator, as at 2210, portfolio conversion is set up between the old biller and/or concentrator and new biller and/or concentrator, with a service payer that is either the old or new biller, and with a start date. In this process, if any of the information changes, then the existing relationship should preferably be inactivated and a new one should be set up.

In the SOD process 1930, for all portfolio account conversion file registrations that have a start date of today, set the registration to active and for all portfolio account conversion file registrations that have an end date of today, set the registration to inactive.

In the portfolio account conversion process 2212, the details of portfolio account conversion files are validated and uploaded in the data base 1508.

During the payment processing 2214, in some cases, apply additional business rule to the standard payment transaction to identify the concentrator(s) and/or biller(s) registered for portfolio account conversion.

With regard to SIF 2216, in some cases, the SIF file creation process considers the RPPS ID/ICA details of the new biller and/or concentrator for converted transactions.

With regard to SBF 2218, in some cases, during the SBF process 2218, monthly fee, file upload fee, account upload fee and portfolio conversion transaction fee are maintained in bill pay at the biller enrollment level.

Note that useful information on portfolio conversion can be found in co-assigned US Patent Publications US 2008-0046364 A1 of Hall et al. and US 2010-0174644 A1 of Rosano et al., the complete disclosures of both of which are expressly incorporated herein by reference in their entireties for all purposes.

Figure 29:
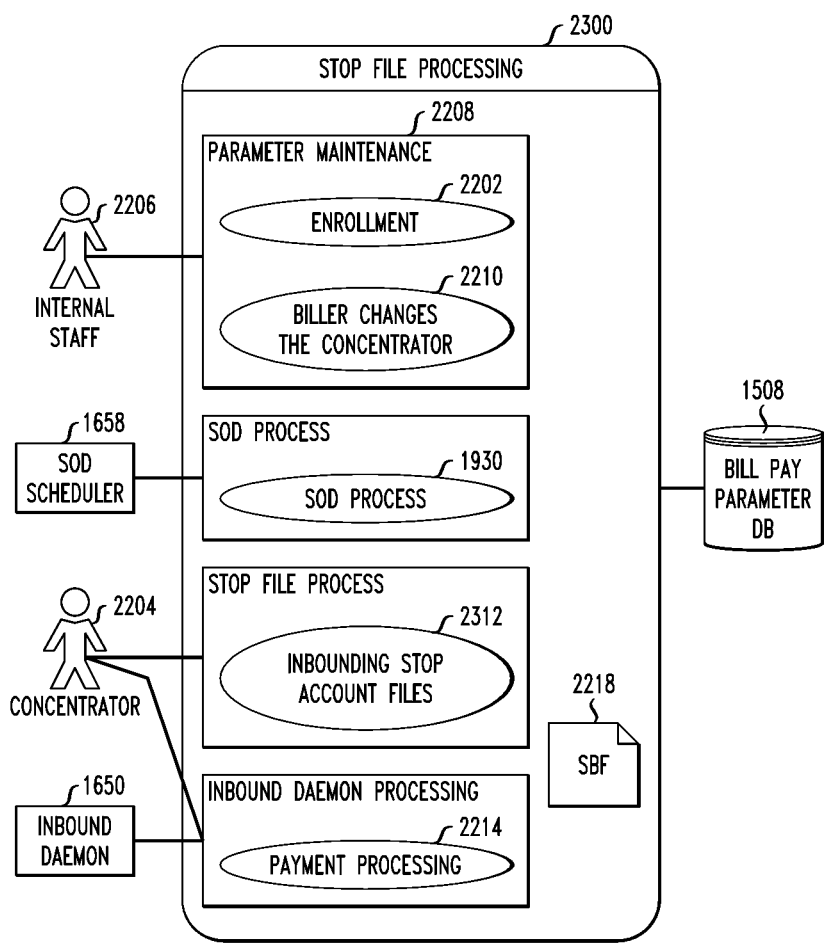
FIG. 29 depicts an exemplary stop file workstream, from U.S. Provisional Patent Application Ser. No. 61/438,106.

FIG. 29 presents a high level flow diagram for an exemplary stop file work stream 2300. During enrollment 2202, the concentrators and/or biller will provide the information to product support 2206 to register and/or enroll a biller for the service and this will be done in the parameter maintenance 2208. In bock 2210, the biller changes the concentrator; in this process, if the biller and/or concentrator or the start date changes, then the existing relationship should be inactivated and a new one should be set up. During the SOD process 1930, for all stop file registrations that have a start date of today, set the registration to active and for all stop file registrations that have an end date of today, set the registration to inactive. During the Inbounding stop account files block 2312, the details of stop account files will be validated and uploaded in the data base 1508. During payment processing 2214, apply additional business rules to the standard payment transaction to identify the concentrator and/or biller registered for stop file service. During the SBF process 2218, monthly fee, account upload fee and stop file transaction fee are maintained in bill pay at biller enrollment level.

Non-limiting exemplary details will now be provided regarding a design solution, including system design details. In the non-limiting example, a presentation layer is not employed, nor is an infrastructure layer.

With regard to process architecture, in some instances, the bill pay application is built based on Java 5 technology and will run on UNIX on suitable high-end servers. The system will is designed to run in a standalone JAVA virtual machine (JVM), within the JAVA 5 runtime environment. The following components and APIs (application program interfaces) are chosen for use in development; others could be used in other cases:

cess, confirmation queuing process, remittance queuing process, immediate schedule process, reporting process, and the like:

com.acme.billpay.daemon.BillpayDaemonProcess

In a non-limiting example, it loads the spring bean factory using the SingletonBeanFactoryLocator class which will look for file "beanRefFactory.xml" in the root of the classpath. It also initializes all the start-up application components that need to be initialized during the daemon process start up.

Figure 30:
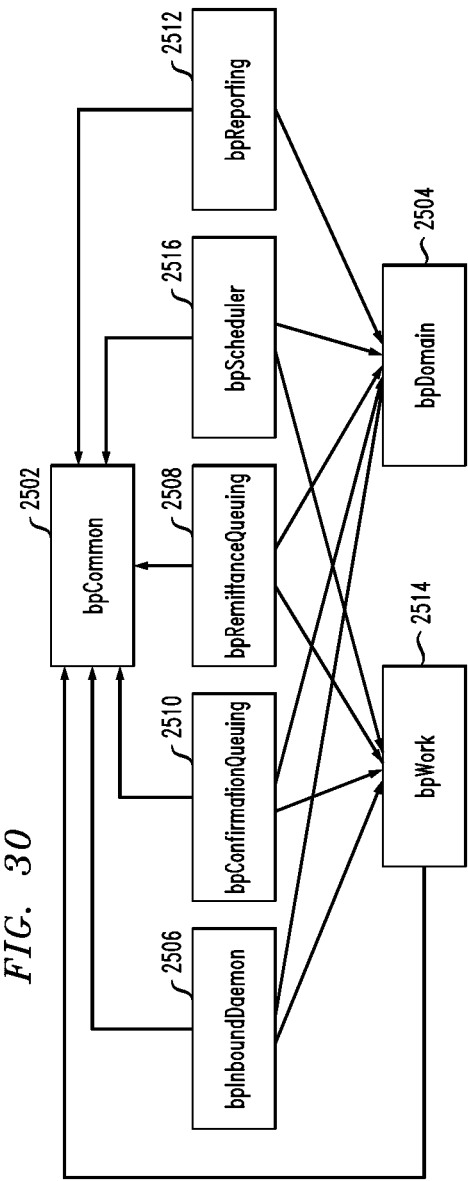
FIG. 30 depicts an exemplary start up and initialization process, from U.S. Provisional Patent Application Ser. No. 61/438,106.

Reference should be had to the following table and to FIG. 30.

| Name | Version | Description | Reference |
| --- | --- | --- | --- |
| JDK/JRE | 1.5 | Java Development Kit API and Java Runtime Environment | (Refer to Oracle Corporation web site) |
| MQ Series | 7.0 | Messaging provider | |
| Spring | 2.5.3 | Application framework | (Refer to Spring Source Community web site) |
| Hibernate | 3.2.6 | ORM framework | (Refer to JBoss community web site) |
| JUnit | 4.4-Approved 3.8.1 | Unit Testing Framework | (Refer to Junit web site) |
| Subversion | 1.4.3 | Version Control system | |
| RAD/RSA | 7 | Rational Application Developer/Rational Software Architect | |
| Ant | 1.7.1 | | (Refer to the Apache Ant project web site) |
| Log4j | 1.2.12 | Logging framework | |
| JBossTS | 4.2.3 | JBossTS is JTA transaction management functionality that is used by JBoss application server. It can also be embedded into J2SE applications that do not have benefit of a built-in transaction server. | (Refer to JBoss community web site) |
| Castor | 1.2 | Castor is a java-xml binding framework. It provides a quick and easy method for populating Java objects from xml data, or the reverse. | (Refer to the Castor project web site) |

Figure 32:
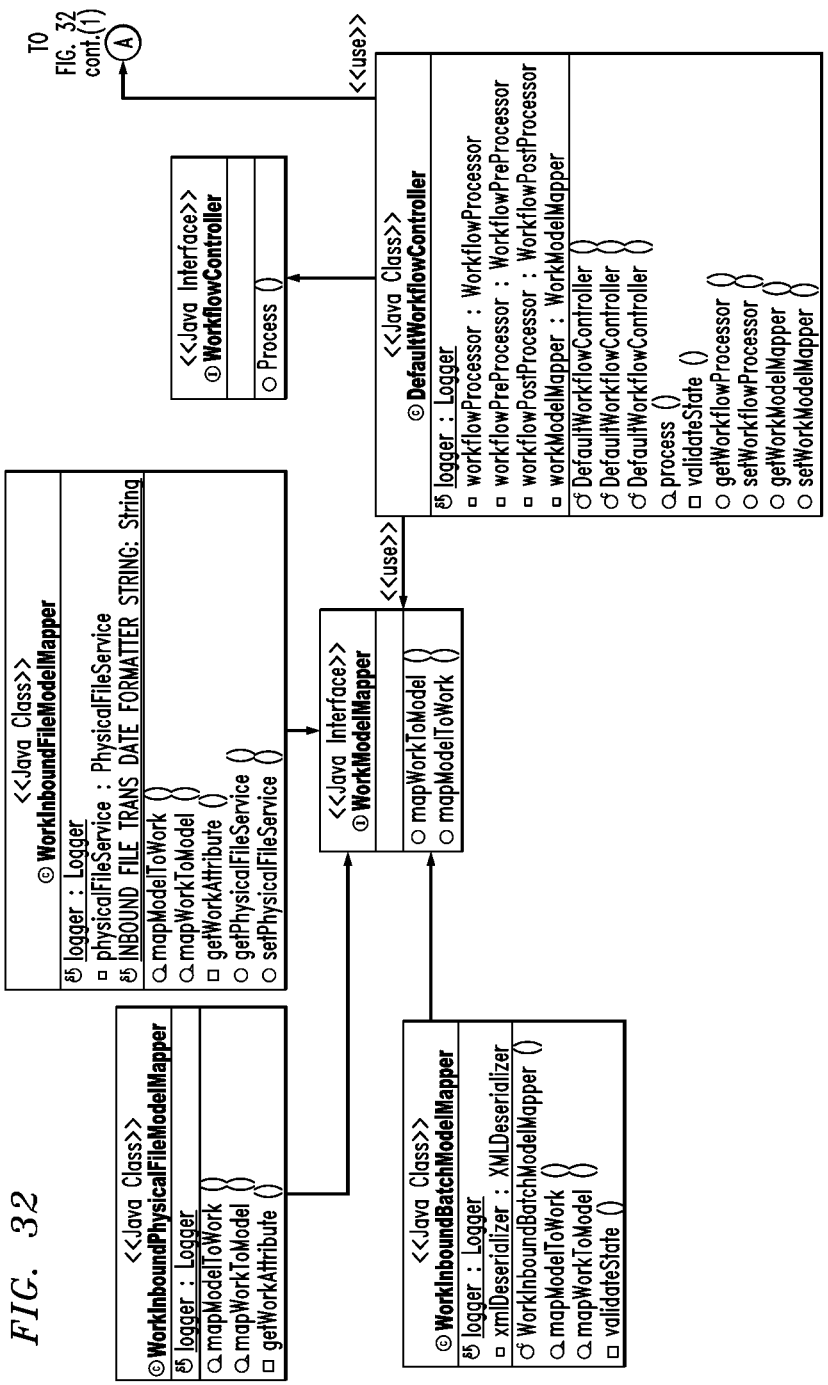
FIG. 32 depicts an exemplary business layer, from U.S. Provisional Patent Application Ser. No. 61/438,106.

With reference to FIG. 32, one or more embodiments are provided with a business layer having components that focus on processing business data.

Exemplary details will now be provided regarding an exemplary implementation using JAVA, it being understood that languages other than JAVA, or different approaches using JAVA, could be employed in some instances.

The following is an exemplary JAVA namespace that can be used as the package root for classes in the bill pay application:

com.acme.billpay

The following is an exemplary JAVA namespace that can be used for the classes specific to inbound daemon process:

com.acmc.billpay.inbound

The following is an exemplary JAVA namespace that can be used for the classes specific to confirmation queuing process:

com.acme.billpay.confirmation

The following is an exemplary JAVA namespace that can be used for the classes specific to remittance queuing process:

com.acme.billpay.remittance

In a non-limiting example, the following class represents a generic class that can be used to start up the bill pay processes, such as the inbound daemon process, outbound daemon pro-

| Project Name | Description |
| --- | --- |
| bpCommon 2502 | Contains all the common classes shared across all other projects |
| bpDomain 2504 | Contains classes related to the persistence layer |
| bpInboundDaemon 2506 | Contains classes related to inbound daemon process |
| bpRemittanceQueuing 2508 | Contains all classes related to the remittance queuing process |
| bpConfirmationQueuing 2510 | Contains all of the classes related to the confirmation queuing process. |
| bpReporting 2512 | Contains all of the classes related to the reporting queuing process |
| bpImmediateScheduler | Contains all of the classes related to the immediate schedule queuing process. |
| bpWork 2514 | Contains all classes related to internal work |
| bpSchedulerDaemon | Contains all of the classes related to the Scheduler Daemon process |
| bpScheduleWork | Contains all the classes related to the SOD (start of the day) process |

One or more embodiments include a bill pay monitor component which may include, for example, threads running continuously; sleeping and waking up at intervals and executing business criteria. Once the business criterion is met they perform any post execution tasks and die.

One or more embodiments include a Bill Pay Work Dispatcher 1791. This component's main responsibility is to dispatch the internal work objects to several internal destination queues as specified in the configuration. For example, when an inbound process 1650 has validated its inbound data, it generates an internal work message to be put in the internal process queues. Another responsibility of this component is to build the internal work objects based on the workflow configuration (specified as a map of key value pairs (queuename and InternalWorkType); a configurable value via spring configuration. Values should match with the "enum" constants as defined in the InterWorkType class.

One or more embodiments include a bill pay scheduler component wherein all scheduler processes are dependent upon parameter maintenance being performed for the scheduling setup information.

One or more embodiments include a bill pay confirmation component (see, e.g., block 1200); a bill pay remittance component (see, e.g., block 10); and/or a bill pay outbound files generation component (see, e.g., block 14).

Figure 31:
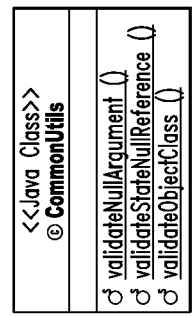
FIG. 31 depicts an exemplary utility class, from U.S. Provisional Patent Application Ser. No. 61/438,106.

In one or more embodiments, some utility classes are defined, such as, for example:
com.acme.billpay.util.CommonUtils
See also FIG. 31.

In some instances, the above utility methods can be used to verify null validity of the method arguments, where appropriate.

One or more embodiments include exception handling capability wherein there is capability for defining a custom exception and/or any new internal error codes.

One or more embodiments employ the well-known log 4j tool for logging. In some instances, whenever an error is logged, bill pay will record some standard information for any log:
Error message
Work ID, file ID, Batch ID (as applicable)
Stack trace In some instances, the bill pay process, before putting a message into a local error queue, will log the error message with the logging level of FATAL. These messages with log level set as FATAL will be monitored using TIVOLI service manager software or the like and a notification will be sent to the support staff.

In a non-limiting example, the following logging levels/ priority are chosen while logging to the application log:

| Priority/Level | Usage |
|---|---|
| Debug | Used to communicate details that describe a status or activity within the code at a specific point in time, typically used in diagnosing why an error is occurring |
| Info | Used to communicate messages that would be beneficial in determine the user and the intent of their request, typically used in initial diagnostics of errors and for audit purposes |
| Warn | Used to communicate unexpected situations within the application that do not result in an exception, such as re-establishing a connection that is normally available. |
| Error | Used to communicate instances of exceptions that have occurred |
| Fatal | Used to communicate instances of exceptions that have occurred as part of startup and will prevent the application from being able to process requests in the future |

The following clarifications are provided re certain terminology employed herein:
NON-FINANCIAL PAYMENTS—these allow both the originator (for example, in RPPS or the like) and the concentrator and/or biller to exchange non-payment transaction information that may require action on the receiving side, such as an account number change.
REVERSALS—these allow originators (for example, in RPPS or the like) to reverse any payment transactions that were sent to concentrators and/or billers erroneously, such as duplicate payment submitted by the consumers, duplicate file being sent by the originator, and the like. This includes, in some instances, handling the Debit cap processing.
RETURNS and RETURN REVERSALS—Allow concentrator and/or biller (for example, in RPPS or the like) to return any payment transactions or reversal transactions to the originators due to an "un-postable" situation on the biller's side. This may be due to the account number being closed, incorrect, or the like. This includes, in some instances, handling returns from the Payment Center via addenda records.
CONVERTING PAYMENTS FOR PORTFOLIO CONVERSION ENROLLMENT—Applies a Product Feature to the standard payment transaction to identify the Concentrator and/or Biller registered for Portfolio conversion and change the Remit biller and Account number for the processing.
STOPPING PAYMENT FOR THE STOP FILE ACCOUNT—Applies additional business rules to the standard payment transaction to identify the Concentrator and/or Biller registered for Stop File service.

One or more embodiments provide a system and/or method for use by an operator of a payment processing network, wherein such operator interconnects a plurality of customer service providers (such as banks of consumers) with a plurality of biller service providers (such as banks of billers). The system processes on-line bill payment transactions. Consumers utilize a service, such as a web site, made available by one of the customer service providers, to specify payment of one or more bills (e.g., electric, phone, gas). Optionally, presentment functionality is provided wherein bills from the billers are presented to the consumers electronically, such as on-line. These transactions are routed to the bill pay system according to one or more embodiments of the invention, which helps clear, settle, and move funds from the consumer to the biller. In one or more embodiments, the front end (online application for consumers to specify payments) is provided by the customer service provider bank and the bank batches the transactions to RPPS or bill pay systems at regular times throughout the day (in RPPS, five pre-defined clearing and settlement times).

One or more embodiments of a Bill Pay system allow sending files, transactions, or batches all through the day and for processing them at any time of day. In some instances, an entity such as an operator of a payment processing network will process a batch as soon as received; depending on how the receiver has chosen the frequency at which they wish to receive, such entity will forward to them. In essence, one or more embodiments move from first-n-first-out (FIFO) to customer-based processing wherein the originator can define when to process and the receiver can define when to receive. Options include processing at a specified time, specifying whether to process immediately, and/or specifying a window for processing. Unlike the file-based RPPS approach, one or more embodiments of a bill pay system can process in near real time. Some embodiments even afford real-time clearing (but not necessarily settlement) of individual transactions. Such clearing of individual transactions may be effectuated, for example, by interfacing the bill pay system to web services.

In another aspect, each sender and receiver can have their own format; an up-front component translates incoming data into an internal format and switches it back upon dispatch. This is called UNP.

In a further aspect, business rules may be specified in a file accessed by a business rules engine so as to externalize the rules from the code.

An overall system may include additional servers, clients, or other computers of other entities, interconnected by one or more networks as discussed herein.

Given the discussion thus far, it will be appreciated that, in general terms, an exemplary method, according to an aspect of the invention, includes obtaining, by an operator of a payment processing network, from a plurality of customer service providers, a plurality of instructions specifying a plurality of bill payments to a plurality of biller entities. Biller entities include billers and/or biller service providers. The instructions specify, for each of the bill payments, an amount and an intended one of the biller entities to be paid. In a further step, based on the plurality of instructions, the operator of the payment processing network dispatches, to the plurality of biller entities, a plurality of messages to initiate the plurality of bill payments. Further, the operator of the payment processing network obtains at least one of:

first data from at least one of the plurality of customer service providers specifying when at least some of the plurality of instructions specifying the plurality of bill payments to the plurality of biller entities are to be obtained by the operator of the payment processing network (such first data may specify, for example, when the instructions are to be obtained from the particular CSP in question);

second data from at least one of the plurality of biller entities specifying when at least some of the plurality of messages to initiate the plurality of bill payments are to be dispatched (such second data may specify, for example, when the messages are to be dispatched to the particular biller entity in question; in some instances, CSPs and/or customers might have input in this kind of scheduling).

The operator of the payment processing network carries out at least one of:

scheduling the step of obtaining the plurality of instructions specifying the plurality of bill payments to the plurality of biller entities in accordance with the first data (as used herein, "in accordance with" is intended to cover cases where instructions are provided for scheduling all or only some of the instructions); and scheduling the step of dispatching the plurality of messages in accordance with the second data (as used herein, "in accordance with" is intended to cover cases where instructions are provided for scheduling all or only some of the messages).

The second data obtained by the operator of the payment processing network may specify, for example, at least one of immediate dispatch; periodic dispatch; and dispatch at least one specific time.

In some cases, at least some of the plurality of messages to initiate the plurality of bill payments initiate real time clearing of individual transactions.

In some instances, at least one of:
the scheduling of the step of obtaining the plurality of instructions specifying the plurality of bill payments to the plurality of biller entities in accordance with the first data, and
the scheduling of the step of dispatching the plurality of messages in accordance with the second data,
is carried out in accordance with a periodic schedule; and a further step includes periodically generating the periodic schedule.

In some embodiments, in the generating step, the periodic schedule is a daily schedule.

In one or more instances, at least some instructions of the plurality of instructions obtained by the operator of the payment processing network are obtained between instances of the periodic schedule generation, and the second data specifies the immediate dispatch as to the at least some instructions of the plurality of instructions. In such cases, a further step includes updating the periodic schedule between the instances of the periodic schedule generation to reflect the second data specifying the immediate dispatch.

In some embodiments, the scheduling of the step of dispatching the plurality of messages in accordance with the second data is carried out in accordance with the periodic schedule by having a schedule daemon wake at intervals to check the periodic schedule to determine whether start times associated with given ones of the messages have been reached.

We claim:

1. A method comprising the steps of:
providing, under control of an operator of a payment processing network, a bill presentment service wherein bills received from a plurality of billing entities are made available to a plurality of consuming entities via a plurality of consuming entity service providers;
storing in a database, accessible to said operator of said payment processing network, registration and preference data pertaining to each of said plurality of consuming entities; and
allowing a given one of said consuming entities which has switched from a first one of said consuming entity service providers to a second one of said consuming entity service providers to access said bill presentment service via said first one of said consuming entity service providers, prior to said switching, and via said second one of said consuming entity service providers, subsequent to said switching, using said stored registration and preference data;
wherein:
a subset of said registration and preference data pertains to said given one of said consuming entities; and
said given one of said consuming entities is allowed to access said bill presentment service via said second one of said consuming entity service providers without having to take any updating action as to at least a portion of said subset of said registration and preference data;
further comprising providing a system, wherein the system comprises distinct software modules, each of the distinct software modules being embodied on a non-transitory computer-readable storage medium, and wherein the distinct software modules comprise a bill presentment platform module, a database module, and a user interface module;
wherein:
said providing is carried out by said bill presentment platform module executing on at least one hardware processor;
said storing is carried out by said database module executing on said at least one hardware processor; and
said allowing is carried out, at least in part, by said user interface module executing on said at least one hardware processor.

2. The method of claim 1, further comprising providing, by said operator of said payment processing network, at least a portion of a bill payment service wherein said consuming entities are afforded an option of paying said bills from said plurality of billing entities.

3. The method of claim 2, wherein said at least portion of said subset of said registration and preference data comprises payment preference data specifying how said given one of said consuming entities wishes to pay at least two of said billing entities.

4. The method of claim 3, further comprising affording said given one of said consuming entities an option to pay said at least two of said billing entities with a single command, in accordance with said payment preference data.

5. The method of claim 3, wherein said payment preference data specifies, for each of said at least two of said billing entities, a form of payment and an amount of payment.

6. The method of claim 3, further comprising affording said given one of said consuming entities an opportunity to specify, in said payment preference data, at least payment card payment and electronic funds transfer payment.

7. The method of claim 6, further comprising affording said given one of said consuming entities an opportunity to specify, in said payment preference data, at least one of cash payment and check payment.

8. The method of claim 3, further comprising at least one of:
said operator of said payment processing network facilitating an electronic funds transfer to payment card conversion; and
said operator of said payment processing network facilitating a payment card to electronic funds transfer conversion.

9. The method of claim 1, wherein said at least portion of said subset of said registration and preference data comprises unique login data for said given one of said consuming entities.

10. The method of claim 1, further comprising said operator of said payment processing network providing, as a portion of said bill presentment service, a user interface configured to permit said plurality of consuming entities to view said bills, said user interface being offered as a service to at least some of said consuming entity service providers.

11. The method of claim 1, further comprising said operator of said payment processing network functioning as one of said consuming entity service providers to a subset of said consuming entities.

12. The method of claim 1, further comprising said operator of said payment processing network translating said bills received from said plurality of billing entities into at least one format understandable by said plurality of consuming entities.

13. The method of claim 1, further comprising said operator of said payment processing network facilitating said consuming entities viewing statements of said plurality of billing entities online without having to sign on to web sites of said plurality of billing entities.

14. The method of claim 1, further comprising said operator of said payment processing network facilitating said consuming entities viewing image files of statements of said plurality of billing entities.

15. The method of claim 1, further comprising said operator of said payment processing network facilitating enrollment of said plurality of billing entities, said plurality of consuming entities, and said plurality of consuming entity service providers in said bill presentment service, wherein at least a portion of said registration and preference data is provided during said enrollment.

16. The method of claim 1, further comprising providing, by said operator of said payment processing network, at least a portion of a bill payment service wherein said consuming entities are afforded an option of paying said bills from said plurality of billing entities, wherein said providing, storing, and allowing steps are carried out without enrollment of said plurality of consuming entities, further comprising:
receiving from said plurality of billing entities an indication of ability to send said bills in electronic form;
receiving from said plurality of consuming entity service providers an indication of ability to receive said bills in electronic form; and
tracking a plurality of transactions to identify those of said plurality of consuming entities for whom said bills in electronic form are intended.

17. The method of claim 16, further comprising:
storing data indicative of said ability to send said bills in electronic form; and
storing data indicative of said ability to receive said bills in electronic form;
wherein said tracking comprises:
storing, in a relationship table, based on historical data, billing entity identifiers, billing entity account numbers, and consuming entity service provider identifiers; and
upon said operator of said payment processing network obtaining a bill from a given one of said billing entities in electronic form, consulting said relationship table to obtain at least one of said consuming entity service provider identifiers corresponding to a given one of said billing entity identifiers and a given one of said billing entity account numbers;
further comprising making said bill from said given one of said billing entities available to at least one of said consuming entities corresponding to said at least one of said consuming entity service provider identifiers.

18. The method of claim 17, wherein said consulting comprises consulting said relationship table to obtain at least a second consuming entity service provider identifier corresponding to said given one of said billing entity identifiers and said given one of said billing entity account numbers, further comprising making said bill from said given one of said billing entities available to at least a second one of said consuming entities corresponding to said at least second consuming entity service provider identifier.

19. The method of claim 17, wherein said tracking further comprises:
examining payment files from given ones of said consuming entity service providers to identify billing entity account numbers to be added to said relationship table if not already present therein; and
adding said billing entity account numbers to said relationship table if not already present therein.

20. The method of claim 19, further comprising automatically electronically presenting future electronic bills associated with said billing entity account numbers added to said relationship table.

21. The method of claim 1, further comprising notifying at least some of said plurality of consuming entities when at least a portion of said bills are available for viewing.

22. The method of claim 21, wherein said notifying comprises notifying via at least one of an electronic mail, a text message, and a telephone call.

23. The method of claim 1, further comprising at least some of said plurality of consuming entity service providers periodically checking with said operator of said payment processing network to determine when at least a portion of said bills are available for viewing.

24. An apparatus comprising:

a memory;

a plurality of distinct software modules, each of the distinct software modules being embodied on a non-transitory computer-readable storage medium, the distinct software modules comprising a bill presentment platform module, a database module, and a user interface module; and at least one processor, coupled to said memory, and operative to:

implement a bill presentment platform configured to provide, under control of an operator of a payment processing network, a bill presentment service wherein bills received from a plurality of billing entities are made available to a plurality of consuming entities via a plurality of consuming entity service providers, said bill presentment platform being implemented by said at least one processor executing said bill presentment platform module loaded into said memory;

implement a database, coupled to said bill presentment platform and accessible to said operator of said payment processing network, configured to store registration and preference data pertaining to each of said plurality of consuming entities, said database being implemented by said at least one processor executing said database module loaded into said memory; and implement a user interface configured to allow a given one of said consuming entities which has switched from a first one of said consuming entity service providers to a second one of said consuming entity service providers to access said bill presentment platform via said first one of said consuming entity service providers, prior to said switching, and via said second one of said consuming entity service providers, subsequent to said switching, using said stored registration and preference data, said user interface being implemented by said at least one processor executing said user interface module loaded into said memory;

wherein:

a subset of said registration and preference data pertains to said given one of said consuming entities; and said user interface module is configured to allow said given one of said consuming entities to access said bill presentment service via said second one of said consuming entity service providers without having to take any updating action as to at least a portion of said subset of said registration and preference data.

25. A computer program product comprising a non-transitory tangible computer readable recordable storage medium having computer readable program code embodied therewith, said computer readable program code comprising:

computer readable program code configured to provide, under control of an operator of a payment processing network, a bill presentment service wherein bills received from a plurality of billing entities are made available to a plurality of consuming entities via a plurality of consuming entity service providers;

computer readable program code configured to store in a database, accessible to said operator of said payment processing network, registration and preference data pertaining to each of said plurality of consuming entities; and computer readable program code configured to allow a given one of said consuming entities which has switched from a first one of said consuming entity service providers to a second one of said consuming entity service providers to access said bill presentment service via said first one of said consuming entity service providers, prior to said switching, and via said second one of said consuming entity service providers, subsequent to said switching, using said stored registration and preference data;

wherein:

a subset of said registration and preference data pertains to said given one of said consuming entities; and said computer readable program code configured to allow is configured to allow said given one of said consuming entities to access said bill presentment service via said second one of said consuming entity service providers without having to take any updating action as to at least a portion of said subset of said registration and preference data.

26. An apparatus comprising:

means for providing, under control of an operator of a payment processing network, a bill presentment service wherein bills received from a plurality of billing entities are made available to a plurality of consuming entities via a plurality of consuming entity service providers;

means for storing in a database, accessible to said operator of said payment processing network, registration and preference data pertaining to each of said plurality of consuming entities; and means for allowing a given one of said consuming entities which has switched from a first one of said consuming entity service providers to a second one of said consuming entity service providers to access said bill presentment service via said first one of said consuming entity service providers, prior to said switching, and via said second one of said consuming entity service providers, subsequent to said switching, using said stored registration and preference data;

wherein:

a subset of said registration and preference data pertains to said given one of said consuming entities; and said means for allowing allow said given one of said consuming entities to access said bill presentment service via said second one of said consuming entity service providers without having to take any updating action as to at least a portion of said subset of said registration and preference data.

* * * * *